(12) United States Patent
Muraoka et al.

(10) Patent No.: US 9,142,853 B2
(45) Date of Patent: Sep. 22, 2015

(54) FUEL CELL STACK AND ELECTRONIC DEVICE PROVIDED WITH THE SAME

(75) Inventors: Masashi Muraoka, Osaka (JP); Toshiyuki Fujita, Osaka (JP); Tomohisa Yoshie, Osaka (JP); Hironori Kambara, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 918 days.

(21) Appl. No.: 13/262,443

(22) PCT Filed: Mar. 31, 2010

(86) PCT No.: PCT/JP2010/055932
§ 371 (c)(1),
(2), (4) Date: Sep. 30, 2011

(87) PCT Pub. No.: WO2010/114059
PCT Pub. Date: Oct. 7, 2010

(65) Prior Publication Data
US 2012/0034541 A1    Feb. 9, 2012

(30) Foreign Application Priority Data
Apr. 1, 2009    (JP) .................................. 2009-089295

(51) Int. Cl.
*H01M 8/24* (2006.01)
*H01M 8/02* (2006.01)
*H01M 8/04* (2006.01)
*H01M 8/10* (2006.01)

(52) U.S. Cl.
CPC .......... *H01M 8/2455* (2013.01); *H01M 8/0215* (2013.01); *H01M 8/0247* (2013.01); *H01M 8/04186* (2013.01); *H01M 8/1011* (2013.01); *Y02E 60/523* (2013.01)

(58) Field of Classification Search
USPC ........................................................ 429/456
See application file for complete search history.

(56) References Cited

U.S. PATENT DOCUMENTS

| 4,457,822 A | 7/1984 | Asano et al. |
| 4,498,942 A | 2/1985 | Asano et al. |

(Continued)

FOREIGN PATENT DOCUMENTS

| CN | 1539176 A | 10/2004 |
| JP | 60-258863 | 12/1985 |

(Continued)

OTHER PUBLICATIONS

Notice of Allowance mailed Dec. 20, 2014 in U.S. Appl. No. 12/671,878.

(Continued)

*Primary Examiner* — Gary Harris
(74) *Attorney, Agent, or Firm* — Nixon & Vanderhye P.C.

(57) ABSTRACT

Provided is a fuel cell stack having reduced thickness and weight and an improved output density. The fuel cell stack according to the present invention includes two or more stacked fuel cell layers, and is characterized in that at least one of the fuel cell layers is formed by arranging two or more composite unit cells in an identical plane with a gap provided therebetween, that the composite unit cell includes a plurality of unit cells and a fuel supply portion for supplying fuel to anode electrodes of the unit cells, and that the anode electrodes of the plurality of unit cells are arranged to face the fuel supply portion.

22 Claims, 35 Drawing Sheets

(56) References Cited

U.S. PATENT DOCUMENTS

| | | | |
|---|---|---|---|
| 4,664,987 A * | 5/1987 | Isenberg | 429/456 |
| 4,752,370 A | 6/1988 | McMichael et al. | |
| 4,877,694 A | 10/1989 | Solomon et al. | |
| 5,252,409 A | 10/1993 | Akagi | |
| 5,364,711 A | 11/1994 | Yamada et al. | |
| 5,399,184 A | 3/1995 | Harada | |
| 5,432,023 A | 7/1995 | Yamada et al. | |
| 5,549,982 A | 8/1996 | Akagi | |
| 6,054,228 A | 4/2000 | Cisar et al. | |
| 6,127,058 A | 10/2000 | Pratt et al. | |
| 6,743,541 B2 | 6/2004 | Chang et al. | |
| 6,766,817 B2 | 7/2004 | da Silva | |
| 6,918,404 B2 | 7/2005 | da Silva | |
| 7,066,586 B2 | 6/2006 | da Silva | |
| 2002/0068213 A1 | 6/2002 | Kaiser | |
| 2002/0076597 A1 | 6/2002 | Chang et al. | |
| 2002/0114989 A1 | 8/2002 | Allen | |
| 2003/0022051 A1 | 1/2003 | Haluzak | |
| 2003/0064265 A1 | 4/2003 | Hampden-Smith et al. | |
| 2003/0134172 A1 | 7/2003 | Grande et al. | |
| 2003/0170520 A1 | 9/2003 | Fujii et al. | |
| 2003/0180594 A1 | 9/2003 | Choi et al. | |
| 2003/0198849 A1 | 10/2003 | Hampden-Smith et al. | |
| 2003/0198853 A1 | 10/2003 | Choi et al. | |
| 2003/0203263 A1 | 10/2003 | Brown et al. | |
| 2004/0053100 A1 | 3/2004 | Stanley et al. | |
| 2004/0058224 A1 | 3/2004 | Eshraghi et al. | |
| 2004/0058227 A1 | 3/2004 | Tanaka et al. | |
| 2004/0068671 A1 | 4/2004 | Tanaka et al. | |
| 2004/0081878 A1 | 4/2004 | Mardilovich et al. | |
| 2004/0086776 A1 | 5/2004 | Muthuswamy et al. | |
| 2004/0220048 A1 | 11/2004 | Leban | |
| 2004/0229107 A1 | 11/2004 | Smedley | |
| 2004/0241526 A1 | 12/2004 | Ikeda | |
| 2005/0084736 A1 | 4/2005 | Chang et al. | |
| 2005/0238943 A1 * | 10/2005 | Akiyama et al. | 429/38 |
| 2006/0051655 A1 | 3/2006 | Yoshitake et al. | |
| 2007/0015037 A1 * | 1/2007 | Cao | 429/38 |
| 2007/0224481 A1 | 9/2007 | Suzuki et al. | |
| 2008/0014495 A1 | 1/2008 | Saito et al. | |
| 2008/0107949 A1 | 5/2008 | Yoshie et al. | |
| 2009/0035638 A1 | 2/2009 | Tsai et al. | |
| 2010/0221633 A1 | 9/2010 | Fujita et al. | |

FOREIGN PATENT DOCUMENTS

| | | |
|---|---|---|
| JP | 61-121268 | 6/1986 |
| JP | 5-41239 | 2/1993 |
| JP | 05-144482 | 6/1993 |
| JP | 05-325983 | 12/1993 |
| JP | 06-020710 | 1/1994 |
| JP | 06-188008 | 7/1994 |
| JP | 8-162141 | 6/1996 |
| JP | 10-134829 | 5/1998 |
| JP | 10-134836 | 5/1998 |
| JP | 11-045729 | 2/1999 |
| JP | 2000-106201 | 4/2000 |
| JP | 2000-223136 | 8/2000 |
| JP | 2001-102070 | 4/2001 |
| JP | 2001-160406 | 6/2001 |
| JP | 2001-283892 | 10/2001 |
| JP | 2002-056855 | 2/2002 |
| JP | 2002-175817 | 6/2002 |
| JP | 2003-59509 | 2/2003 |
| JP | 2003-187810 | 7/2003 |
| JP | 2003-282131 | 10/2003 |
| JP | 2003-331899 | 11/2003 |
| JP | 2004-031026 | 1/2004 |
| JP | 2004-178849 | 6/2004 |
| JP | 2004-179140 | 6/2004 |
| JP | 2004-192950 | 7/2004 |
| JP | 2004-200064 | 7/2004 |
| JP | 2004-206885 | 7/2004 |
| JP | 2004-288400 | 10/2004 |
| JP | 2004-335466 | 11/2004 |
| JP | 2005-032600 | 2/2005 |
| JP | 2005-174872 | 6/2005 |
| JP | 2005-517273 | 6/2005 |
| JP | 2005-235519 | 9/2005 |
| JP | 2006-054082 | 2/2006 |
| JP | 2006-507625 | 3/2006 |
| JP | 2006-172944 | 6/2006 |
| JP | 2006-222099 | 8/2006 |
| JP | 2006-269126 | 10/2006 |
| JP | 2007-516559 | 6/2007 |
| JP | 2007-265650 | 10/2007 |
| JP | 2009-38009 | 2/2009 |
| WO | WO 02/080299 | 10/2002 |
| WO | WO 03/067693 | 8/2003 |
| WO | 2004/093231 A2 | 10/2004 |
| WO | WO 2009/017147 | 2/2009 |

OTHER PUBLICATIONS

International Search Report for PCT/JP2010/055932, mailed Jul. 13, 2010.
Fujita, O.T. et al., "Development of high power density Fuel Cell stack", The Fuel Cell Symposium Lecture Proceedings, p. 109-110, along with English Translation.
Office Action issued in U.S. Appl. No. 12/671,878 dated Aug. 16, 2013.
Office Action issued in U.S. Appl. No. 12/671,878 dated Jan. 7, 2013.
Office Action issued in U.S. Appl. No. 12/671,878 dated Aug. 28, 2012.
Office Action issued in U.S. Appl. No. 11/806,663 dated Dec. 16, 2010.
Hirabayashi, et al., JP 2004-206885 (machine translation) dated Jul. 22, 2004.
International Search Report issued in Application No. PCT/JP2008/0063644 dated Oct. 7, 2008.
Saito, K., et al., "Membrane Electrode Assembly, Method of Manufacturing the Same, Fuel Battery, and Electronic Device," U.S. Appl. No. 11/661,801, filed Mar. 1, 2007.
Yoshie, T., et al., "Fuel Cell, Fuel Cell System and Electronic Device," U.S. Appl. No. 11/806,663, filed Jun. 1, 2007.
Office Action issued in U.S. Appl. No. 11/661,801 dated Dec. 23, 2011.
Advisory Action issued in U.S. Appl. No. 11/806,663 dated Jan. 27, 2012.
International Search Report issued in U.S. Appl. No. PCT/JP2005/016717 dated Dec. 13, 2005 with English translation.
Development and Application of Solid Polymer Electrolyte Fuel Cell, NTS Inc., pp. 171 and partial translation.
Office Action issued in U.S. Appl. No. 11/661,801 dated Dec. 2, 2009.
Office Action issued in U.S. Appl. No. 11/806,663 dated May 17, 2011.
Tomimatsu et al., JP 2000-106201 (machine translation) dated Apr. 11, 2000.
Office Action issued in U.S. Appl. No. 11/661,801 dated May 24, 2010.
Office Action issued in U.S. Appl. No. 11/661,801 dated Jun. 8, 2012.
Advisory Action issued in U.S. Appl. No. 11/661,801 dated Sep. 8, 2010.
Advisory Action issued in U.S. Appl. No. 11/661,801 dated Sep. 14, 2012.
Office Action issued in U.S. Appl. No. 11/806,663 dated Oct. 18, 2011.
Office Action issued in U.S. Appl. No. 14/194,247 dated Jun. 20, 2014.
Office Action issued in U.S. Appl. No. 11/806,663 on Nov. 10, 2014.
Office Action issued in U.S. Appl. No. 14/194,247 on Jan. 5 2015.
Jun. 19, 2015 Office Action issued in U.S. Appl. No. 14/194,247.

* cited by examiner

FIG.6
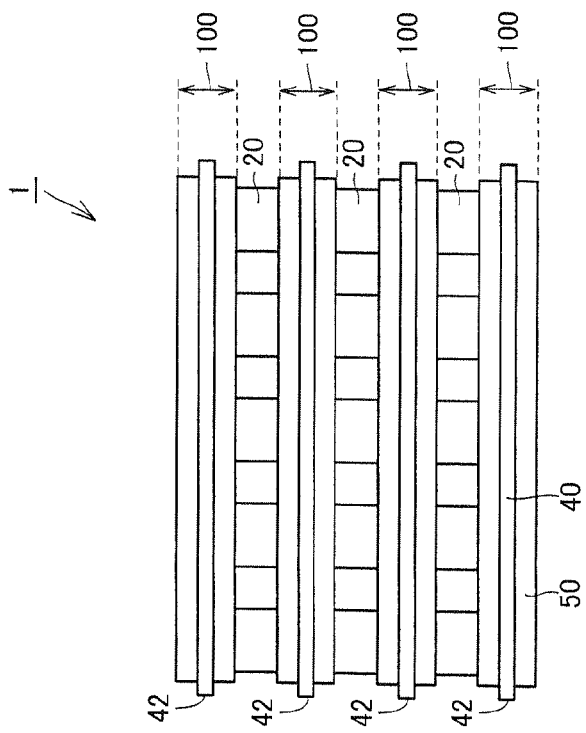
(A)
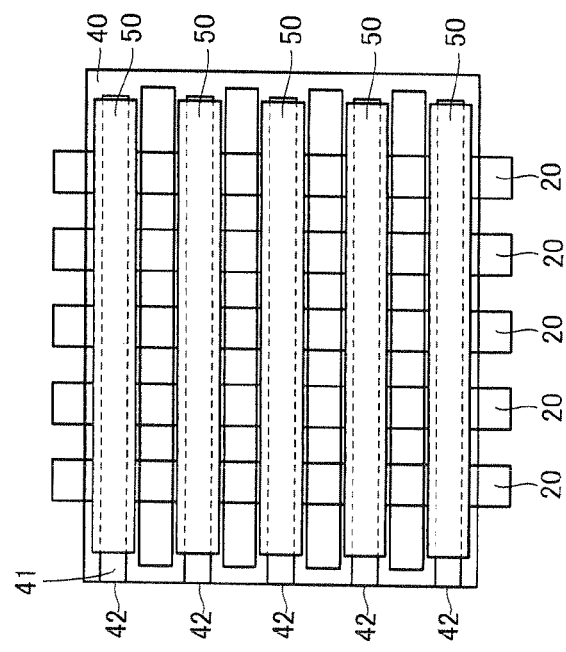
(B)

FIG.13
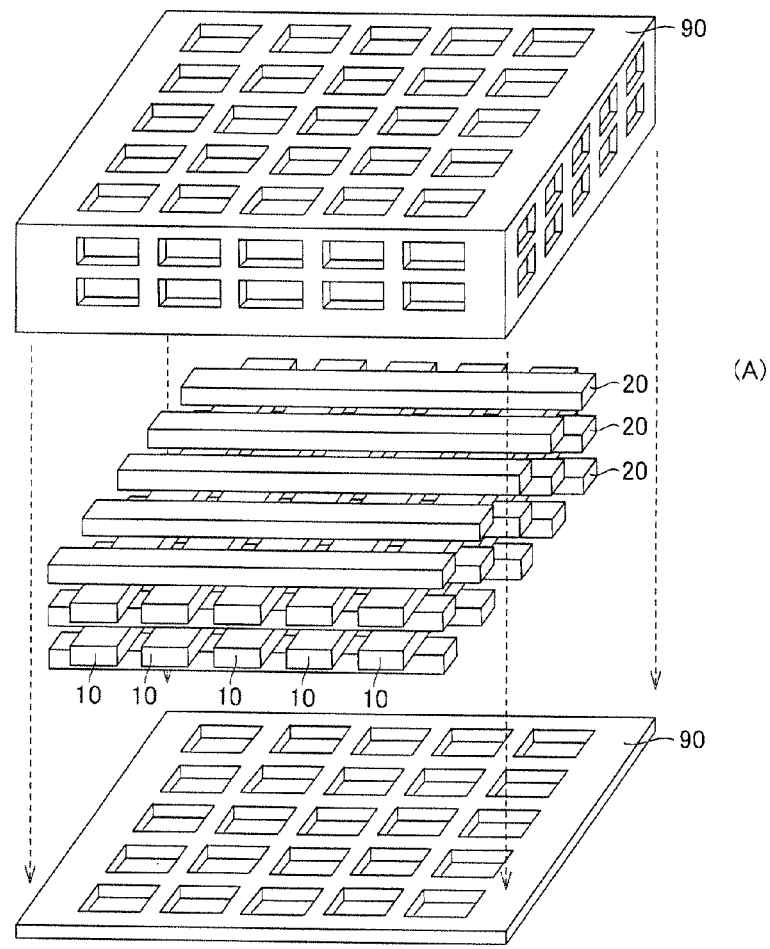
(A)
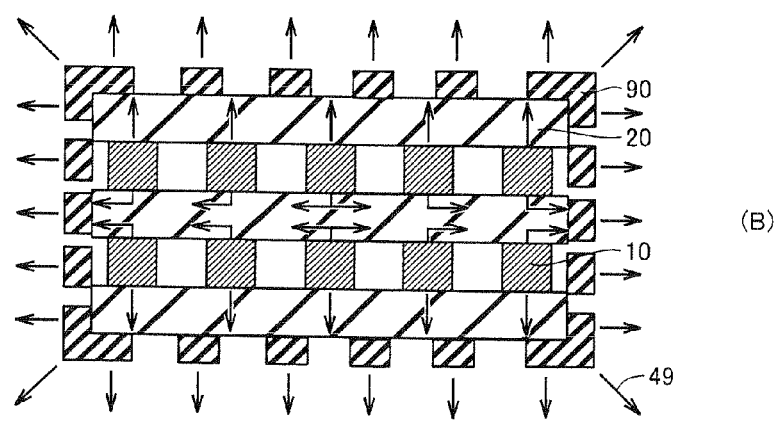
(B)

FIG.30
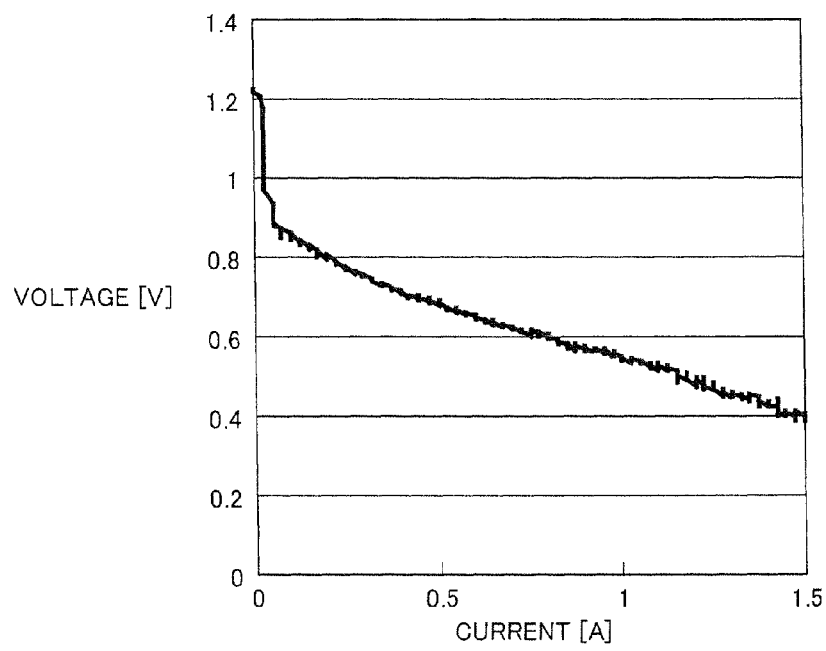
(A)
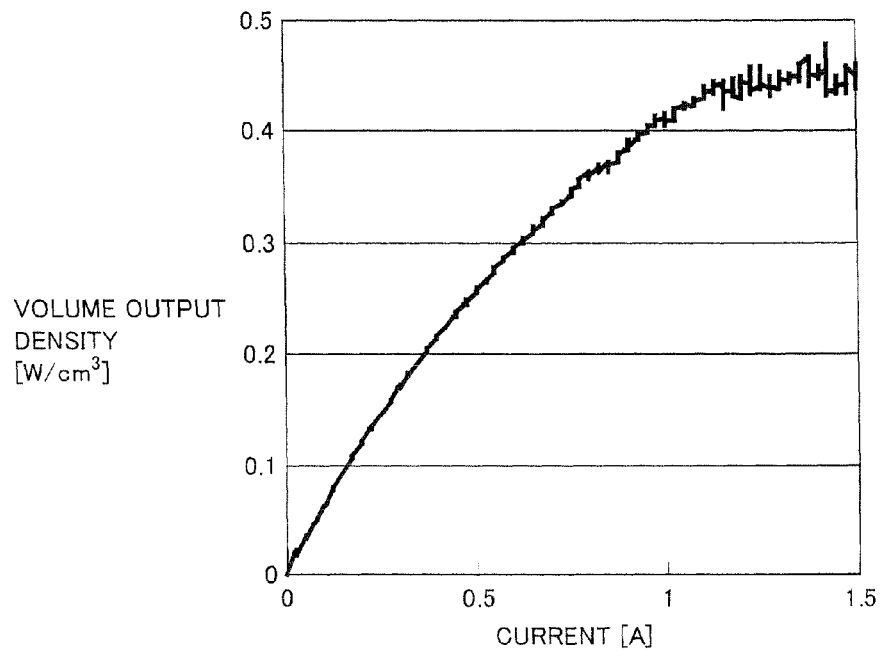
(B)

FIG.33
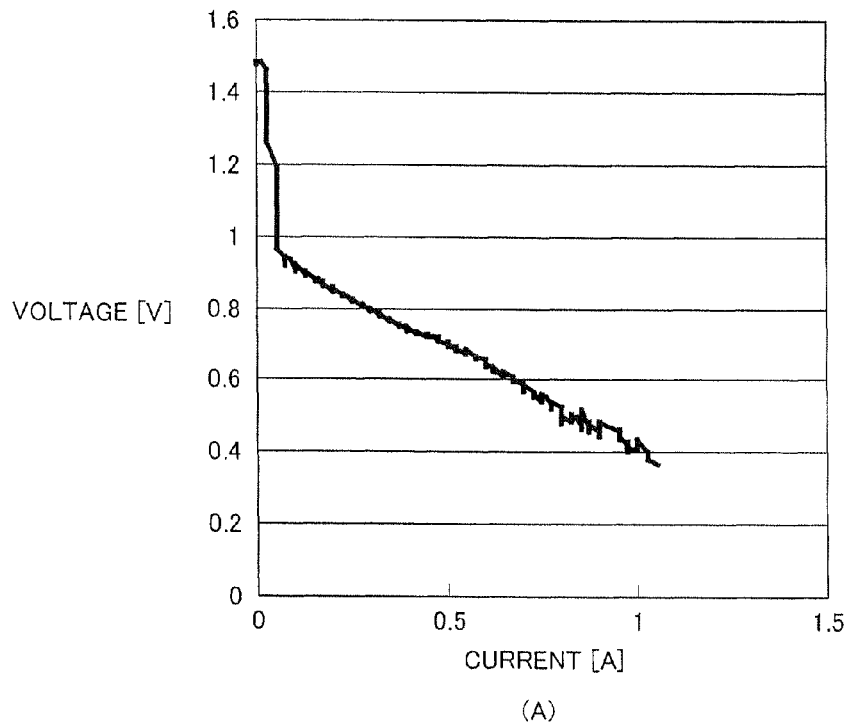
(A)
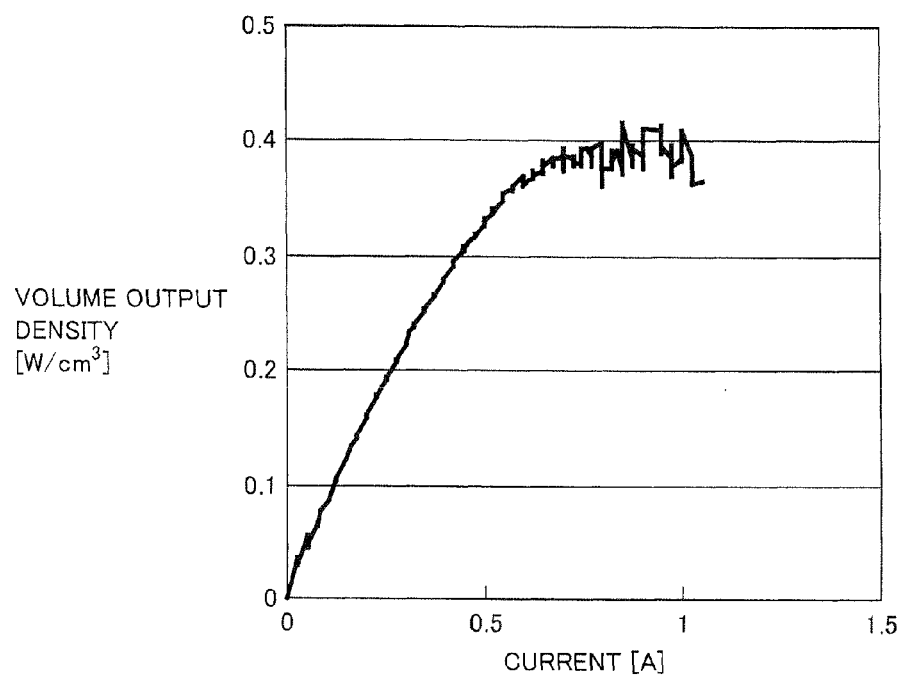
(B)

FIG.36
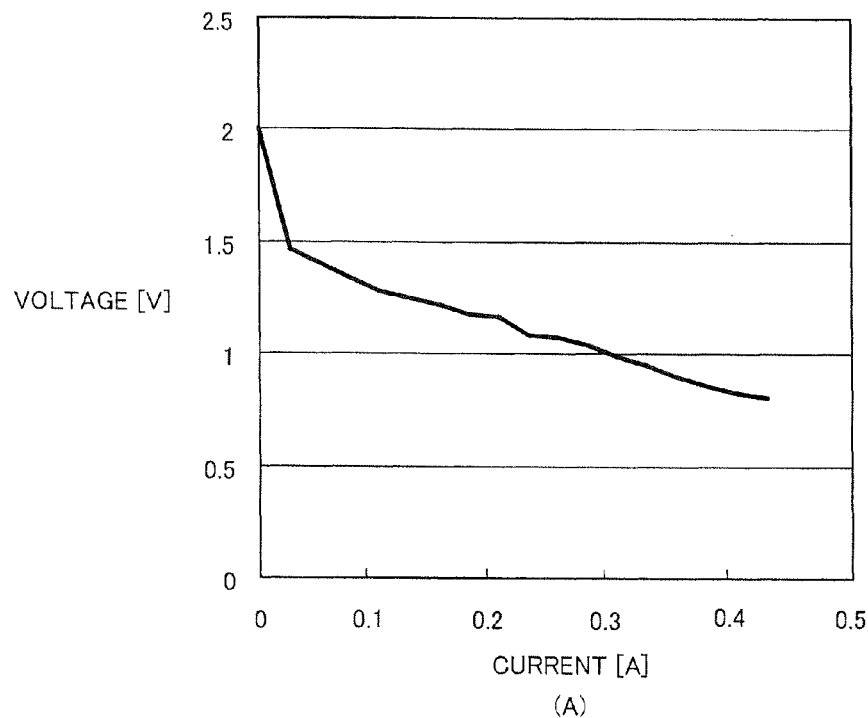
(A)
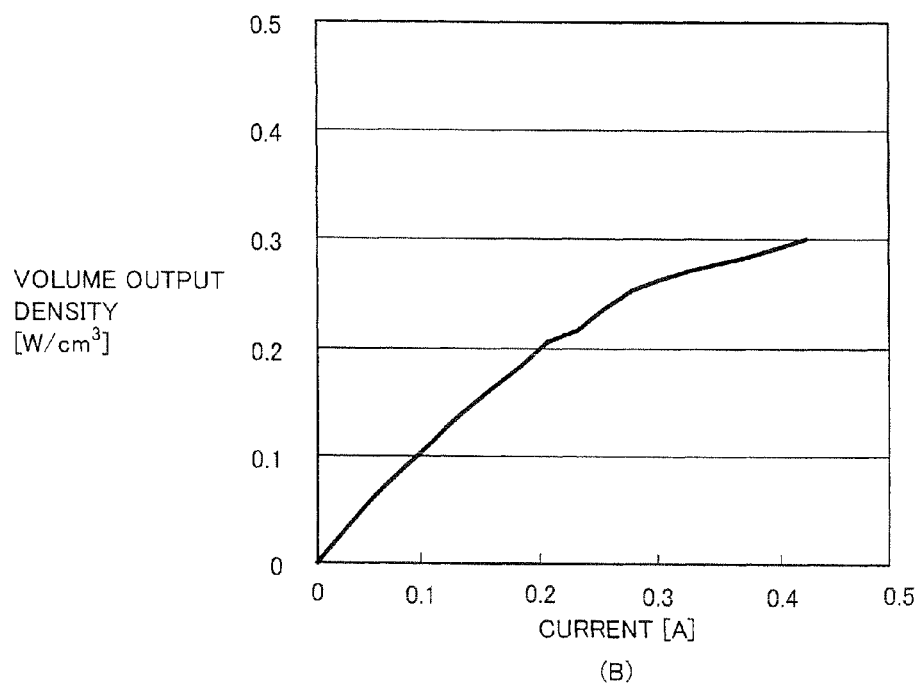
(B)

FUEL CELL STACK AND ELECTRONIC DEVICE PROVIDED WITH THE SAME

This application is the U.S. national phase of International Application No. PCT/JP2010/055932, filed 31 Mar. 2010, which designated the U.S. and claims priority to JP Application No. 2009-089295, filed 1 Apr. 2009, the entire contents of which are hereby incorporated by reference.

TECHNICAL FIELD

The present invention relates to a fuel cell stack and an electronic device provided with the same, and in particular to a fuel cell stack used for a compact portable electronic device and an electronic device provided with the same.

BACKGROUND ART

Recently, expectations for fuel cells as a power supply for compact electronic devices used in portable electronic devices and the like supporting information-oriented society have increased. A fuel cell is a chemical cell supplying electrons to a portable electronic device or the like by utilizing an electrochemical reaction which oxidizes fuel (such as hydrogen, methanol, ethanol, hydrazine, formalin, and formic acid) at an anode electrode and reduces oxygen in the air at a cathode electrode, and high power generation efficiency can be obtained by a single power generation device.

There are various types of such fuel cells, depending on differences in structure and fuel supplied thereto. Above all, a direct methanol fuel cell (DMFC) can generate electric power by supplying an aqueous methanol solution to an anode electrode and directly extracting protons and electrons from the aqueous methanol solution, and thus has an advantage of not requiring a reformer.

In addition, since the DMFC uses the aqueous methanol solution, which is a liquid under atmospheric pressure and has a high volume energy density, as fuel, it can handle the fuel using a compact fuel container and is also excellent in terms of safety, when compared with a fuel cell supplying hydrogen using a high-pressure gas cylinder. Thus, the DMFC has attracting attention for application to a compact power supply, in particular, for application as an alternative to a secondary cell for compact portable electronic devices.

Further, since the DMFC uses the fuel that is a liquid under atmospheric pressure, it can use a narrow curved space portion, which would be a dead space in other fuel cells, as a space for arranging a fuel container. Therefore, in an electronic device provided with the DMFC, a fuel container can be installed inside the electronic device with no restrictions on design.

Further, there is a possibility that liquid fuel which has a higher volume energy density and a higher flash point and is excellent in safety, such as ethanol and propanol, will be able to be utilized as fuel for the DMFC in the future, in addition to methanol.

Taking the DMFC as an example, an electrochemical reaction that occurs at an anode electrode and a cathode electrode within a fuel cell will be described. In the DMFC, methanol supplied through a fuel flow channel is oxidized at the anode electrode, and thereby separated into carbon dioxide, protons, and electrons as represented by the following reaction formula:

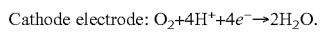

Subsequently, a flow of electrons generated when the electrons produced at the anode electrode move to the cathode electrode through an external load is extracted as electric power. On the other hand, the protons produced at the anode electrode are transported to the cathode electrode side through an electrolyte membrane. At the cathode electrode, the protons permeating through the electrolyte membrane react with an oxidizing agent as represented by a reaction formula described below, to produce water. As an oxidizing agent used for the DMFC, air that is abundant in an external atmosphere is often used.

Cathode electrode: $O_2+4H^++4e^-\rightarrow 2H_2O$.

Except for a high-temperature fuel cell such as a molten carbonate cell, fuel cells such as a solid polymer fuel cell, a solid oxide fuel cell, a direct methanol fuel cell, and an alkaline fuel cell have a plane-stacked structure obtained by stacking an anode separator in which an anode flow channel for supplying a reducing agent is formed, an anode current collector collecting electrons from an anode catalyst layer, an anode gas diffusion layer, the anode catalyst layer, an electrolyte membrane, a cathode catalyst layer, a cathode gas diffusion layer, a cathode current collector feeding electrons to the cathode catalyst layer, and a cathode separator in which a cathode flow channel for supplying an oxidizing agent is formed, in this order.

In particular, among the components of the fuel cell as described above, a composite including the anode catalyst layer, the electrolyte membrane, and the cathode catalyst layer formed by means such as thermocompression bonding or the like is called a membrane electrode assembly (MEA), which is a minimum constituent unit in constituting the fuel cell.

Further, a material having electrical conductivity is used for the anode separator and the cathode separator, because the anode separator may serve as an anode current collector and the cathode separator may serve as a cathode current collector. Furthermore, the anode separator may play a role of supplying the reducing agent to the anode catalyst layer, and the cathode separator may play a role of supplying the oxidizing agent to the cathode catalyst layer.

Any of the various types of fuel cells described above can produce a high current. However, since these fuel cells have a low output density per volume, it is necessary to improve output density to utilize them as a compact power supply.

Accordingly, generally, a plurality of fuel cells are stacked such that anode electrodes and cathode electrodes thereof are alternately brought into contact (hereinafter, such a stacked structure will also be referred to as a "fuel cell stack"), connected in series to increase an output voltage thereof, and thereafter mounted in an electronic device.

However, if contact resistance between the fuel cells is increased in the above fuel cell stack, internal resistance is increased, causing a reduction in overall power generation efficiency. In a conventional fuel cell stack, contact resistance between fuel cells in the fuel cell stack is suppressed and electrical conductivity is improved by providing a sealing material for sealing a reducing agent and a sealing material for sealing an oxidizing agent for each separator to improve sealing performance, and by closely maintaining electrical contact between an anode gas diffusion layer and an anode separator serving as an anode current collector and between a cathode gas diffusion layer and a cathode separator serving as a cathode current collector. In addition, both ends of the fuel cell stack are pressed down using fastening members such as a thick and rigid presser, a bolt, and a nut. However, since the fuel cell stack is provided with these fastening members, the size and weight of the fuel cell stack are increased, which has caused a problem that output density of the fuel cell stack is reduced.

Further, the conventional fuel cell stack has another problem that its output density is reduced because the anode separator and the cathode separator have too large thicknesses. It is necessary to form an anode flow channel for uniformly supplying a reducing agent to an entire surface of an anode catalyst layer, in the anode separator, and it is also necessary to form a cathode flow channel for uniformly supplying an oxidizing agent to an entire surface of a cathode catalyst layer, in the cathode separator.

If the thicknesses of the anode separator and the cathode separator are reduced by narrowing thicknesses of the anode flow channel and the cathode flow channel, pressure losses thereof when supplying the reducing agent and the oxidizing agent are increased. Therefore, the size of auxiliary equipment such as a pump and a fan for supplying the reducing agent and the oxidizing agent has to be increased, and as a result, the output density of the fuel cell stack is reduced. In addition, power consumption by the auxiliary equipment provided to the fuel cell stack is also increased, causing a reduction in power generation efficiency.

CITATION LIST

Patent Literature

PTL 1: Japanese Patent Laying-Open No. 2004-179140

Non Patent Literature

NPL 1: The 15th Fuel Cell Symposium Lecture Proceedings, page 109

SUMMARY OF INVENTION

Technical Problem

To solve the problems as described above, an attempt to improve output density of a fuel cell stack by increasing density of a power generation area included in a unit volume of the fuel cell stack has been made in the 15th Fuel Cell Symposium Lecture Proceedings, page 109 (hereinafter referred to as "Non Patent Literature 1"). Specifically, Non Patent Literature 1 proposes a structure of a fuel cell stack capable of supplying an oxidizing agent to cathode electrodes of fuel cells (hereinafter also referred to as "unit cells") without using auxiliary equipment or with low power consumption by the auxiliary equipment, by highly integrating the fuel cells.

In the fuel cell stack with such a structure, regular gaps each provided between the unit cells included in an identical fuel cell layer are provided to communicate with each other. With such an arrangement, oxygen as an oxidizing agent (oxygen in the air) can be taken in from the external atmosphere, and thereby air necessary for power generation can be supplied to the cathode electrodes of the fuel cells.

However, high power consumption is required for recent information electronic devices, in particular portable information electronic devices. Therefore, the fuel cell stack in Non Patent Literature 1 cannot support information electronic devices in terms of output density, and further improvement in the output density of the fuel cell stack has been requested.

Thus, Japanese Patent Laying-Open No. 2004-179140 (hereinafter referred to as "Patent Literature 1") proposes a structure in which one unit cell is arranged on each of an upper surface and a lower surface of one fuel flow channel such that an anode electrode of each unit cell faces the fuel flow channel (hereinafter also referred to as a "composite unit cell"), to improve output density of a fuel cell stack.

Although the composite unit cell with such a structure is suitable to increase the power generation area, cathode electrodes are located at both surfaces of the composite unit cell that face outward, and thus air cannot be supplied to these cathode electrodes unless the composite unit cell is used in a state where the cathode electrodes at its both surfaces are in contact with the air. Therefore, when such a composite unit cell is embedded in an electronic device, it is essential to provide a space for supplying air between the electronic device and the composite unit cell.

However, providing a space between the electronic device and the composite unit cell makes the electronic device itself thicker and difficult to be held with a hand and handled. In addition, when a support member (column) or the like is provided between the composite unit cell and the electronic device to maintain the space between the electronic device and the composite unit cell, strength of the fuel cell stack in a thickness direction is weakened, and strength of the electronic device itself against impact may also be reduced.

Due to these circumstances, providing a space between the electronic device and the composite unit cell is not considered as appropriate. For the reasons as described above, it has not been possible to supply a sufficient amount of air to a surface of the cathode electrodes of the composite unit cell that is in contact with the electronic device.

Further, when a layered unit cell having a large area (hereinafter also referred to as a "large-area unit cell") as shown in FIG. 1 of Patent Literature 1 is used, air supply shortage becomes significant particularly at a central portion of the large-area unit cell.

Two factors are considered to contribute to the air supply shortage. The first factor is that, due to an increased distance between the external atmosphere having abundant air and a central portion of a cathode electrode of the large-area unit cell, the air is diffused for a longer distance as it approaches the central portion of the cathode electrode of the large-area unit cell, and thus air supply tends to become insufficient.

The other factor is that, since the distance required until water produced at the cathode electrode by power generation in the large-area unit cell is evaporated and diffused to the external atmosphere is also increased, water vapor partial pressure is increased and oxygen partial pressure is decreased in the vicinity of the central portion of the cathode electrode of the large-area unit cell.

For these reasons, in the large-area unit cell with a structure described in Patent Literature 1, air required for power generation cannot be fully supplied into the large-area unit cell. Accordingly, when the large-area unit cell is stacked in a layer thickness direction, it is indispensable to provide auxiliary equipment such as a fan. Even if the large-area unit cell serving as a power generation portion has a high output density, it has large size and weight when it is taken as a fuel cell system including auxiliary equipment for air supply and the like, and thus there has been raised a problem that output density per volume of the fuel cell system is reduced.

The present invention has been made to solve the aforementioned problems, and one object of the present invention is to provide a fuel cell stack having reduced thickness and weight by commonalizing or reducing constituent members of the fuel cell stack, and also having output density higher than that of a conventional fuel cell stack.

Solution to Problem

According to the investigation by the inventors of the present invention, it has become clear that, by replacing the unit cells constituting the fuel cell layer included in the fuel cell stack in the structure described in Non Patent Literature 1 with a composite unit cell and commonalizing or reducing constituent members of the fuel cell stack, a fuel cell stack capable of having reduced thickness and weight and also having a high output density can be obtained.

In addition, as a result of further investigation on the structure of the composite unit cell, the inventors of the present invention have found that the effect of the present invention can be obtained more significantly by applying a fuel permeation suppressing layer to the composite unit cell and employing a simple structure for electrical connection of fuel cell layers.

Specifically, a fuel cell stack according to the present invention is a fuel cell stack including two or more stacked fuel cell layers, and characterized in that at least one of the fuel cell layers is formed by arranging two or more composite unit cells in an identical plane with a gap provided therebetween, that the composite unit cell includes a plurality of unit cells and a fuel supply portion for supplying fuel to anode electrodes of the unit cells, and that the anode electrodes of the plurality of unit cells are arranged to face the fuel supply portion.

Preferably, the fuel cell stack is formed by stacking the fuel cell layers described above and a spacer layer including one or more spacers. More preferably, the fuel cell stack is formed by alternately stacking the fuel cell layers described above and the spacer layer.

Preferably, the spacer is provided on each of both end portions of either one or both of front and rear surfaces of the fuel cell layer. The spacer layer may be one large-area spacer that is in contact with all the composite unit cells constituting the fuel cell layer adjacent to the spacer layer.

The fuel supply portion may include a fuel flow channel through which the fuel flows, or may include a fuel transportation member made of a material exhibiting a capillary action to the fuel.

Preferably, the unit cell includes the anode electrode, an electrolyte membrane, and a cathode electrode in this order.

Preferably, the unit cell has an anode current collector on a surface of the anode electrode opposite to its surface in contact with the electrolyte membrane, and has a cathode current collector on a surface of the cathode electrode opposite to its surface in contact with the electrolyte membrane.

Preferably, the fuel cell stack further includes a fuel permeation suppressing layer between the fuel flow channel and the anode electrode described above.

Preferably, the fuel permeation suppressing layer is made of an electrically conductive composition having a mixture of carbon and one of sulfonated polyimide, sulfonated polyether ether ketone, sulfonated polyarylene ether sulfone, sulfonated polysulfone, fluorocarbon resin, epoxy resin, and polyolefin-based resin.

Preferably, the fuel cell stack further includes a fuel storage chamber for holding the fuel, and one end of the fuel transportation member described above is in contact with the fuel held in the fuel storage chamber. Preferably, the fuel cell stack includes a vaporization layer for supplying vapor of the fuel to the anode electrode, between the fuel transportation member and the anode electrode.

Preferably, the fuel cell stack includes a moisturization layer for holding water produced by power generation within the unit cell, on a side of the cathode current collector opposite to its side in contact with the cathode electrode. Preferably, the fuel cell stack includes a heat insulating layer on a side of the anode current collector opposite to its side in contact with the anode electrode. Preferably, the fuel cell stack has a space penetrating layers constituting the composite unit cell in a thickness direction, and the space is a produced gas exhaust path for exhausting produced gas produced at the anode electrodes.

Preferably, in a plane in a direction in which the fuel flows through the fuel flow channel, if a direction in which the unit cells are stacked is assumed as a depth direction and a direction perpendicular to the depth direction is assumed as a width direction, relationship $L_1/L_2$ between a length $L_1$ of a width of the fuel flow channel and a length $L_2$ of a width of the unit cell is not less than 0.6, and/or a depth of the fuel flow channel is not less than 0.1 mm.

Preferably, the spacer has insulating properties at least in a surface thereof. The spacer may have insulating properties at least in a thickness direction thereof.

Preferably, the spacer is made of a porous body.

Preferably, the spacer is made of a metal oxide porous body composed of titanium oxide, aluminum oxide, or zirconium oxide insulated by an oxide, a metal-polymer composite body insulated by applying or modifying a hydrophilic polymer or attaching a hydrophilic polymer film on a surface of a metal porous body, or a porous ceramic.

Preferably, the fuel cell stack further includes a casing covering the fuel cell stack described above, and the casing is in contact with the one or more spacers. Preferably, such a casing is made of one or more materials selected from the group consisting of Cu, Al, Fe, Ti, and stainless.

Preferably, two unit cells included in the composite unit cell are connected in parallel by electrically connecting two anode current collectors included in the fuel cell layer and electrically connecting two cathode current collectors included in the fuel cell layer.

Preferably, two adjacent fuel cell layers are connected in series by electrically connecting the cathode current collector in one of the two adjacent fuel cell layers and the anode current collector in the other fuel cell layer.

Preferably, the anode current collector includes an anode current collector through-hole penetrating in a thickness direction thereof, the cathode current collector includes a cathode current collector through-hole penetrating in a thickness direction thereof, the anode current collector through-hole and the cathode current collector through-hole are provided in an identical fuel cell layer, at different positions in a layer-stacking direction of the fuel cell layer, the cathode current collector through-hole in one of two adjacent fuel cell layers and the anode current collector through-hole in the other fuel cell layer are provided at a substantially identical position in a direction in which the fuel cell layers are stacked, and the anode current collector through-hole in one fuel cell layer and the cathode current collector through-hole in the other fuel cell layer are provided at a substantially identical position in the direction in which the fuel cell layers are stacked.

Preferably, the anode current collector through-hole in one of the two adjacent fuel cell layers and the cathode current collector through-hole in the other fuel cell layer are connected by a conductive wire, and two cathode current collector through-holes included in one fuel cell layer described above are connected by a conductive wire.

Preferably, the anode current collector through-hole in one of the two adjacent fuel cell layers and the cathode current collector through-hole in the other fuel cell layer are connected by a conductive wire, the cathode current collector through-hole in one fuel cell layer described above and the anode current collector through-hole in the other fuel cell layer described above are connected by a conductive wire having a nonconductor portion, and the nonconductor portion is provided to the conductive wire to electrically insulate the cathode current collector in one fuel cell layer from the anode current collector in the other fuel cell layer.

Preferably, an anode current extracting portion protruding outward from a side surface of the anode current collector in one of the two adjacent fuel cell layers and a cathode current extracting portion protruding outward from a side surface of the cathode current collector in the other fuel cell layer are connected by a conductive wire via soldering.

Preferably, a cathode current extracting portion protruding outward from a side surface of the cathode current collector in one fuel cell layer and an anode current extracting portion protruding outward from a side surface of the anode current collector in the other fuel cell layer are connected by a conductive wire having a nonconductor portion, via soldering, and the nonconductor portion is provided to the conductive wire to electrically insulate the cathode current collector in one fuel cell layer from the anode current collector in the other fuel cell layer.

Preferably, the composite unit cell and/or the spacer are/is in a shape of an elongated strip.

The present invention is also directed to an electronic device provided with the fuel cell stack described above.

Advantageous Effects of Invention

According to the present invention, a fuel cell stack having reduced thickness and weight by commonalizing or reducing constituent members of the fuel cell stack, and also having a high output density can be provided.

BRIEF DESCRIPTION OF DRAWINGS

FIG. 1 shows perspective, top, and side views of a preferable exemplary fuel cell stack according to the present invention, in which FIG. 1(A) is a perspective view thereof, FIG. 1(B) is a top view thereof, and FIG. 1(C) is a side view thereof.

FIG. 2 shows cross sectional views illustrating a difference in structure between the fuel cell stack according to the present invention and a conventional fuel cell stack, in which FIG. 2(A) is a cross sectional view showing fuel cell layers used in the conventional fuel cell stack, and FIG. 2(B) is a cross sectional view showing fuel cell layers used in the fuel cell stack according to the present invention.

FIG. 6(A) is a top view of a fuel cell stack in a case where the fuel is supplied to each fuel cell layer without using auxiliary equipment, and FIG. 6(B) is a side view of the fuel cell stack shown in FIG. 6(A).

FIG. 9 shows perspective, top, and side views of a preferable exemplary fuel cell stack according to the present invention, in which FIG. 9(A) is a perspective view thereof, FIG. 9(B) is a top view thereof, and FIG. 9(C) is a side view thereof.

FIG. 10 shows perspective, top, and side views of a preferable exemplary fuel cell stack according to the present invention, in which FIG. 10(A) is a perspective view thereof, FIG. 10(B) is a top view thereof, and FIG. 10(C) is a side view thereof.

FIG. 11 shows perspective, top, and side views of a preferable exemplary fuel cell stack according to the present invention, in which FIG. 11(A) is a perspective view thereof, FIG. 11(B) is a top view thereof, and FIG. 11(C) is a side view thereof.

FIG. 12 shows perspective, top, and side views of a preferable exemplary fuel cell stack according to the present invention, in which FIG. 12(A) is a perspective view thereof, FIG. 12(B) is a top view thereof, and FIG. 12(C) is a side view thereof.

FIG. 13(A) is a perspective view showing a fuel cell stack according to the present invention and a casing covering the same, and FIG. 13(B) is a cross sectional view taken by cutting the fuel cell stack shown in FIG. 13(A) covered with the casing in a direction in which the fuel cell layers are stacked.

FIG. 30(A) is a graph showing a result obtained by measuring a current-potential curve in the fuel cell stack fabricated in the example, and FIG. 30(B) is a graph showing a result obtained by measuring volume output density of the fuel cell stack fabricated in the example.

FIG. 33(A) is a graph showing a result obtained by measuring a current-potential curve in the fuel cell stack fabricated in the example, and FIG. 33(B) is a graph showing a result obtained by measuring volume output density of the fuel cell stack fabricated in the example.

FIG. 36(A) is a graph showing a result obtained by measuring a current-potential curve in the fuel cell stack fabricated in the comparative example, and FIG. 36(B) is a graph showing a result obtained by measuring volume output density of the fuel cell stack fabricated in the comparative example.

DESCRIPTION OF EMBODIMENTS

Figure 1:
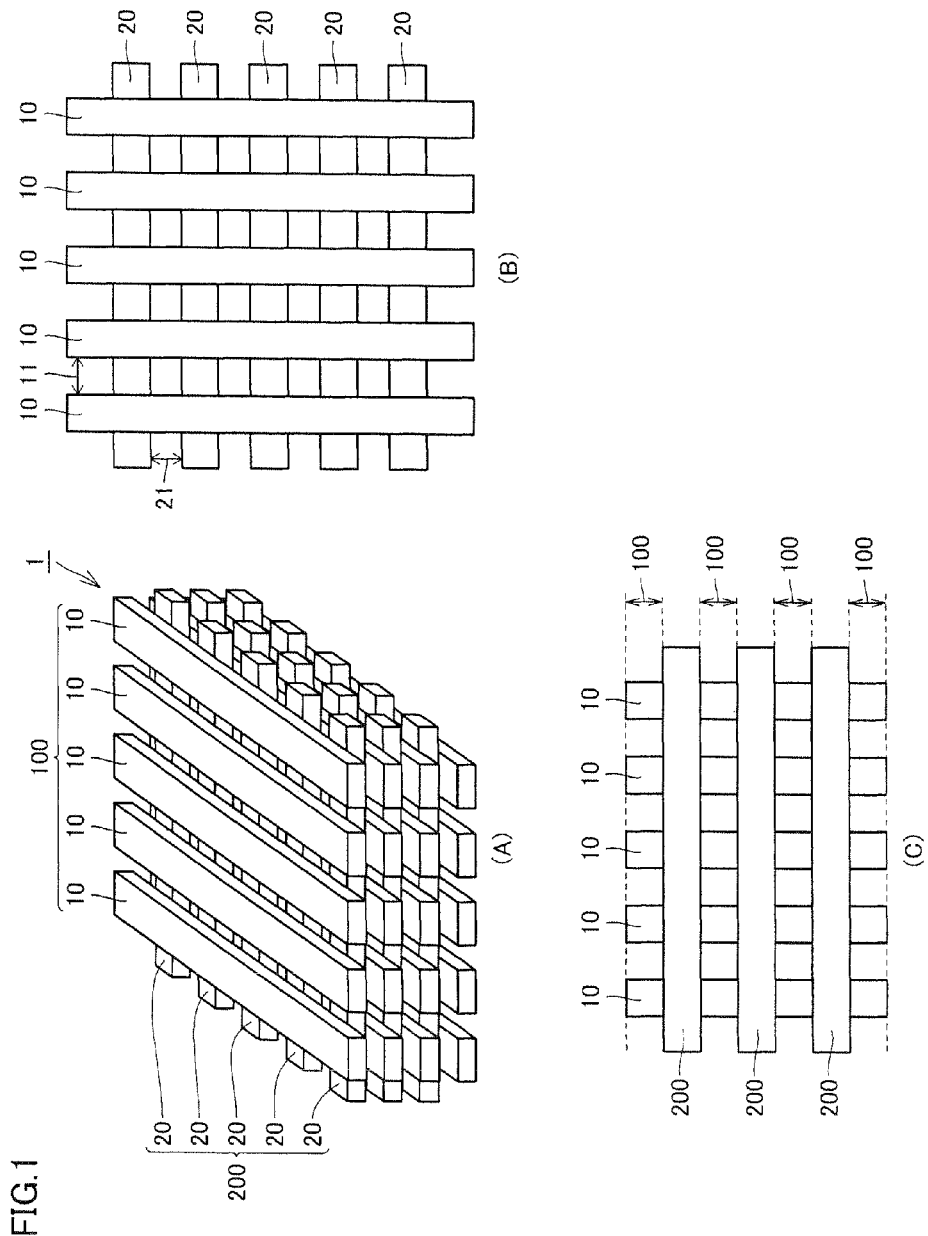

Hereinafter, embodiments of the present invention will be described. In the drawings of the present invention, identical or corresponding parts will be designated by the same reference numerals.

(1) Fuel Cell Stack

Embodiment 1

A description will be given below, occasionally describing a case where an aqueous methanol solution is used as fuel and air is used as an oxidizing agent, for convenience of description. However, the present invention is not limited to such fuel and oxidizing agent.

Specifically, any of gaseous fuel and liquid fuel can be used as fuel, and liquid fuel may be vaporized and supplied in the form of a gas phase. Examples of such gaseous fuel can include hydrogen, DME, methane, butane, ammonia, and the like. Examples of liquid fuel can include alcohols such as methanol and ethanol, acetals such as dimethoxymethane, carboxylic acids such as formic acid, esters such as methyl formate, hydrazine, and the like, and aqueous solutions thereof. Fuel is not limited to one type of gaseous fuel and liquid fuel described above, and a mixture of two or more types may be used as fuel.

Among these fuels, it is preferable to use an aqueous methanol solution as liquid fuel, because it has an excellent energy density per volume.

Further, examples of an oxidizing agent used for a fuel cell stack according to the present embodiment can include oxygen, hydrogen peroxide, nitric acid, and the like. However, it is preferable to use oxygen in the air, from the viewpoint of cost for the oxidizing agent.

FIG. 1 shows perspective, top, and side views of a preferable exemplary fuel cell stack according to the present embodiment, in which FIG. 1(A) is a perspective view thereof, FIG. 1(B) is a top view thereof, and FIG. 1(C) is a side view thereof.

As shown in FIG. 1, a fuel cell stack 1 according to the present embodiment is formed by alternately stacking four fuel cell layers 100 and three spacer layers 200, and each fuel cell layer 100 is formed by arranging five composite unit cells 10 in parallel in an identical plane with a gap 11 provided therebetween. Here, composite unit cell 10 includes two unit cells (not shown) and one fuel supply portion for supplying fuel to anode electrodes (not shown) of the unit cells, and the anode electrodes of the two unit cells are arranged to face the one fuel supply portion. Here, the fuel supply portion is a portion for supplying fuel held for example in a fuel tank to the anode electrodes.

On the other hand, each spacer layer 200 is formed by arranging five spacers 20 in parallel in an identical plane with a gap 21 provided therebetween, and spacers 20 are arranged perpendicular to composite unit cells 10. Gap 11 between the composite unit cells formed in fuel cell layer 100 and gap 21 between the spacers formed in spacer layer 200 each have a rectangular solid shape.

By arranging the composite unit cells and the spacers as described above, the area in which gap 11 between the composite unit cells is in contact with spacers 20 is identical. Further, since composite unit cells 10 also have an equal height, a plurality of gaps 11 have an identical spatial volume. In addition, gap 11 between the composite unit cells has an equal cross sectional area in any cross section in a vertical direction with respect to a direction in which the fuel cell layers are stacked. It is to be noted that the fuel cell stack according to the present invention is not limited to that with a structure shown in FIG. 1. As long as the fuel cell stack includes two or more fuel cell layers, and at least one of the fuel cell layers is formed by arranging two or more composite unit cells in an identical plane with a gap provided therebetween, the fuel cell stack with any structure is included in the scope of the present invention, and the fuel cell stack is not required to include spacer layer 200.

Further, although the present embodiment describes a case where anode electrodes of two unit cells are arranged to face a fuel supply portion, it is needless to say that anode electrodes of three or more unit cells may be arranged to face a fuel supply portion. That is, as long as a composite unit cell is provided such that anode electrodes of a plurality of unit cells are arranged to face a fuel supply portion, the composite unit cell does not depart from the scope of the present invention.

However, from the viewpoint of stably supplying oxygen to cathode electrodes of the unit cells constituting fuel cell layer 100, in the fuel cell stack according to the present invention, it is preferable to alternately stack fuel cell layers 100 and spacer layer 200, it is more preferable that spacer layer 200 includes two or more spacers 20, and it is further preferable that two or more spacers 20 constituting spacer layer 200 are arranged in parallel to each other in an identical direction with gap 21 provided therebetween. If spacer layer 200 is included as described above, stacking does not necessarily have to be performed in the order as shown in FIG. 1, and, for example, spacer layer 200 may be formed at either one or both of the lowermost layer and the uppermost layer of the layers constituting the fuel cell stack. Fuel cell layers 100 and spacer layer 200 do not necessarily have to be alternately stacked, and it is needless to say that fuel cell layers 100 or spacer layers 200 may be continuously stacked.

Although a case where fuel is supplied using a fuel flow channel as the fuel supply portion will be described below, means for supplying the fuel is not limited to using a fuel flow channel, and, for example, the fuel may be supplied by a fuel transportation member made of a material exhibiting a capillary phenomenon to the fuel. The fuel transportation member is made of a hydrophilic porous body, and fuel supply using the same will be described later.

In a conventional fuel cell stack, fuel cell layer 100 has been configured to have a structure in which a unit cell is arranged on only a single surface of a fuel flow channel (hereinafter also referred to as a "single-surface unit cell structure). However, the fuel cell stack according to the present embodiment is characterized by employing a fuel cell layer formed by arranging two or more composite unit cells in an identical plane with a gap provided therebetween, as at least one of fuel cell layers 100. By applying such composite unit cell 10, one fuel flow channel can be provided for two unit cells (i.e., two fuel flow channels can be commonalized into one), instead of a conventional technique in which one fuel flow channel is formed for one unit cell. Therefore, the fuel cell stack can have a reduced thickness, and its output density can be further increased.

Figure 2:
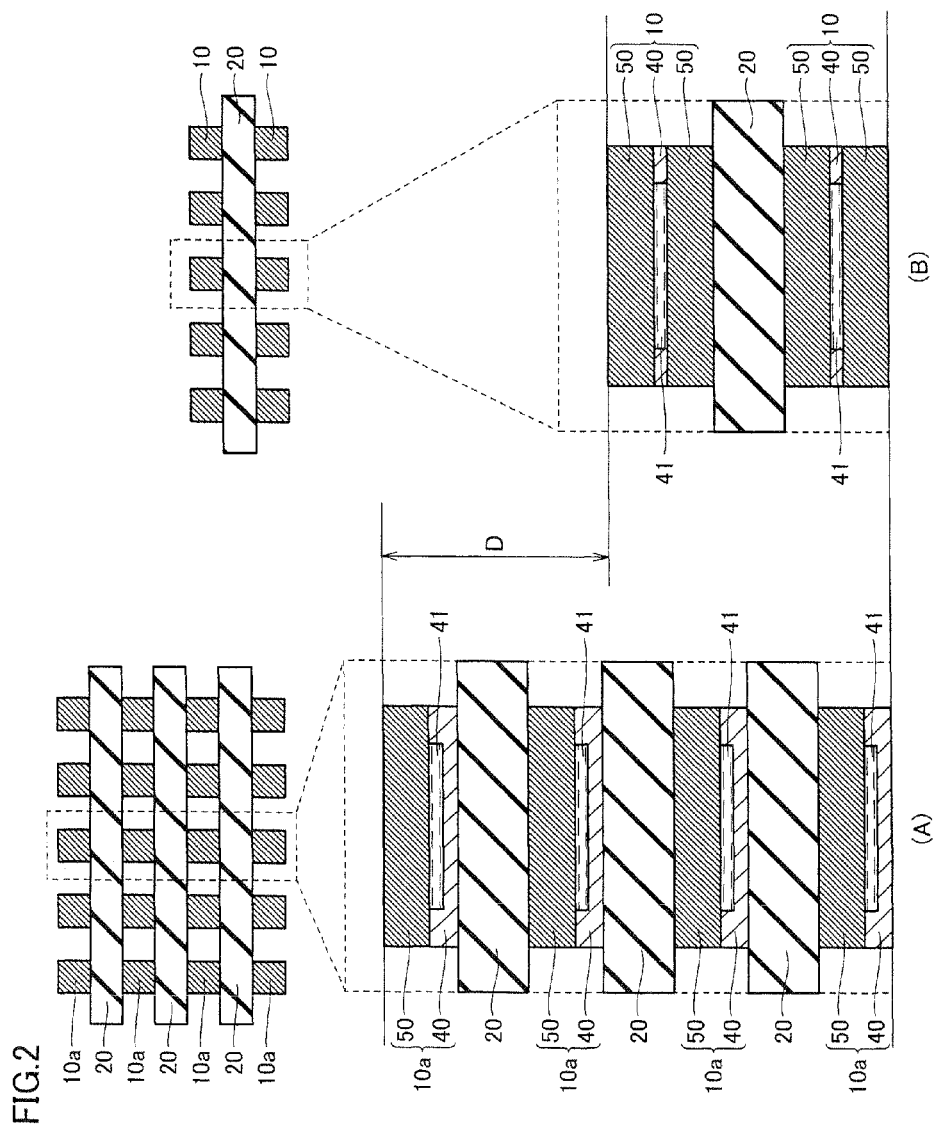

FIG. 2 shows cross sectional views illustrating a difference in structure between the fuel cell stack according to the present embodiment and a conventional fuel cell stack, in which FIG. 2(A) is a cross sectional view showing fuel cell layers used in the conventional fuel cell stack, and FIG. 2(B) is a cross sectional view showing fuel cell layers used in the fuel cell stack according to the present embodiment. FIG. 2 shows the fuel cell stacks each including four unit cells 50 to accurately understand the difference in structure between the conventional fuel cell stack and the fuel cell stack according to the present embodiment.

By forming fuel cell layer 100 using composite unit cell 10 as in the fuel cell stack according to the present embodiment (FIG. 2(B)), an electrode area of four fuel cell layers 100*a* in the conventional fuel cell stack can be achieved by two fuel cell layers.

With such a structure, two unit cells 50 can use one fuel flow channel 41 in common, and the number of fuel flow channels 41 can be reduced to half (i.e., in FIG. 2, reduced from four to two). In addition, since the spacer layer can also be used in common, the number of the spacer layers can be reduced from three to one in FIG. 2. By reducing the numbers of fuel flow channels 41 and the spacer layers as described above, the fuel cell stack can have a considerably reduced thickness (i.e., reduced by the amount indicated by a width D in FIG. 2) while having an electrode area equal to that of the conventional fuel cell stack.

In addition, although not shown in FIG. 2, the number of fuel flow channel entrances and the number of fuel flow channel exits can be reduced in accordance with the reduction in the number of fuel flow channels 41 as described above. Thereby, parts associated with fuel supply, including a tube from a fuel holding portion such as a fuel cartridge to a fuel flow channel entrance and a tube from a fuel flow channel exit to the fuel holding portion, can be reduced. Further, by reducing these parts, the size and weight of the fuel cell stack can be further reduced, and cost for manufacturing the fuel cell stack can also be reduced.

(Fuel Supply in Fuel Cell Stack)

Since the number of the fuel cell layers is reduced in the fuel cell stack according to the present embodiment when compared with the conventional fuel cell stack, the number of fuel flow channels 41 can also be reduced. Thereby, unevenness in pressure (unevenness in back pressure) while supplying the fuel to fuel flow channels 41 can be reduced, and thus the fuel can be supplied further uniformly to fuel flow channels 41.

In addition, through one fuel flow channel, the same amount of fuel can be supplied to the anode electrodes of unit cells 50 arranged on front and rear surfaces thereof. Thus, in the fuel cell stack according to the present embodiment, the fuel can be supplied uniformly to the anode electrodes of the unit cells, when compared with a structure in which one unit cell is provided for each fuel flow channel as in the conventional fuel cell stack. By uniformly supplying the fuel to fuel flow channels 41 in the fuel cell layers, variations in crossover amounts of the fuel in the composite unit cells as well as outputs and heat generation amounts of the unit cells can also be reduced. Suppression of these variations can improve stability of an output of the fuel cell stack.

Non-uniformity in fuel supply within the fuel cell stack will be described more specifically. Even if the fuel cell layers are manufactured through a completely identical process, the fuel cell layers have variations in a groove depth and a groove width of fuel flow channel 41, and also have variations in temperature increase when the fuel cell stack is used. Therefore, it is difficult to uniformly supply the fuel to fuel flow channels 41 in a plurality of fuel cell layers.

Specifically, in the cases where there is a fuel cell layer having a fuel flow channel with a groove depth shallower than that of other fuel cell layers, where there is a fuel cell layer having fuel flow channel 41 with a groove width shorter than that of other fuel cell layers, where the fuel cell layers have different temperatures and thus different crossover amounts, and the like, different pressures are required to supply the fuel to fuel flow channels 41, depending on fuel flow channels 41 in the respective fuel cell layers. The magnitude of variations in the pressure required to supply the fuel among the fuel cell layers becomes significant with an increase in the number of the fuel cell layers and in the length of fuel flow channels 41.

However, since the number of fuel flow channels 41 can be reduced by configuring the fuel cell stack as in the present embodiment, these variations in the pressure required to supply the fuel can be suppressed. As a result, a load on a specific fuel cell layer (for example, a load due to heat, excess voltage, or the like) can be suppressed, preventing a local deterioration of the fuel cell stack.

(Air Supply in Fuel Cell Stack)

Air supply to the cathode electrodes at front and rear surfaces of composite unit cells included in each fuel cell layer is performed by opening at least a portion of a surface of the fuel cell stack and allowing air in the atmosphere to flow into the fuel cell stack from the opened portion, or performed by allowing air to flow into the fuel cell stack using auxiliary equipment such as an air pump and a fan. In any of these cases, the air can supplied to cathode catalyst layers in the composite unit cells included in the fuel cell stack, through gaps 11 provided between composite unit cells 10 and gaps 21 provided between spacers 20.

Figure 3:
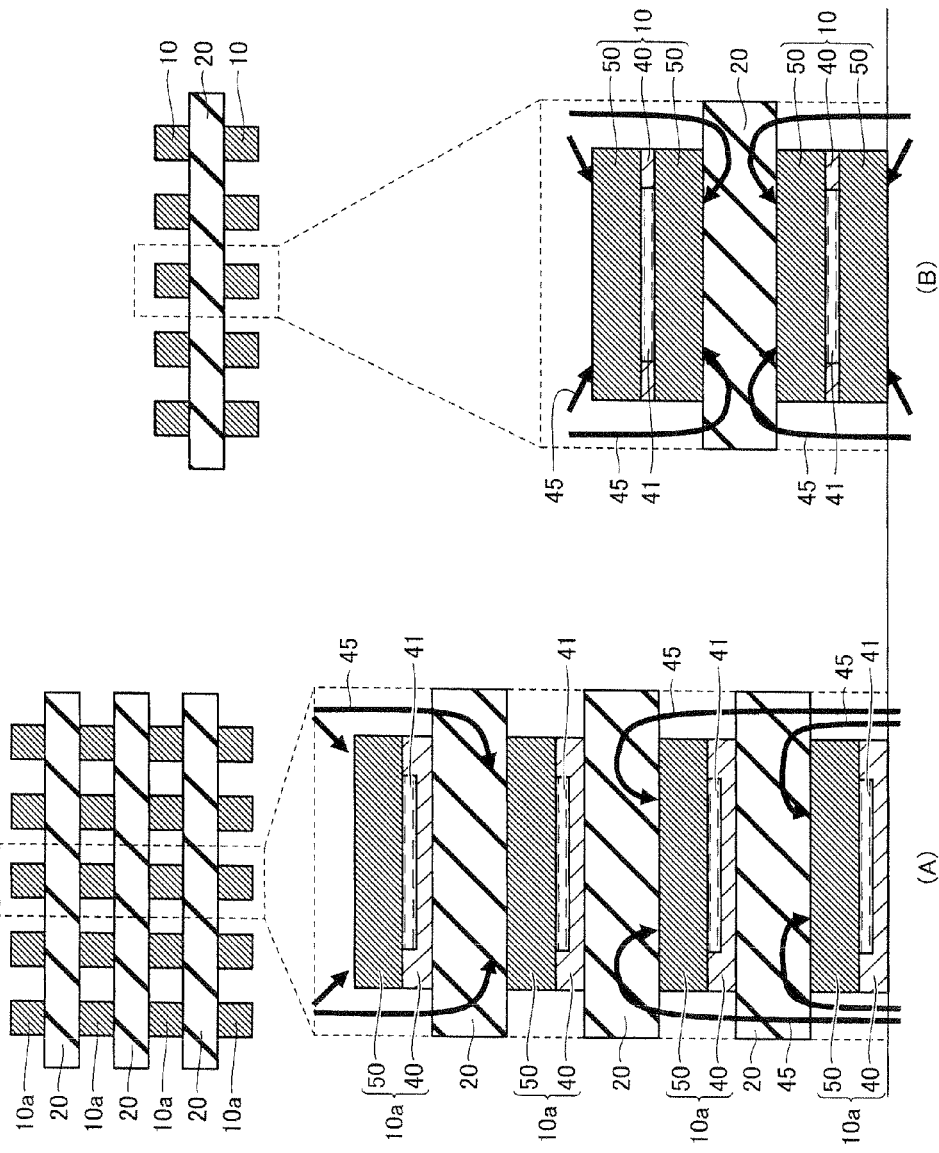
FIG. 3 shows cross sectional views illustrating, in a comparative manner, FIG. 3(A) air supply paths in a single-surface unit cell structure of the conventional fuel cell stack, and FIG. 3(B) air supply paths in a composite unit cell structure of the fuel cell stack according to the present invention.

FIG. 3 shows cross sectional views illustrating, in a comparative manner, air supply paths in a single-surface unit cell structure of the conventional fuel cell stack (FIG. 3(A)), and air supply paths in a composite unit cell structure of the fuel cell stack according to the present embodiment (FIG. 3(B)). FIG. 3 shows cross sections of the fuel cell stacks, and schematically shows supply paths 45 for air supplied from upper and lower surfaces of each fuel cell stack, indicated by arrows. Since the fuel cell stack according to the present embodiment has a structure in which air is supplied three-dimensionally, the air is not necessarily supplied through the illustrated paths only.

As shown in FIG. 3, the fuel cell stack according to the present embodiment has a thickness smaller than that of the conventional fuel cell stack as constituent members can be commonalized and removed, and distances between an external atmosphere having abundant oxygen and the cathode electrodes of unit cells 50 are reduced. Thereby, oxygen can be supplied to the cathode electrodes of unit cells 50 more efficiently.

On the other hand, in the conventional fuel cell stack, since the cathode electrode of the unit cell in each fuel cell layer is provided at a single surface, ease of air supply to the cathode electrodes differs depending on an orientation of installing the fuel cell stack, that is, depending on whether the fuel cell stack is installed with the cathode electrodes being oriented upward or downward.

However, by employing a structure in which the anode electrodes of unit cells 50 face the both surfaces of fuel flow channel 41 as in the fuel cell stack according to the present embodiment, heated air can be exhausted from an upper portion of the fuel cell stack and air can be taken in from side portions and a lower portion of the fuel cell stack, regardless of the orientation of installing the fuel cell stack, that is, regardless of whether or not the fuel cell stack is installed with the cathode electrodes being oriented upward or downward. Thus, the degree of freedom in arranging the fuel cell stack can be significantly improved.

(Air Diffusion in Fuel Cell Stack)

Figure 4:
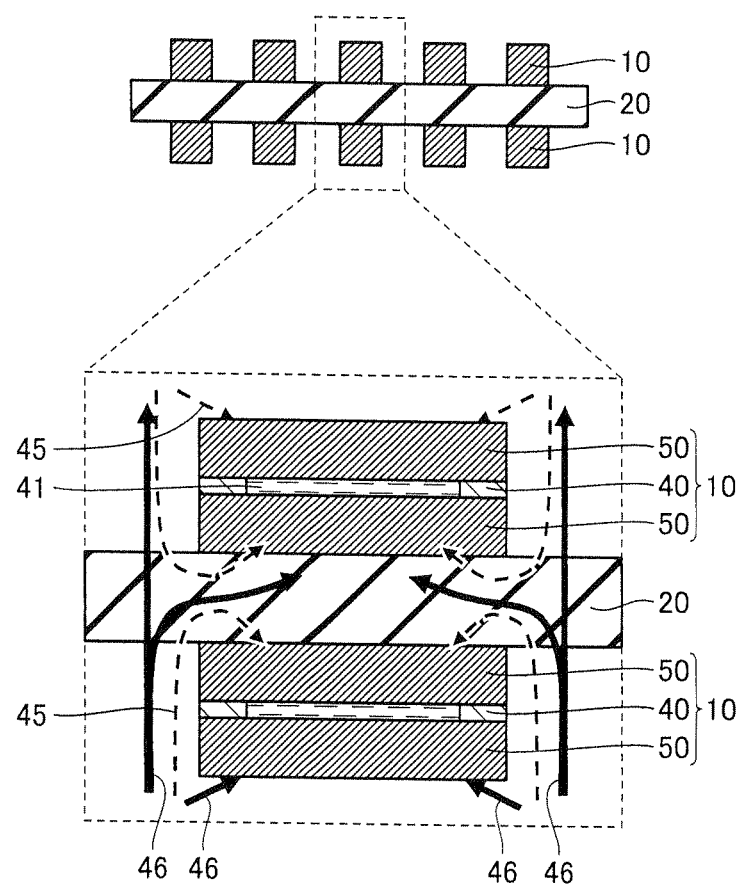
FIG. 4 is a view showing paths for air diffusion caused by heat convection in the composite unit cell structure of the fuel cell stack according to the present invention.

FIG. 4 is a view showing paths for air diffusion caused by heat convection in the composite unit cell structure of the fuel cell stack according to the present embodiment, in which arrows indicated by solid lines represent diffusion paths 46 for air due to heat diffusion, and arrows indicated by dotted lines represent supply paths 45 for air. By employing a structure as that in the fuel cell stack according to the present embodiment, air diffusion caused by heat convection can be efficiently performed.

A more specific description will be given. Heat is generated within the fuel cell stack by power generation at the anode electrodes and by a reaction of fuel that is crossed over at the cathode electrodes. The heat produces an ascending air current within the fuel cell stack, pushing the air within the fuel cell stack upward from below. Thereby, heat diffusion is caused within the fuel cell stack, and air in the external atmosphere can be taken in from four side surfaces and the bottom surface of the fuel cell stack. Thus, the air can be supplied more easily to lower unit cell 50 of two unit cells 50 constituting composite unit cell 10.

Further, since the distances between the cathode electrodes of the composite unit cell included in each fuel cell layer and the external atmosphere are reduced, diffusion distances of water vapor for evaporating produced water produced by the reaction at the cathode electrodes are also reduced. Thereby, partial pressure of the water vapor within the fuel cell stack can be maintained lower and oxygen partial pressure within the fuel cell stack can be maintained higher, when compared with those in the conventional fuel cell stack. Therefore, there is no need to supply oxygen using auxiliary equipment such as a fan.

<Fuel Cell Layer>

Hereinafter, constituent members constituting the fuel cell stack according to the present embodiment will be described with reference to FIG. 1.

Fuel cell stack 1 according to the present embodiment includes two or more stacked fuel cell layers 100, and a power generation reaction is performed in fuel cell layer 100. Each fuel cell layer 100 may be made of one large-area unit cell, may include two or more unit cells (not shown), or may include one, two or more composite unit cells 10. However, the fuel cell stack is characterized in that at least one of fuel cell layers 100 constituting the fuel cell stack is formed by arranging two or more composite unit cells 10 in an identical plane with gap 11 provided therebetween.

By arranging two or more composite unit cells 10 with a gap provided therebetween in at least one of fuel cell layers 100 as described above, one fuel flow channel can be formed for two unit cells (i.e., two fuel flow channels can be commonalized into one), instead of a conventional technique in which one fuel flow channel is formed for one unit cell.

Therefore, the fuel cell stack can have a reduced thickness, and the output density of fuel cell stack 1 can be further increased.

It is to be noted that, from the viewpoint of increasing the output density of the fuel cell stack, it is needless to say that two or more composite unit cells 10 are preferably arranged with a gap provided therebetween in as many fuel cell layers as possible among the fuel cell layers constituting the fuel cell stack.

<Composite Unit Cell>

In the present embodiment, composite unit cell 10 has a structure including two unit cells and a fuel flow channel for supplying fuel to anode electrodes of the unit cells, in which the anode electrodes of the two unit cells are arranged to face the fuel flow channel.

Composite unit cell 10 included in fuel cell layer 100 according to the present embodiment preferably has a shape having a longitudinal direction (hereinafter also referred to as a "shape of an elongated strip") within fuel cell layer 100, and more preferably has a rectangular solid shape. By using composite unit cells 10 having the shape of an elongated strip, a plurality of spacers 20 can be stably stacked over gaps 11, and thus a stacked structure of the fuel cell stack can be established more easily.

Further, within fuel cell layer 100, two or more composite unit cells 10 are preferably arranged with a regular gap provided therebetween in the longitudinal direction of composite unit cells 10, and more preferably arranged in parallel with regular gap 11 provided therebetween.

<Spacer Layer>

Fuel cell stack 1 according to the present embodiment preferably has spacer layer 200 between fuel cell layers 100. Since fuel cell stack 1 includes spacer layer 200 in this manner, oxygen in the air can be efficiently supplied to the cathode electrodes of the unit cells included in fuel cell layers 100, and thus power generation efficiency of fuel cell stack 1 can be improved.

The spacer layer preferably includes one, two, or more spacers 20. If the spacer layer includes two or more spacers 20, spacers 20 are preferably arranged in an identical plane within spacer layer 200, with a gap provided therebetween.

<Spacer>

In the present embodiment, spacer 20 is provided between fuel cell layers 100 for easily supplying air to the cathode electrodes of composite unit cells 10 in each fuel cell layer 100.

Any of spacers 20 constituting spacer layer 200 preferably has a shape of an elongated strip, and more preferably has a rectangular solid shape. By forming spacer 20 to have the shape of an elongated strip, a plurality of composite unit cells 10 can be stably stacked over gaps 21 between spacers 20, and thus the stacked structure of fuel cell stack 1 according to the present embodiment can be established more easily.

Further, within identical spacer layer 200, spacers 20 are preferably arranged in a longitudinal direction of spacers 20, more preferably arranged in parallel with regular gap 21 provided therebetween, and further preferably arranged such that spacers 20 constituting spacer layer 200 are perpendicular to composite unit cells 10.

In the fuel cell stack according to the present embodiment, if two adjacent fuel cell layers 100 have the composite unit cell structure and spacer layer 200 is included between two fuel cell layers 100, a spacer whose surface layer is a nonconductor is preferably used as spacers 20 constituting spacer layer 200. This is because, if spacer 20 whose surface has electrical conductivity is used, electrical conduction is established between the cathode electrodes of composite unit cells 10 included in adjacent fuel cell layers 100, and the fuel cell stack cannot serve as a power generation device.

Further, spacer 20 described above may have insulating properties at least in a thickness direction thereof. Such spacer 20 can also avoid electrical conduction between the cathode electrodes of composite unit cells 10 included in adjacent fuel cell layers 100.

Further, spacer 20 described above is preferably made of a porous body. Spacer 20 used in the conventional fuel cell stack has been required to have a low electrical resistance from the viewpoint of increasing power generation efficiency, and a spacer having a low porosity fabricated by giving electrical conductivity to a porous body and applying an increased pressing force thereto and the like has been used.

However, since there is no need to give electrical conductivity to the spacer in the fuel cell stack according to the present embodiment, a porous body having a high porosity can be used. Thereby, diffusion resistance of air (oxygen included in the air) within the spacer can be reduced, and thus a sufficient amount of air can be supplied to the cathode catalyst layers included in the cathode electrodes.

Examples of a material form for such spacer 20 can include one type or more selected from the group consisting of a mesh, a woven fabric, a non-woven fabric, a foamed body, and a sintered body.

In a case where a fluorine-based material is used as an electrolyte membrane constituting the composite unit cell, crossover of the fuel is likely to occur. This causes a reaction in which the fuel is oxidized at the cathode electrode and water is produced around the cathode electrode. The water covers the cathode electrode, causing a phenomenon which interferes with supply of an oxidizing agent to the cathode electrode (hereinafter also referred to as a "flooding phenomenon"). Thus, a reduction reaction of the oxidizing agent at the cathode electrode is disturbed, and the power generation efficiency of the fuel cell stack is reduced, which is a well known problem.

Accordingly, from the viewpoint of preventing the above flooding phenomenon, it is preferable to use a hydrophilic porous body as the material form for spacer 20. By using a porous body for spacer 20, spacer 20 absorbs the water produced at the cathode electrode and suppresses occurrence of the flooding phenomenon. Thus, reduction in the power generation efficiency of the fuel cell stack can be suppressed.

Examples of a material constituting such spacer 20 can include a resin excellent in acid resistance and chemical resistance such as polyimide, PVDF (polyvinylidene fluoride), PTFE (polytetrafluoroethylene), and PEEK (registered trademark), or a polymer non-woven fabric having a surface made of a hydrophilic porous body such as cotton and polyester, or a metal-polymer composite body formed by applying or modifying a hydrophilic polymer or attaching a hydrophilic polymer film on only a surface of a metal oxide such as titanium oxide, silica, aluminum oxide, and zirconium oxide, or a porous ceramic.

Further, from the viewpoint of improving heat radiation properties within the fuel cell stack, spacer 20 can be made of a material such as a metal oxide porous body composed of titanium oxide, aluminum oxide, zirconium oxide, or the like insulated by an oxide, a metal-polymer composite body insulated by applying or modifying a hydrophilic polymer or attaching a hydrophilic polymer film on a surface of a metal porous body, or a porous ceramic. A technique of improving heat radiation properties within the fuel cell stack by spacers 20 using these materials will be described later.

In addition, although the thickness of spacer 20 is not particularly limited, it is preferably not less than 0.2 mm from the viewpoint of ensuring a gap for air supply and maintaining strength, and preferably not more than 2 mm from the viewpoint of reducing the thickness and size of the fuel cell stack. If the thickness of spacer 20 is less than 0.2 mm, there is a possibility that the gap for air supply cannot be fully ensured and the strength cannot be maintained. On the other hand, if the thickness of spacer 20 exceeds 2 mm, the fuel cell stack becomes larger, which may cause a deviation from the intended purpose.

<Composite Unit Cell and Spacer>

In fuel cell stack 1 according to the present embodiment, from the viewpoint of allowing the spacers to efficiently absorb the water produced at the cathode electrodes of composite unit cells 10 in fuel cell layers 100, it is not preferable that contact between the fuel cell layer and the spacer layer is sufficient in some locations but insufficient in some locations. Thus, it is preferable that composite unit cells 10 within one fuel cell layer have an equal height (i.e., the thickness of fuel cell layer 100 is equal), and that spacers 20 in an identical spacer layer also have an equal height (i.e., the thickness of spacer layer 200 is equal).

Further, it is preferable that composite unit cells 10 included in one fuel cell layer 100 have an identical shape, and that spacers 20 included in one spacer layer 200 also have an identical shape. Here, "having an identical shape" is not limited to a case where the composite unit cells included in one fuel cell layer have an exactly identical shape. Even in a case where a difference between outer dimensions (the "outer dimensions" used herein refer to a width, a height, and a length) of the largest composite unit cell and outer dimensions of the smallest composite unit cell of the composite unit cells included in one fuel cell layer is within ±0.25 mm, the composite unit cells are all considered to have an identical shape.

The definition of the outer dimensions of the composite unit cells described above also applies to outer dimensions of the spacers included in one spacer layer, and "having an identical shape" is also not limited to a case where the spacers included in one spacer layer have an exactly identical shape. Even in a case where a difference between outer dimensions of the largest spacer and outer dimensions of the smallest spacer of the spacers included in one spacer layer is within ±0.25 mm, the spacers included in the spacer layer are all considered to have an identical shape.

By forming the composite unit cells and the spacers to have identical shapes, variations in characteristics of the fuel cell layers due to the difference in shape among the composite unit cells can be suppressed. In addition, since the composite unit cells having an identical shape and the spacers having an identical shape can be each manufactured through one manufacturing process, costs for manufacturing them can be reduced.

<Stacked Structure of Fuel Cell Stack>

Preferably, in the stacked structure of the fuel cell stack according to the present embodiment, spacer layer 200 is stacked on the fuel cell layer such that the longitudinal direction of composite unit cells 10 constituting fuel cell layer 100 is perpendicular to the longitudinal direction of spacers 20 constituting spacer layer 200, as shown in FIG. 1. With such a construction, an upper surface of gap 11 between composite unit cells 10 in fuel cell layer 100 partly comes into contact with spacers 20 constituting spacer layer 200.

By stacking fuel cell layers 100 and spacer layers 200 as described above, when seen from a direction in which fuel cell layers 100 are stacked, gaps 11 between composite unit cells 10 and gaps 21 between spacers 20 have a rectangular solid shape, and are aligned to be perpendicular to each other.

As shown in FIG. 1(B), composite unit cells 10 and spacers 20 are formed without having contact with each other, except for intersecting regions where composite unit cells 10 and spacers 20 intersect with each other. By aligning composite unit cells 10 and spacers 20 to be perpendicular to each other, diffusion distances of air to the inside of the intersecting regions are reduced, and thus air can also be supplied to the cathode electrodes in the intersecting regions.

Gaps 11 in fuel cell layer 100 and gaps 21 in spacer layer 200 constituting the fuel cell stack shown in FIG. 1 are formed to communicate with each other in a three-dimensional manner. In addition, all of the gaps (i.e., four gaps 11 and four gaps 21 in the fuel cell stack of FIG. 1) communicate with each other. With such a construction, air flowing into the fuel cell stack can be supplied to the inside of the fuel cell stack through the communicating gaps, by natural convection or diffusion.

Specifically, the air within the fuel cell stack is heated by heat caused by power generation and released to the outside through the communicating gaps by convection, and air is efficiently taken in from the side surfaces and the lower surface of the fuel cell stack. This facilitates natural diffusion of the air within the fuel cell stack. Therefore, there is no need to use auxiliary equipment for air supply such as an air pump and a fan, and the fuel cell stack can have a reduced size.

Further, even in a case where auxiliary equipment such as an air pump and a fan is provided, force of wind required to supply air to the inside of the fuel cell stack can be reduced. This can reduce power consumption by the auxiliary equipment and downsize the auxiliary equipment. In addition, even in a case where the fuel cell stack is mounted in an electronic device and for example upper and lower surfaces of the fuel cell stack are blocked, air can be exhausted and taken in from the side surfaces thereof.

<Gap>

In the fuel cell stack shown in FIG. 1, gap 11 between composite unit cells 10 arranged within fuel cell layer 100 and gap 21 between spacers 20 arranged within spacer layer 200 are not particularly limited, and can have an interval of any length as long as they have an interval through which air can pass by diffusion or natural convection. Gap 11 between the composite unit cells and gap 21 between the spacers are preferably not less than 0.001 cm and not more than 1 cm, and more preferably not less than 0.05 cm and not more than 0.2 cm. If gap 11 between the composite unit cells and gap 21 between the spacers are less than 0.001 cm, there is a possibility that the air cannot be fully supplied to the cathode electrodes of the unit cells. If gaps 11 and 21 exceed 1 cm, the fuel cell stack becomes larger, and its output density may be reduced.

Further, gaps 11 between the composite unit cells and gaps 21 between the spacers are preferably arranged at regular intervals. The "regular intervals" used herein not only include a case where gaps 11 between composite unit cells 10 and gaps 21 between spacers 20 are arranged at exactly regular intervals, but also include a case where errors of all gaps 11, 21 with respect to average values thereof are within ±0.25 mm.

By arranging gaps 11 between the composite unit cells and gaps 21 between the spacers at regular intervals, occurrence of a location where air is locally insufficient within fuel cell stack 1 can be suppressed. This can prevent generation of a local excess voltage in power generation in composite unit cell 10, and prevent local occurrence of a location in which heat waste is less likely to occur and which has an elevated temperature.

By preventing local occurrence of a location having an elevated temperature as described above, deterioration in output characteristics of fuel cells can be suppressed. Further, deterioration in output characteristics of the fuel cells caused when an excess voltage enough to melt a catalyst metal included in an anode catalyst layer and a cathode catalyst layer is applied and the catalyst metal is deteriorated can also be suppressed. Due to these synergistic effects, the fuel cell stack can have a long life.

<Fuel Supply in Fuel Cell Stack>

In the fuel cell stack according to the present embodiment, fuel supply to the fuel flow channel in each fuel cell layer may be performed using auxiliary equipment such as a fuel pump, or may be performed without using auxiliary equipment such as a fuel pump. In a case where the fuel is supplied using auxiliary equipment such as a fuel pump, the fuel flow channel entrance and exit are connected with the fuel pump or a fuel cartridge, using fine tubes such as silicon tubes.

Figure 5:
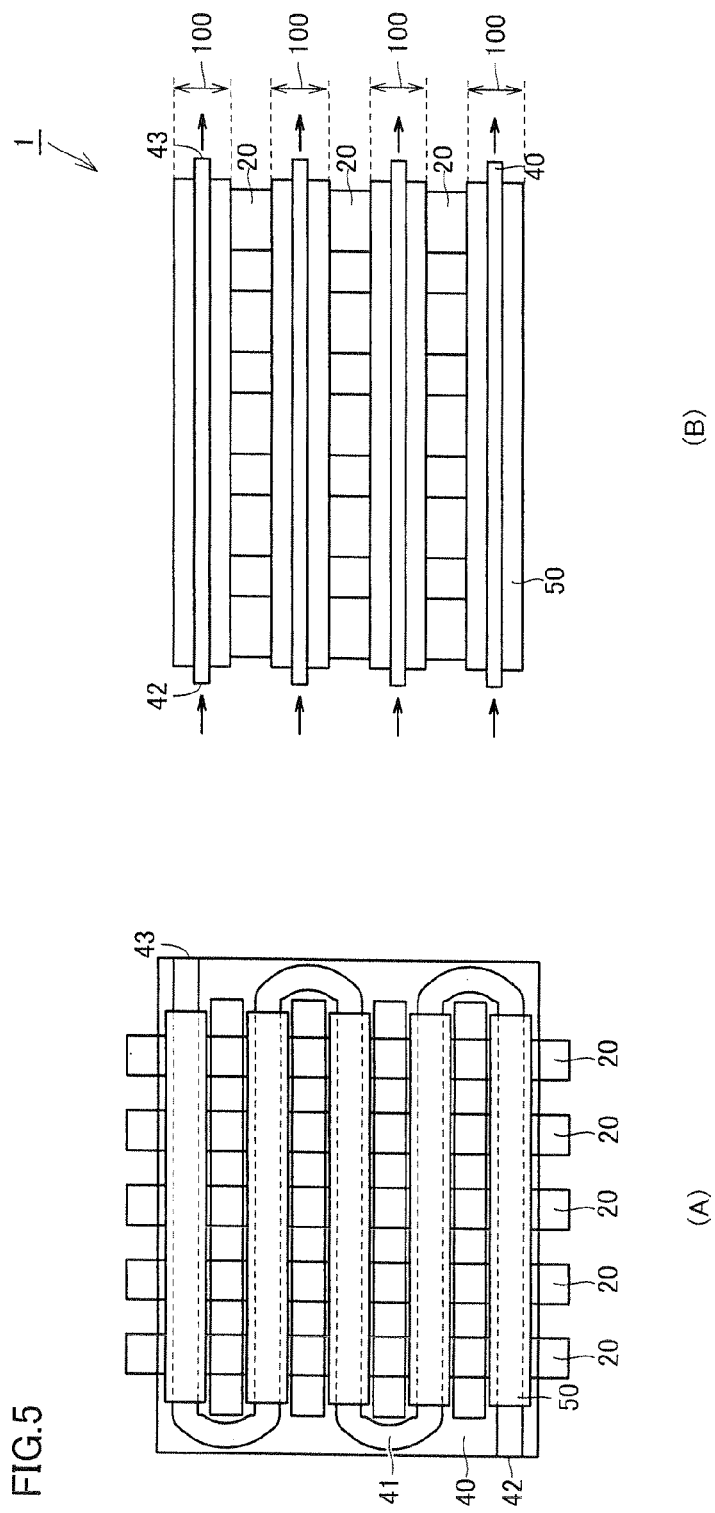
FIG. 5(A) is a top view of a fuel cell stack in a case where fuel is supplied to each fuel cell layer using auxiliary equipment.
FIG. 5(B) is a side view of the fuel cell stack shown in FIG. 5(A).

FIG. 5(A) is a top view of a fuel cell stack in a case where the fuel is supplied to each fuel cell layer using auxiliary equipment, and FIG. 5(B) is a side view of the fuel cell stack. Referring to FIG. 5, a shape of the fuel flow channel in the fuel cell stack in the case where auxiliary equipment such as a fuel pump is used will be described.

In the case where the fuel is supplied to each fuel cell layer using auxiliary equipment such as a fuel pump, from the viewpoint of facilitating connection between the fuel flow channel and the fuel cartridge, it is preferable to form snake-shaped (hereinafter also referred to as "serpentine") fuel flow channel 41 in which fuel flow channels 41 of the composite unit cells communicate with each other and continue from fuel flow channel entrance 42 to fuel flow channel exit 43, in a fuel flow channel formation member 40.

By forming serpentine fuel flow channel 41 as described above, the numbers of fuel flow channel entrances 42 and fuel flow channel exits 43 within one fuel cell layer are each set to one, and thus the numbers of fuel flow channel entrances 42 and fuel flow channel exits 43 can be reduced. Thereby, the number of the fine tubes such as silicon tubes can be reduced, and in addition the number of connections between fuel flow channel entrances 42/fuel flow channel exits 43 and the fine tubes can also be reduced.

Although FIG. 5 shows the fuel cell stack having a structure in which one fuel flow channel 41 is formed for each fuel cell layer, the number of fuel flow channels 41 is not necessarily be one, and a plurality of fuel flow channels 41 may be provided.

On the other hand, FIG. 6(A) is a top view of a fuel cell stack in a case where the fuel is supplied to each fuel cell layer without using auxiliary equipment, and FIG. 6(B) is a side view of the fuel cell stack.

Examples of a method of supplying the fuel to the fuel flow channel in each fuel cell layer without using auxiliary equipment such as a fuel pump can include means for transporting the fuel into the fuel flow channel using the capillary phenomenon and the like. In the capillary phenomenon, a diffusion speed of the fuel becomes slower with an increase in a transportation distance (diffusion distance) of the fuel, and thus using the capillary phenomenon is not suitable for a serpentine fuel flow channel having a long transportation distance. Therefore, it is preferable to form fuel flow channel 41 having the longitudinal direction for each composite unit cell, like fuel flow channels 41 shown in FIG. 6.

By forming fuel flow channels 41 as described above, the number of fuel flow channel entrances 42 for each fuel cell layer is increased. However, since the fuel can be supplied from the fuel holding portion such as the fuel cartridge to fuel flow channels 41 by the capillary phenomenon merely by bringing the fuel holding portion into direct contact with each fuel flow channel entrance 42, there is an advantage that there is no need to sandwich a fuel pump or the like between the fuel cartridge and fuel flow channel entrance 42.

Although FIG. 6 shows an exemplary structure in which one fuel flow channel is formed for each composite unit cell, the number of the fuel flow channels for one composite unit cell is not necessarily be one, and it is needless to say that a plurality of fuel flow channels may be provided.

Figure 7:
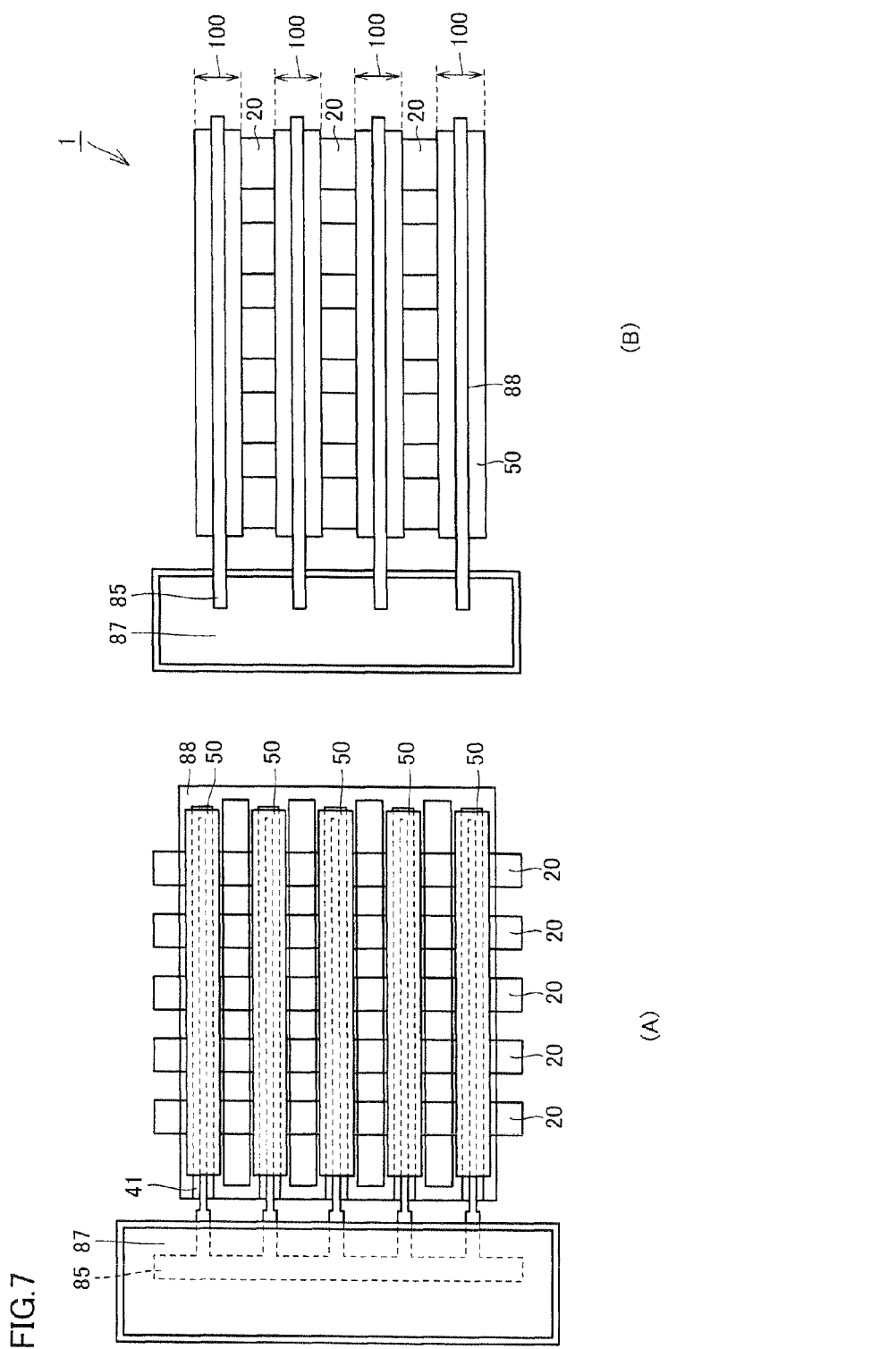
FIG. 7(A) is a top view of a fuel cell stack in a case where the fuel is supplied to each fuel cell layer using a fuel transportation member.
FIG. 7(B) is a side view of the fuel cell stack of FIG. 7(A).

Hereinafter, fuel supply in a case of using a fuel transportation member 85 will be described. FIG. 7(A) is a top view of a fuel cell stack in a case where the fuel is supplied to each fuel cell layer using a fuel transportation member, and FIG. 7(B) is a side view of the fuel cell stack. In the configuration shown in FIG. 7(A) and FIG. 7(B), the fuel cell stack further includes a fuel storage chamber 87 for holding the fuel, and one end of fuel transportation member 85 is in contact with the fuel held in fuel storage chamber 87.

When the fuel is supplied to fuel storage chamber 87, the fuel is moved from one end of fuel transportation member 85 in fuel storage chamber 87 to fine holes of fuel transportation member 85, by the capillary phenomenon. The moved fuel infiltrates through fuel transportation member 85 by the capillary phenomenon, and reaches the other end of fuel transportation member 85 (i.e., an end portion opposite to the fuel storage chamber 87 side).

The fuel supplied by infiltrating through fuel transportation member 85 is supplied from each anode current collector to the anode electrodes, and consumed in accordance with a current consumption amount by the unit cells. To replenish the consumed fuel, the fuel is always supplied continuously from fuel storage chamber 87 to fuel transportation member 85. Thus, concentration of the fuel contained in fuel transportation member 85 is maintained substantially constant, enabling stable supply of high electric power.

Merely by bringing fuel transportation member 85 into contact with the fuel within fuel storage chamber 87 as described above, the fuel can be supplied to the anode electrodes through fuel transportation member 85 by the capillary phenomenon. Thus, there is an advantage that there is no need to sandwich a fuel pump or the like between the fuel cartridge and the fuel flow channel entrance, which can contribute to reducing the size and weight of the fuel cell stack. It is to be noted that a hydrophilic porous body is used as fuel transportation member 85, and a specific description thereof will be given in Embodiment H described later.

<Fuel Flow Channel>

In a case where the fuel is supplied from one fuel flow channel to one unit cell as in the conventional fuel cell stack, even if the temperature of the fuel cell stack is increased to an extent, it has been possible to decrease the temperature of the fuel cell stack by causing the fuel at about room temperature contained in a fuel cartridge to flow through the fuel flow channels.

However, in the fuel cell stack according to the present embodiment, one fuel flow channel is used in common for two unit cells by employing the composite unit cell in the fuel cell layer. Therefore, the temperature of the fuel cell stack according to the present embodiment is easily increased, at a rate nearly double that of the conventional fuel cell stack, due to heat generated by power generation in the unit cells provided on the both surfaces of one fuel flow channel.

As the temperature inside the fuel cell stack is increased, the speed at which the fuel permeates the electrolyte membranes is increased, causing an increase in the crossover amount of the fuel. Further, the fuel reaching the cathode catalyst layers due to the crossover of the fuel directly reacts with air, causing a further increase in the temperature of the fuel cell stack. Repetition of these temperature increases may cause thermal runaway of the fuel cell stack. In addition, increases in the temperature of the fuel cell stack may also accelerate deterioration of parts and the like constituting an electronic device equipped with the fuel cell stack.

In a case where the fuel is supplied from the fuel cartridge to the fuel flow channels in the fuel cell stack according to the present embodiment, the temperature of the fuel to be supplied to the fuel flow channels is about room temperature, unless a system for vaporizing the fuel by actively applying heat is used. The fuel cell stack can be cooled down by supplying the fuel at about room temperature into the fuel cell stack and increasing a holding amount of the fuel.

This method is particularly effective for a fuel cell system circulating fuel flowing through fuel flow channels by a fuel pump. The fuel absorbs heat inside a fuel cell stack while passing through the fuel flow channels, and is exhausted out of the fuel cell stack. Thereby, the heat absorbed by the fuel can be released to the outside.

Figure 8:
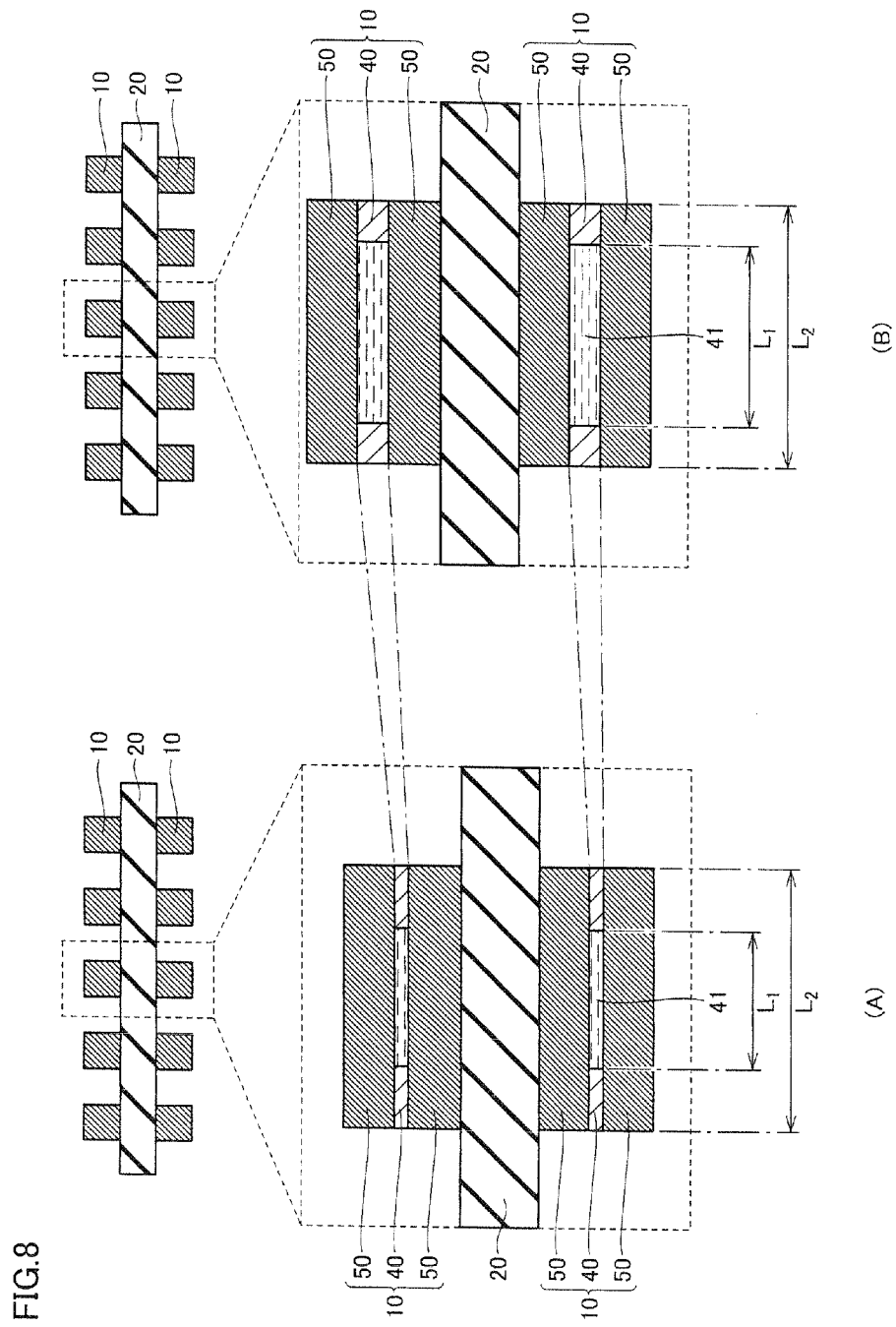
FIG. 8(A) is a schematic cross sectional view of a fuel cell stack including two fuel cell layers and one spacer layer.
FIG. 8(B) is a schematic cross sectional view showing a more preferable configuration of the fuel cell stack of FIG. 8(A).

FIG. 8(A) is a schematic cross sectional view showing a fuel cell stack including two fuel cell layers and a spacer layer. FIG. 8(B) is a schematic cross sectional view showing a more preferable configuration of the fuel cell stack shown in FIG. 8(A). It is to be noted that, in a plane in a direction in which the fuel flows through the fuel flow channel, a direction in which the unit cells are stacked will be hereinafter referred to as a "depth direction", and a direction perpendicular to the depth direction will be referred to as a "width direction".

As a method of increasing a fuel holding amount within fuel flow channel 41, the thickness of fuel flow channel formation member 40 is increased as shown in FIG. 8(B) to increase a depth of fuel flow channel 41. Thereby, the fuel holding amount within fuel flow channel 41 can be increased.

The fuel holding amount within fuel flow channel 41 can also be increased by increasing a width of fuel flow channel 41. It is to be noted that, when the width of fuel flow channel 41 is increased, it is preferable to increase the width of fuel flow channel 41 without increasing a width of fuel flow channel formation member 40. This is because, if the width of fuel flow channel formation member 40 is increased, the gap between composite unit cells 10 within the fuel cell stack is reduced, and air diffusion within the fuel cell stack may be adversely affected.

Preferably, relationship $L_1/L_2$ between a length $L_1$ of the width of fuel flow channel 41 and a length $L_2$ of a width of unit cell 50 is not less than 0.6. If $L_1/L_2$ is less than 0.6, the width of fuel flow channel 41 with respect to the width of unit cell 50 is narrow, failing to fully obtain the effect of cooling the fuel cell layer by the fuel, which is not preferable.

Further, preferably, the depth of fuel flow channel 41 is not less than 0.1 mm. If the depth of fuel flow channel 41 is less than 0.1 mm, the depth of fuel flow channel 41 is shallow, failing to fully obtain the effect of cooling the fuel cell layer by the fuel.

In addition, a solution of suppressing excessive temperature increase by decreasing a width in a short-side direction of fuel flow channel 41 and increasing a gap between unit cells to reduce an electrode area is also conceivable as another method for solving excessive temperature increase inside the fuel cell stack. However, reducing an electrode area is contrary to the intended purpose of improving output density, and thus is not preferable.

Embodiment 2

Figure 9:
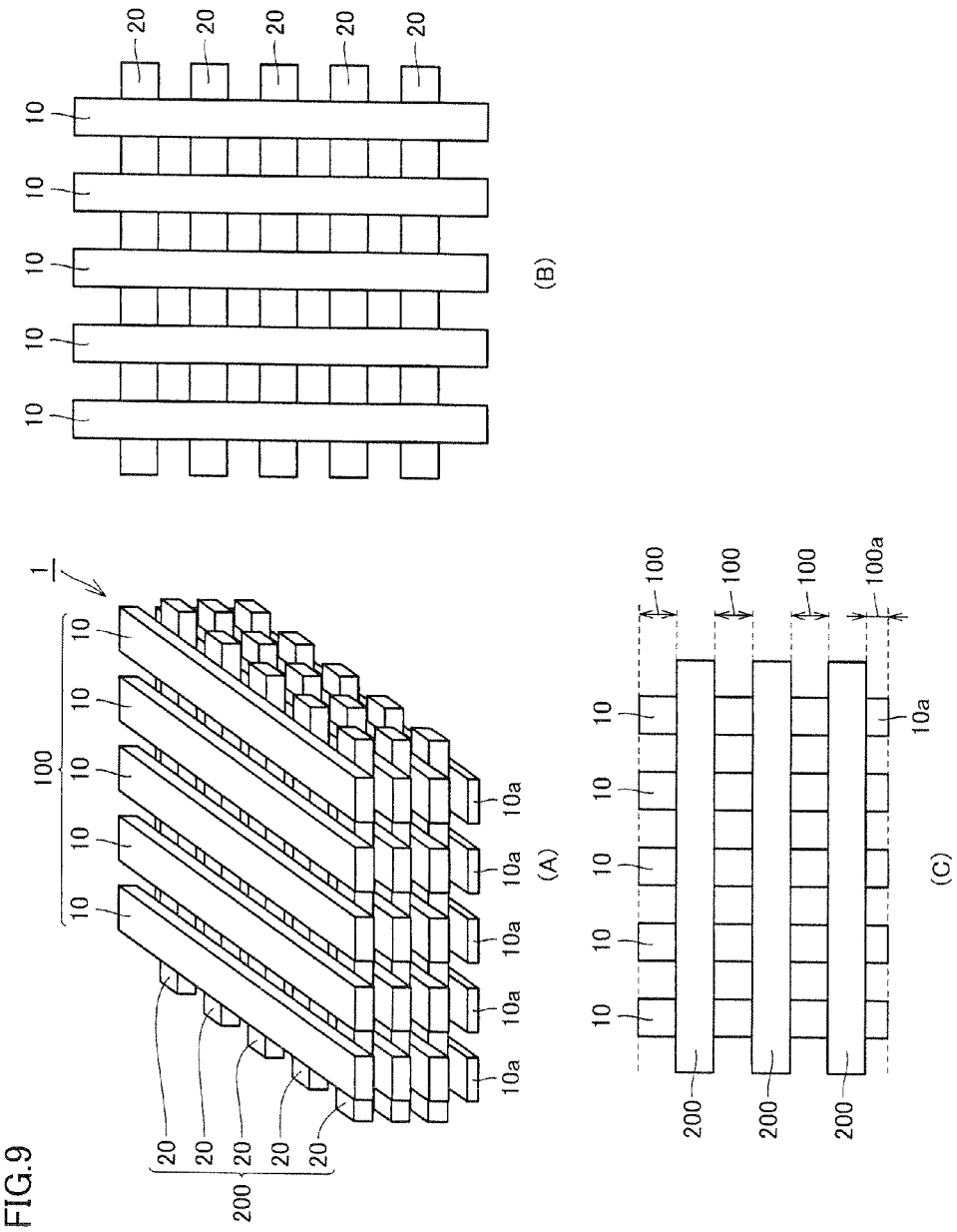

FIG. 9 shows schematic views of a preferable exemplary fuel cell stack according to the present embodiment, in which FIG. 9(A) is a perspective view thereof, FIG. 9(B) is a top view thereof, and FIG. 9(C) is a side view thereof.

The structure of the fuel cell stack according to the present embodiment may be, for example, a structure as shown in FIG. 9. In the fuel cell stack shown in FIG. 9, the lowermost fuel cell layer 100a includes unit cells 10a instead of composite unit cells 10. Thus, in the fuel cell stack according to the present embodiment, one or more of the fuel cell layers may be fuel cell layer 100a in which unit cells 10a are arranged with a gap provided therebetween. The fuel cell stack with such a structure is preferably used in a case where the lower surface of the fuel cell stack is in contact with an electronic device.

Preferably, unit cells 10a having the single-surface unit cell structure that constitute the lowermost fuel cell layer 100a in the fuel cell stack of FIG. 9 are arranged such that the cathode electrode of unit cell 10a is in contact with spacer 20 and the anode electrode of unit cell 10a is located on a side opposite to the side in contact with spacer 20. With such a construction, air can be satisfactorily supplied to the cathode electrodes without air supply from the lower surface of fuel cell stack 1 (i.e., the surface in contact with the electronic device), and satisfactory power generation characteristics can be obtained.

Embodiment 3

Figure 10:
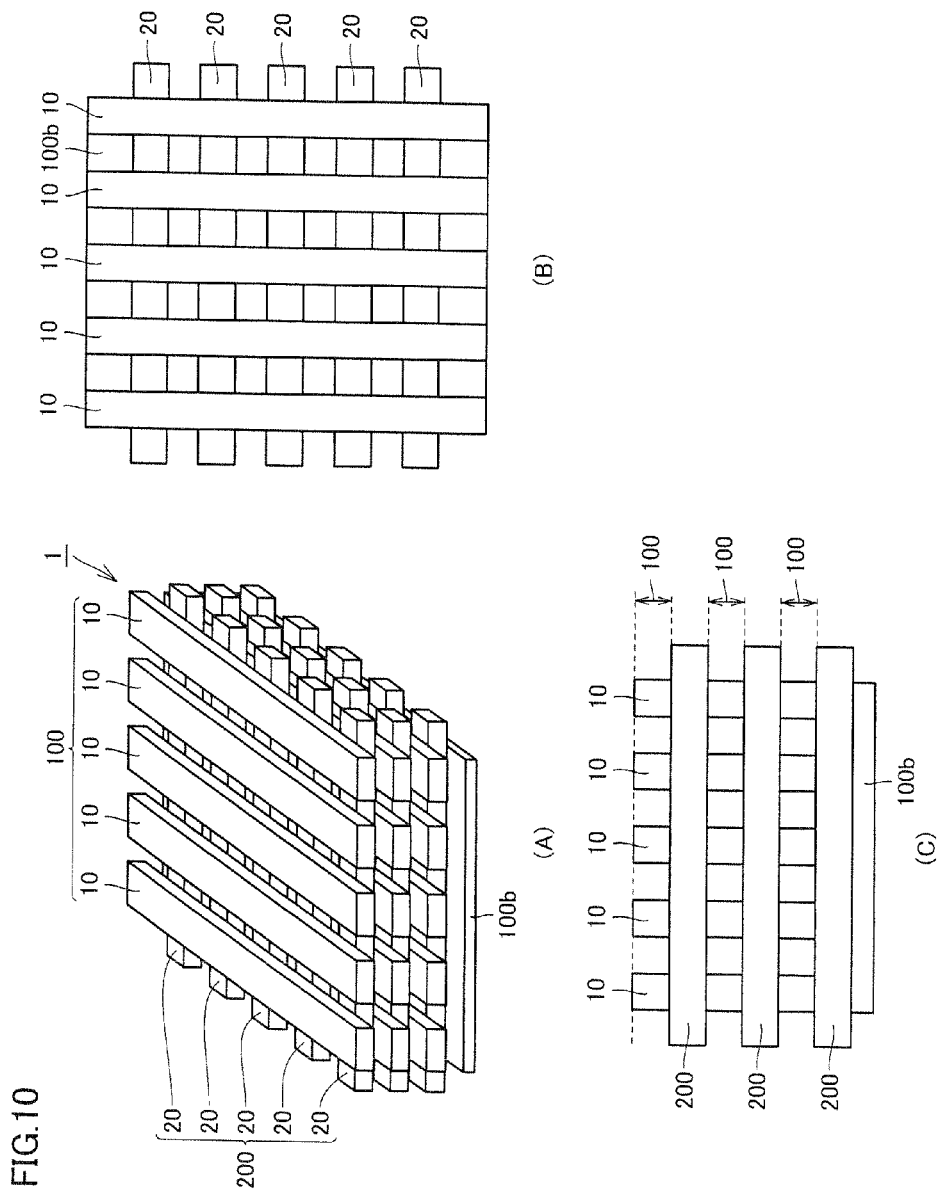

FIG. 10 shows schematic views of a preferable exemplary fuel cell stack according to the present embodiment, in which FIG. 10(A) is a perspective view thereof, FIG. 10(B) is a top view thereof, and FIG. 10(C) is a side view thereof.

The structure of the fuel cell stack according to the present embodiment may be, for example, a structure as shown in FIG. 10. The fuel cell stack shown in FIG. 10 has a structure in which the lowermost fuel cell layer is a fuel cell layer 100b made of a large-area unit cell. Thus, in the fuel cell stack according to the present embodiment, one or more of the fuel cell layers may be composed of a large-area unit cell. The fuel cell stack has a configuration preferably used in a case where its lower surface is in contact with an electronic device, as with the fuel cell stack according to Embodiment 2.

Preferably, the large-area unit cell constituting the lowermost fuel cell layer 100b in the fuel cell stack shown in FIG. 10 is arranged such that its cathode electrode is in contact with spacer 20 and its anode electrode is located on a side opposite to the side in contact with spacer 20. With such a construction, air can be supplied to the cathode electrode of the large-area unit cell without air supply from the lower surface of fuel cell stack 1 (i.e., the surface in contact with the electronic device), and satisfactory power generation characteristics can be obtained.

In the fuel cell stack according to the present embodiment, since the lowermost fuel cell layer 100b has a large electrode area, high output can be obtained. However, due to a large amount of oxygen in the air consumed by power generation in fuel cell layer 100b, it is preferable to widen a gap to fuel cell layer 100b by increasing the thickness of spacer 20 in contact with fuel cell layer 100b, and facilitate air supply.

Embodiment 4

Figure 11:
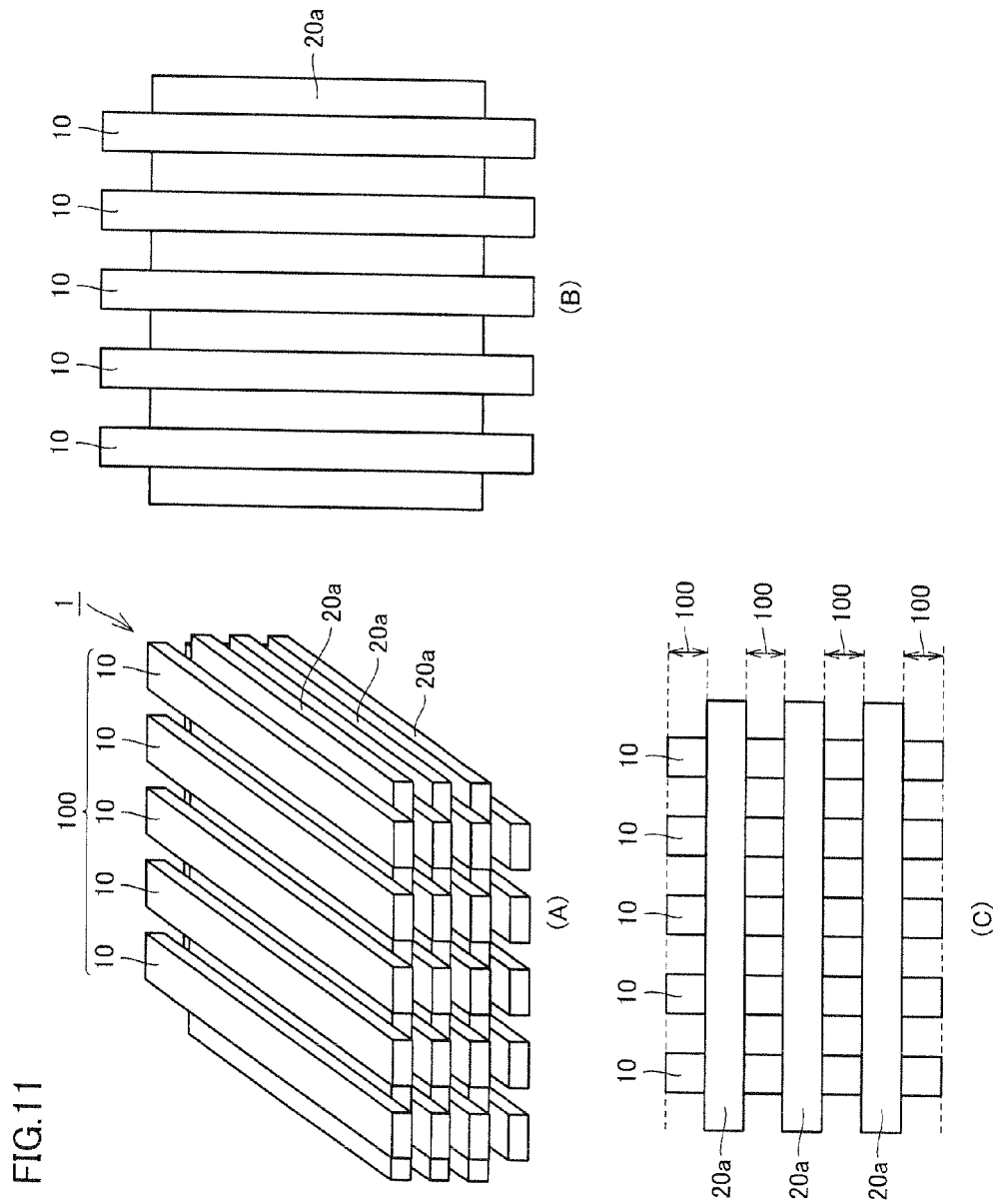

FIG. 11 shows schematic views of a preferable exemplary fuel cell stack according to the present embodiment, in which FIG. 11(A) is a perspective view thereof, FIG. 11(B) is a top view thereof, and FIG. 11(C) is a side view thereof.

The structure of the fuel cell stack according to the present embodiment may be, for example, a structure as shown in FIG. 11. In the fuel cell stack shown in FIG. 11, the spacer layer is composed of a large-area spacer 20a having no gaps. That is, spacer layer 200 is one large-area spacer 20a that is in contact with all composite unit cells 10 in fuel cell layer 100 adjacent thereto. Thus, the fuel cell stack according to the present embodiment may be formed using the spacer layer made of large-area spacer 20a having no gaps.

By using large-area spacer 20a within the fuel cell stack, the spacer layer can hold a sufficient amount of water, even in a case where, for example, the crossover amount of the fuel is low as in a hydrocarbon-based electrolyte membrane, and produced water holding performance is low. This allows drying-up of the electrolyte membrane to be less likely to occur.

In a case where a hydrophilic porous body is used for the spacer, the produced water holding performance of the spacer layer can be improved more by using large-area spacer 20a, when compared with a case where the spacers are arranged with a gap provided therebetween as shown in FIG. 1. By improving the produced water holding performance of the spacer layer as described above, water is also easily held within the electrolyte membrane of each unit cell, and proton conductivity of the electrolyte membrane can be increased. Therefore, power generation resistance of each unit cell can be suppressed.

Such large-area spacer 20a can improve heat radiation properties due to its large surface area. Thus, the fuel cell stack is less likely to have a high temperature, and occurrence of the crossover of the fuel can be suppressed. Further, since large-area spacer 20a has a heat capacity larger than that of the spacer having a rectangular solid shape, large-area spacer 20a can easily absorb heat generated by an oxidation-reduction reaction in composite unit cell 10.

Further, if the fuel cell stack is continuously used, more heat stays at a central portion of the fuel cell stack and heat is less likely to be radiated. However, by using large-area spacer 20a, heat of a heated portion at the central portion is conducted to the outside of large-area spacer 20a, and thus unevenness in temperature inside the fuel cell stack can be alleviated.

Furthermore, such large-area spacer 20a can fix composite unit cells 10 securely in a vertical direction, with a uniform pressure. This can prevent an increase in internal pressure of the composite unit cell caused by gas produced at the anode electrodes, and resultant expansion and rupture thereof.

In addition, although the MEA constituting the unit cell is sensitive to external impact or stimulus, using large-area spacer 20a also has a function of protecting the MEA from being directly affected.

Embodiment 5

Figure 12:
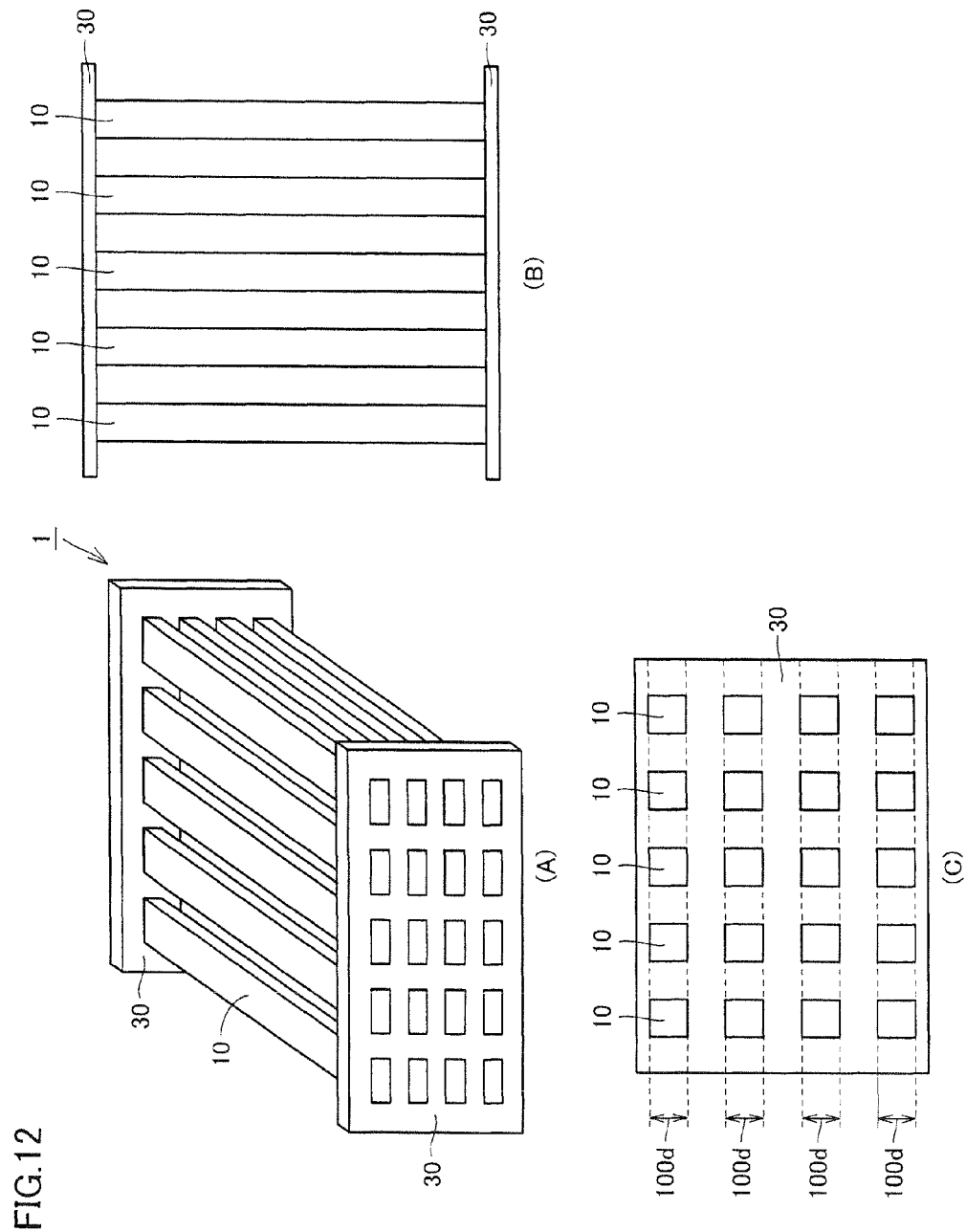

FIG. 12 shows schematic views of a preferable exemplary fuel cell stack according to the present embodiment, in which FIG. 12(A) is a perspective view thereof, FIG. 12(B) is a top view thereof, and FIG. 12(C) is a side view thereof.

The structure of the fuel cell stack according to the present embodiment may be, for example, a structure as shown in FIG. 12. The fuel cell stack shown in FIG. 12 has a structure provided with gap holding members 30 for holding the gaps between composite unit cells 10. In the present embodiment, the material for gap holding member 30 is not particularly limited, and any material can be used as long as it has no electrical conductivity. In the case of the fuel cell stack shown in FIG. 12, a layer including composite unit cells 10 in an identical plane is considered as a fuel cell layer 100d. Therefore, the fuel cell stack according to the present embodiment includes four fuel cell layers.

In the fuel cell stack according to the present embodiment, the output density of each composite unit cell 10 can be improved by supplying air to the cathode electrodes of two unit cells included in composite unit cell 10 using gap holding members 30, without providing spacer layers. In the fuel cell stack according to the present embodiment, air can be satisfactorily supplied, because there is nothing that interferes with air diffusion. However, if a gap between the fuel cell layers is reduced too much to improve the output density of each composite unit cell, there is a possibility that air cannot be fully supplied to the cathode electrode of each unit cell, which is not preferable.

Embodiment 6

FIG. 13(A) is a perspective view showing a fuel cell stack and a casing covering the same, and FIG. 13(B) is a cross sectional view taken by cutting the fuel cell stack covered with the casing in the direction in which the fuel cell layers are stacked, in which arrows 49 indicate directions in which heat flows.

The fuel cell stack according to the present embodiment has a structure covered with a casing 90. The fuel cell stack according to the present embodiment can release heat generated in the composite unit cells to the outside (or to the casing) via the spacers, by using a porous body having high heat conductivity for the spacers included in the spacer layers. Therefore, it can suppress an increase in the temperature of the fuel cell stack.

Such spacer 20 can be made of a material such as a metal oxide porous body composed of titanium oxide, aluminum oxide, zirconium oxide, or the like insulated by an oxide, a metal-polymer composite body insulated by applying or modifying a hydrophilic polymer or attaching a hydrophilic polymer film on a surface of a metal porous body, or a porous ceramic.

The method of releasing heat generated in the composite unit cells to the outside (or to the casing) via the spacers is not limited to a method of employing a material having high heat conductivity as the material for spacer 20, and there is also available a method of improving heat conductivity by reducing the porosity of spacer 20 as a porous body to increase the density of a heat-conducting material within the porous body and increase a contact area with the composite unit cells. The porosity of the porous body used for such a spacer is preferably not less than 40% and not more than 90%, and is more preferably not less than 60% and not more than 80%. If the porosity is less than 40%, it is not preferable from the viewpoint of supplying air to the cathode electrodes, and if the porosity exceeds 90%, it is not preferable due to low heat conductivity.

As shown in FIG. 13, heat is conducted through spacers 20 to casing 90, and efficiently released to the outside through casing 90 in the directions indicated by arrows 49. Thus, an increase in the temperature inside the fuel cell stack can be suppressed. To efficiently supply air to the fuel cell stack, spacer 20 is often designed to be thicker than the members constituting the composite unit cell. Thereby, the effect of releasing heat to the outside becomes significant by bringing casing 90 into contact with spacers 20 made of the aforementioned material excellent in heat conductivity.

However, the material having high heat conductivity does not necessarily have to be used for all the spacers, and a spacer made of a material having a different heat conductivity may be selectively used, depending on the position of spacer 20. The effect of suppressing an increase in the temperature of the fuel cell stack can be obtained, for example, by using a material having a particularly high heat conductivity for spacers 20 having a large contact area with casing 90, or by using a material having a high heat conductivity for the spacers adjacent to the composite unit cells in which temperature is easily increased.

<Casing>

As shown in FIG. 13(A), casing 90 covering the fuel cell stack serves as a cover covering the fuel cell stack, and prevents the unit cells from coming into direct contact with an electronic device.

Casing 90 covering the fuel cell stack can be fabricated by molding a plastic material or a metal material into an appropriate shape. Examples of the plastic material used herein can include polyphenylene sulfide (PPS), polymethylmethacrylate (PMMA), acrylonitrile butadiene styrene (ABS), polyvinyl chloride, polyethylene (PE), polyethylene terephthalate (PET), polyether ether ketone (PEEK), polytetrafluoroethylene (PTFE), polyvinylidene fluoride (PVDF), and the like. Among these, polyphenylene sulfide (PPS) and polyethylene (PE) are preferably used as they have high strengths due to an increase in molecular weight caused by three-dimensional cross-linking, can be processed in an inexpensive manner, and have light weights.

On the other hand, from the viewpoint of efficiently radiating heat generated by a reaction within the fuel cell stack to the outside, it is preferable to use a metal material having high heat conductivity. Examples of a material used for such casing 90 can include Cu, Al, Fe, Ti, stainless, and the like.

Further, casing 90 covering the fuel cell stack according to the present embodiment may have any shape as long as it allows air to be supplied to the fuel cell stack. It is preferable to use casing 90 in a shape having a plurality of holes opened in a plate or foil, or casing 90 made of a porous body in a shape of a mesh or an expanded metal.

Since heat conduction from spacers 20 to casing 90 becomes satisfactory with an increase in the contact area between casing 90 and spacers 20 described above, heat conduction from spacers 20 to casing 90 may be improved by providing a heat conductive sheet between spacers 20 and casing 90.

Further, unless composite unit cells 10 or spacers 20 provided in an identical plane do not have a uniform thickness, a gap is caused between composite unit cells 10 and spacers 20, and between spacers 20 and casing 90. The gap may serve as a heat insulating layer and interfere with heat conduction. Therefore, it is preferable to improve heat conduction from spacers 20 to casing 90 by providing a flexible heat conductive sheet between composite unit cells 10 and spacers 20, and between spacers 20 and casing 90.

<(2) Structure of Composite Unit Cell>

Hereinafter, the composite unit cell used in the fuel cell stack according to the present invention will be described.

Embodiment A

Figure 14:
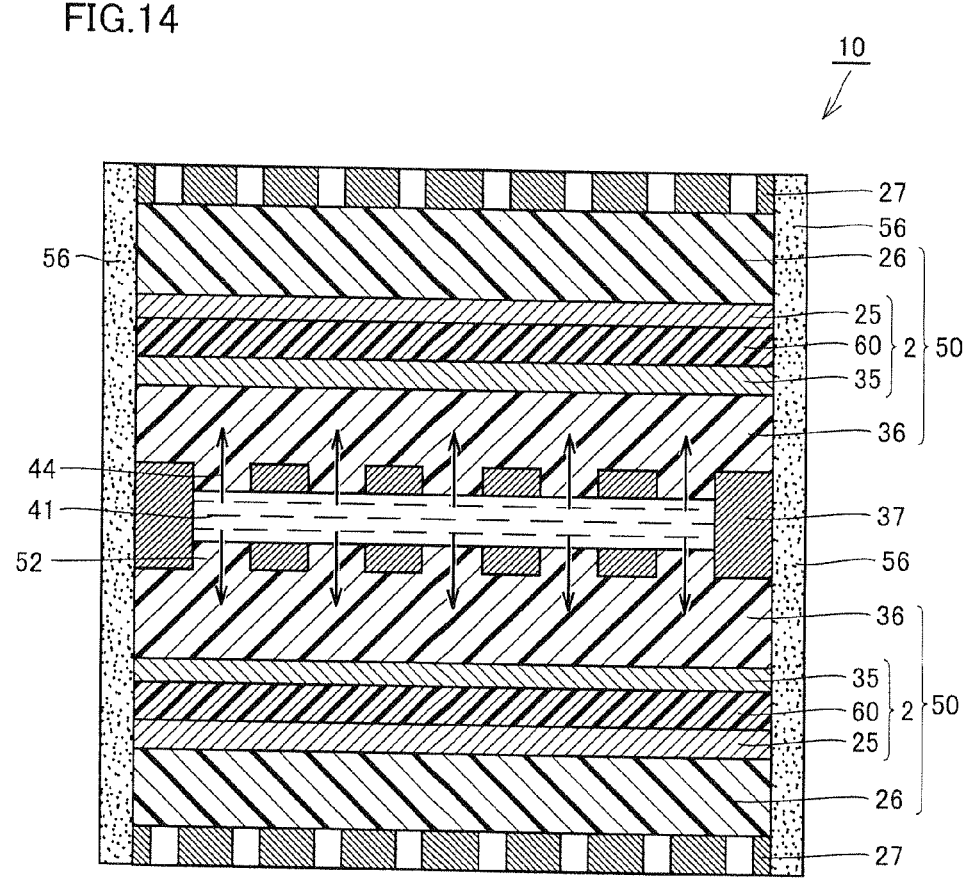
FIG. 14 is a cross sectional view of an exemplary composite unit cell used in the fuel cell stack according to the present invention, in a plane in a layer-stacking direction.

FIG. 14 is a cross sectional view of a composite unit cell included in a fuel cell stack according to the present embodiment, in a plane in a layer-stacking direction. In composite unit cell 10 of FIG. 14, an anode current collector 37 has fuel flow channel 41 penetrating in a thickness direction, which can supply fuel to anode catalyst layers 35 of unit cells 50 arranged to face the front and rear surfaces of fuel flow channel 41. Paths through which the fuel flows from fuel flow channel 41 are indicated by arrows 44.

Although composite unit cell 10 of FIG. 14 has a structure in which anode current collector 37 also serves as a fuel flow channel formation member (not shown), the structure of composite unit cell 10 is not limited to such a structure, and, for example, fuel flow channel 41 may be formed of a fuel flow channel formation member. Hereinafter, constituent members of the composite unit cell shown in FIG. 14 will be described.

<Unit Cell>

In the present embodiment, two unit cells 50 included in composite unit cell 10 each include a membrane electrode assembly (MEA) 2 including anode catalyst layer 35, an electrolyte membrane 60, and a cathode catalyst layer 25 in this order as the smallest unit, as shown in FIG. 14, and are characterized in that one unit cell 50 is arranged on each of the front and rear surfaces of fuel flow channel 41 such that anode catalyst layer 35 constituting membrane electrode assembly 2 faces the fuel flow channel 41 side (i.e., the anode current collector 37 side). It is to be noted that unit cell 50 preferably includes a cathode conductive porous layer 26 and an anode conductive porous layer 36, in addition to membrane electrode assembly 2.

In a case where an aqueous methanol solution is used as fuel in unit cells 50 of FIG. 14, the aqueous methanol solution is supplied from fuel flow channel 41, through anode conductive porous layers 36, to anode catalyst layers 35, and undergoes a reaction represented by the formula $CH_3OH+H_2O \rightarrow CO_2+6H^++6e^-$ at anode catalyst layers 35 to produce hydrogen ions and electrons. The hydrogen ions produced herein are moved through electrolyte membranes 60 to cathode catalyst layers 25.

On the other hand, air is supplied as an oxidizing agent from the atmosphere to cathode catalyst layers 25, and undergoes a reaction represented by the formula $O_2+4H^++4e^- \rightarrow 2H_2O$ at cathode catalyst layers 25 to produce water. A flow of electrons caused by the above electrons produced at anode catalyst layers 35 flowing to cathode catalyst layers 25 is extracted as a current via an external circuit, and thereby electrical energy can be obtained from unit cells 50.

Unit cell 50 described above preferably includes anode conductive porous layer 36 to uniformly supply the fuel to anode catalyst layer 35, and preferably includes cathode conductive porous layer 26 to uniformly supply the air to cathode catalyst layer 25.

Further, from the viewpoint of reducing electrical resistance within the unit cell, it is preferable for unit cell 50 described above to arrange a cathode current collector 27 on a surface of cathode conductive porous layer 26 opposite to its surface that faces cathode catalyst layer 25, and arrange anode current collector 37 on a surface of anode conductive porous layer 36 opposite to its surface that faces anode catalyst layer 35.

<Anode Electrode and Cathode Electrode>

The anode electrode of unit cell 50 included in the fuel cell stack according to the present embodiment at least includes anode catalyst layer 35 including an anode catalyst that promotes oxidation of the fuel. The fuel initiates an oxidation reaction on the anode catalyst to produce protons and electrons. Preferably, the anode electrode has a structure in which anode conductive porous layer 36 is further stacked on the anode current collector 37 side (i.e., the side opposite to electrolyte membrane 60).

On the other hand, the cathode electrode of unit cell 50 used in the fuel cell stack according to the present embodiment at least includes cathode catalyst layer 25 including a cathode catalyst that promotes reduction of the oxidizing agent. The oxidizing agent captures protons and electrons on the cathode catalyst and initiates a reduction reaction to produce water. Preferably, the cathode electrode has a structure in which cathode conductive porous layer 26 is further stacked on the cathode current collector 27 side (i.e., the side opposite to electrolyte membrane 60).

<Anode Catalyst Layer and Cathode Catalyst Layer>

Preferably, anode catalyst layer 35 at least includes the anode catalyst that promotes oxidation of the fuel, and further includes an anode carrier and an anode electrolyte. On the other hand, preferably, cathode catalyst layer 25 at least includes the cathode catalyst that accelerates the speed of the reaction producing water, and further includes a cathode carrier and a cathode electrolyte.

Preferably, the thicknesses of anode catalyst layer 35 and cathode catalyst layer 25 are each set to not less than 0.1 µm and not more than 0.5 mm. If the thicknesses of anode catalyst layer 35 and cathode catalyst layer 25 are less than 0.1 µm, there is a possibility that anode catalyst layer 35 and cathode catalyst layer 25 cannot carry catalyst amounts enough to improve the output of the fuel cell stack (or unit cell 50). If the thicknesses of anode catalyst layer 35 and cathode catalyst layer 25 exceed 0.5 mm, resistance of proton conduction and resistance of electron conduction are increased, and diffusion resistance of the fuel (for example, an aqueous methanol solution) or the oxidizing agent (for example, oxygen) may be increased.

In the following sections (1) to (3), the catalysts, the carriers, and the electrolytes included in anode catalyst layer 35 and cathode catalyst layer 25 will be each described.

(1) Anode Catalyst and Cathode Catalyst

If an aqueous methanol solution is used as the fuel, the anode catalyst included in anode catalyst layer 35 has a function of accelerating the speed of the reaction that produces protons and electrons from methanol and water. On the other hand, the cathode catalyst included in cathode catalyst layer 25 has a function of accelerating the reaction speed of the reaction that produces water from oxygen, protons, and electrons.

The anode catalyst and the cathode catalyst are not necessarily limited to the same type of material, and different types of materials may be used. As such anode catalyst and cathode catalyst, for example, one type of material or a combination of two or more types of materials selected from the group consisting of noble metals such as Pt, Ru, Au, Ag, Rh, Pd, Os, and Ir, base metals such as Ni, V, Ti, Co, Mo, Fe, Cu, Zn, Sn, W, and Zr, oxides, carbides, and carbonitrides of these noble metals or base metals, and carbon can be used.

(2) Anode Carrier and Cathode Carrier

The anode carrier included in anode catalyst layer 35 has a function of conducting the electrons produced at the anode electrode to anode current collector 37 or anode conductive porous layer 36. On the other hand, the cathode carrier included in cathode catalyst layer 25 has a function of conducting electrons from cathode current collector 27 or cathode conductive porous layer 26 to cathode catalyst layer 25.

The anode carrier and the cathode carrier may be made of any material as long as the material has electrical conductivity, and it is preferable to use a carbon-based material having high electrical conductivity. Examples of the carbon-based material having high electrical conductivity can include acetylene black, Ketjen Black (registered trademark), amorphous carbon, carbon nanotube, carbon nanohorn, and the like. As the anode carrier and the cathode carrier, acetylene black (product name: Vulcan XC72 (manufactured by Cabot Corporation) is particularly suitably used.

Further, other than these carbon-based materials, one type of material or a combination of two or more types of materials selected from the group consisting of noble metals such as Pt, Ru, Au, Ag, Rh, Pd, Os, and Ir, base metals such as Ni, V, Ti, Co, Mo, Fe, Cu, Zn, Sn, W, and Zr, oxides, carbides, nitrides, and carbonitrides of these noble metals or base metals can be used.

The anode carrier and the cathode carrier may also be made of a material provided with proton conductivity. Examples of such a material provided with proton conductivity can include sulfated zirconia, zirconium phosphate, and the like.

Since both the anode catalyst and the cathode catalyst have electron conductivity, the anode catalyst conducts the electrons produced at the anode electrode to anode current collector 37 or anode conductive porous layer 36, and the cathode catalyst conducts electrons from cathode current collector 27 or cathode conductive porous layer 26 to cathode catalyst layer 25. Therefore, there is no need to provide an anode carrier and a cathode carrier.

Further, when produced gas is produced at the anode electrode by the oxidation reaction at the anode electrode, it is preferable to use the anode carrier and/or the anode catalyst or the cathode carrier and/or the cathode catalyst subjected to hydrophilization treatment. Any method may be used as a method of performing the hydrophilization treatment as long as these members can be hydrophilized, and it is preferable to hydrophilize these members by any of gas-phase oxidation treatment, liquid-phase oxidation treatment, coupling treatment, and plasma treatment.

Here, examples of the gas-phase oxidation treatment can include oxidation under an air, ozone, or nitrogen dioxide atmosphere. Examples of the liquid-phase oxidation treatment can include oxidation by a mixed liquid containing phosphoric acid and one of nitric acid, potassium permanganate, chlorous acid, perchloric acid, oxygen saturated water, an aqueous ozone solution, an aqueous bromine solution, sodium hypochlorite, and potassium chromate. Further, examples of the coupling treatment can include treatment using a silane-based, titanate-based, or aluminum-based coupling treatment agent.

However, when a metal oxide or a carrier having proton conductivity is used as the anode carrier and/or the anode catalyst or the cathode carrier and/or the cathode catalyst, there is no need to subject surfaces thereof to hydrophilization treatment, because the surfaces already exhibit hydrophilic properties.

(3) Anode Electrolyte and Cathode Electrolyte

The anode electrolyte included in anode catalyst layer 35 has a function of conducting the protons produced at the anode electrode to electrolyte membrane 60. On the other hand, the cathode electrolyte included in cathode catalyst layer 25 has a function of conducting the protons permeating through electrolyte membrane 60 to the vicinity of cathode catalyst layer 25.

Materials for the anode electrolyte and the cathode electrolyte are not particularly limited, and any material can be used as long as it has proton conductivity and electrical insulation properties. Preferably, they are a solid or a gel not dissolved by fuel such as methanol. Such anode electrolyte and cathode electrolyte are preferably organic polymers having a strong acidic group such as sulfonic acid and a phosphate group or a weak acidic group such as a carboxyl group. Examples of the electrolytes can include containing perfluorocarbon (Nafion (manufactured by Du Pont)), carboxyl group-containing perfluorocarbon (Flemion (manufactured by Asahi Kasei Corporation)), a polystyrene sulfonic acid copolymer, a polyvinyl sulfonic acid copolymer, an ionic liquid (ordinary temperature molten salt), sulfonated imide, AMPS, and the like.

If carriers having proton conductivity are used as the anode carrier and the cathode carrier, there is no need to additionally provide an anode electrolyte and a cathode electrolyte, as these carriers can conduct protons.

<Electrolyte Membrane>

In the present embodiment, any conventionally known material can be used for electrolyte membrane 60 constituting unit cell 50, as long as the material conducts the protons produced at anode catalyst layer 35 and allows the protons to permeate to cathode catalyst layer 25, and has electrical insulation properties. For example, a polymer membrane, an inorganic membrane, a composite membrane, or the like can be used.

Examples of the polymer membrane used for electrolyte membrane 60 can include a perfluorosulfonic-acid-based electrolyte membrane (NAFION (registered trademark): manufactured by Du Pont), Dow Membrane (manufactured by the Dow Chemical Company), ACIPLEX ((registered trademark): manufactured by Asahi Kasei Corporation), Flemion (registered trademark): manufactured by Asahi Glass Co., Ltd.), and a hydrocarbon-based electrolyte membrane composed of such as polystyrene sulfonic acid and sulfonated polyether ether ketone.

Examples of the inorganic membrane used for electrolyte membrane 60 can include phosphoric acid glass, cesium hydrogen sulfate, polytungstophosphoric acid, ammonium polyphosphate, and the like.

Further, examples of the composite membrane used for electrolyte membrane 60 can include a Gore Select membrane (Gore Select (registered trademark): manufactured by W. L. Gore & Associates).

In addition, from the viewpoint of allowing the fuel cell stack (or unit cell 50) to handle a temperature of around 100° C. or higher, it is preferable to use a material for electrolyte membrane 60 that has high ion conductivity even at a low water content. As such a material for electrolyte membrane 60, it is preferable to use a membrane of, for example, sulfonated polyimide, 2-acrylamido-2-methylpropane sulfonic acid (AMPS), sulfonated polybenzimidazole, phosphonated polybenzimidazole, cesium hydrogen sulfate, ammonium polyphosphate, an ionic liquid (ordinary temperature molten salt), or the like.

Preferably, such electrolyte membrane 60 has a proton conductivity of not less than $10^{-5}$ S/cm. It is more preferable to use an electrolyte membrane having a proton conductivity of not less than $10^{-3}$ S/cm, like an electrolyte membrane made of a polymer such as a perfluorosulfonic acid polymer and a hydrocarbon-based polymer.

<Anode Conductive Porous Layer>

Anode conductive porous layer 36 has a function of forming voids for supplying methanol and water to anode catalyst layer 35, and conducting electrons from anode catalyst layer 35 to anode current collector 37. As a material used for anode conductive porous layer 36, it is preferable to use a carbon material, an electrically conductive polymer, a noble metal such as Au, Pt, and Pd, a metal such as Ti, Ta, W, Nb, Ni, Al, Cr, Ag, Cu, Zn, and Su, Si, a nitride, carbide, carbonitride, or the like thereof, an alloy such as stainless, Cu—Cr, Ni—Cr, and Ti—Pt, or the like. It is more preferable to include one or more elements selected from the group consisting of Pt, Ti, Au, Ag, Cu, Ni, and W.

If a metal easily corroded under an acidic atmosphere such as Cu, Ag, and Zn is used as the material used for anode conductive porous layer 36, surface corrosion in anode conductive porous layer 36 can be prevented by coating its surface with a corrosive-resistant noble metal such as Au, Pt, and Pd, a metal material, an electrically conductive polymer, an electrically conductive nitride, an electrically conductive carbide, an electrically conductive carbonitride, an electrically conductive oxide, or the like. This can increase lives of unit cell 50 and the fuel cell stack using the same.

When the elements described above are included in anode conductive porous layer 36, the specific resistance of anode conductive porous layer 36 is reduced. Thus, a voltage reduction caused by anode conductive porous layer 36 can be reduced, and output voltage can further be increased.

From the viewpoint of uniformly supplying the fuel to anode catalyst layer 35 and the viewpoint of improving efficiency of exhausting produced gas produced at anode catalyst layer 35, it is preferable that anode conductive porous layer 36 has a shape having a plurality of holes penetrating or communicating in a layer thickness direction of anode conductive porous layer 36. In particular, if the produced gas is exhausted from both end surfaces of anode conductive porous layer 36, it is preferable to provide a plurality of holes penetrating or communicating in a side surface direction of anode conductive porous layer 36.

Here, "penetrating" means to pierce from one surface to the opposite surface, and "communicating" means to form a continuous space. Examples of anode conductive porous layer 36 having penetrating holes can preferably include the one in the shape having a plurality of holes opened in a plate or foil, or a porous metal layer in the shape of a mesh or an expanded metal. Examples of anode conductive porous layer 36 having communicating holes can preferably include a metal plate, a foam metal, a metal web, a sintered metal, carbon paper, and carbon cloth.

The void ratio of anode conductive porous layer 36 is preferably not less than 10% and not more than 95%, and more preferably not less than 30% and not more than 85%. If the void ratio of anode conductive porous layer 36 is less than 10%, there is a possibility that diffusion resistance of methanol cannot be fully reduced. If the void ratio of anode conductive porous layer 36 exceeds 95%, there is a possibility that electrical resistance cannot be reduced.

Further, the thickness of anode conductive porous layer 36 is preferably not less than 10 μm and not more than 1 mm, and more preferably not less than 100 μm and not more than 500 μm. If the thickness of anode conductive porous layer 36 is less than 10 μm, there is a possibility that methanol cannot be uniformly supplied in a direction in which anode conductive porous layer 36 is stacked. If the thickness of anode conductive porous layer 36 exceeds 1 mm, there is a possibility that the diffusion resistance of methanol in the direction in which anode conductive porous layer 36 is stacked cannot be fully reduced.

<Cathode Conductive Porous Layer>

Cathode conductive porous layer 26 has a function of supplying and receiving electrons to/from cathode catalyst layer 25, and has holes communicating between the outside of unit cell 50 and cathode catalyst layer 25. Since cathode conductive porous layer 26 is generally maintained at a potential higher than that of anode conductive porous layer 36 during power generation in unit cell 50, a material for cathode conductive porous layer 26 preferably has an excellent corrosion resistance that is equal to or better than that of anode conductive porous layer 36.

As the material for cathode conductive porous layer 26, a material identical to that used for anode conductive porous layer 36 may be used. It is particularly preferable to use a carbon material, an electrically conductive polymer, a noble metal such as Au, Pt, and Pd, a metal such as Ti, Ta, W, Nb, and Cr, a nitride, carbide, or the like of there metals, an alloy such as stainless, Cu—Cr, Ni—Cr, and Ti—Pt, or the like.

If a metal easily corroded under an acidic atmosphere such as Cu, Ag, and Zn is used as the material used for cathode conductive porous layer 26, surface corrosion in cathode conductive porous layer 26 can be prevented by coating its surface with a corrosive-resistant noble metal such as Au, Pt, and Pd, a metal material, an electrically conductive polymer, an electrically conductive nitride, an electrically conductive carbide, an electrically conductive carbonitride, an electrically conductive oxide, or the like. This can increase the lives of unit cell 50 and the fuel cell stack using the same.

The shape of cathode conductive porous layer 26 is not particularly limited, and cathode conductive porous layer 26 of any shape can be used as long as it has communicating holes capable of supplying oxygen in the air surrounding the fuel cell stack to cathode catalyst layer 25. From the viewpoint of supplying oxygen to cathode catalyst layer 25 located at a contact portion between the fuel cell layer constituting the fuel cell stack and the spacer, it is preferable that cathode conductive porous layer 26 has holes communicating in a layer-stacking direction and a direction vertical to the layer-stacking direction inside cathode conductive porous layer 26. Examples of a material for such cathode conductive porous layer 26 can include a foam metal, a metal web, a sintered metal, carbon paper, carbon cloth, and the like.

The void ratio of cathode conductive porous layer 26 is preferably not less than 10% and not more than 95%, and more preferably not less than 30% and not more than 85%. If the void ratio of cathode conductive porous layer 26 is less than 10%, there is a possibility that diffusion resistance of oxygen cannot be fully reduced. If the void ratio of cathode conductive porous layer 26 exceeds 95%, there is a possibility that electrical resistance cannot be reduced.

Further, the thickness of cathode conductive porous layer 26 is preferably not less than 10 μm and not more than 1 mm, and more preferably not less than 100 μm and not more than 500 μm. If the thickness of cathode conductive porous layer 26 is less than 10 μm, there is a possibility that oxygen cannot be uniformly supplied in a direction in which cathode conductive porous layer 26 is stacked. If the thickness of cathode conductive porous layer 26 exceeds 1 mm, there is a possibility that the diffusion resistance of oxygen in the direction in which cathode conductive porous layer 26 is stacked cannot be fully reduced.

<Anode Current Collector>

Anode current collector 37 has a function of supplying and receiving electrons to/from anode catalyst layer 35 or anode conductive porous layer 36. As a shape of anode current collector 37, a shape including fuel flow channel 41 may be used, or the shape having a plurality of holes opened in a plate or foil may be used. However, it is preferable to use a porous body in the shape of a mesh or an expanded metal.

Further, preferably, both front and rear surfaces (i.e., surfaces in contact with anode conductive porous layers 36) of anode current collector 37 are provided with a plurality of holes 52 for fuel supply, and the fuel is supplied from fuel flow channel 41, through holes 52 for fuel supply, to anode conductive porous layers 36 and anode catalyst layers 35.

Although any material can be used for anode current collector 37 as long as the material exhibits electrical conductivity, it is preferable to use a material having high electrical conductivity to reduce electrical resistance. To suppress a voltage drop, it is preferable to use, as a material for anode current collector 37, a noble metal having a low electron conduction resistance such as Au, Pt, and Pd, a metal such as Ti, Ta, W, Nb, Ni, Al, Cr, Ag, Cu, Zn, and Su, Si, a nitride, carbide, carbonitride, or the like thereof, an alloy such as stainless, Cu—Cr, Ni—Cr, and Ti—Pt, or the like, and it is more preferable to include one or more elements selected from the group consisting of Pt, Ti, Au, Ag, Cu, Ni, and W.

If a metal easily corroded under an acidic atmosphere such as Cu, Ag, and Zn is used as the material for anode current collector 37, surface corrosion in anode current collector 37 can be prevented by coating its surface with a corrosive-resistant noble metal such as Au, Pt, and Pd, a metal material, an electrically conductive polymer, an electrically conductive nitride, an electrically conductive carbide, an electrically conductive carbonitride, an electrically conductive oxide, or the like. Using such a material can increase the lives of unit cell 50 and the fuel cell stack using the same.

<Cathode Current Collector>

Cathode current collector 27 has a function of supplying and receiving electrons to/from cathode catalyst layer 25 or cathode conductive porous layer 26, and preferably made of a material having high electrical conductivity to reduce electrical resistance. As a shape of cathode current collector 27, the shape having a plurality of holes opened in a plate or foil, or a shape of a porous body like a mesh or an expanded metal can be preferably used.

Although any material can be used for cathode current collector 27 as long as the material exhibits electrical conductivity, it is preferable to use a material having a low electron conduction resistance to suppress a voltage drop. It is more preferable to use a noble metal such as Au, Pt, and Pd, a metal such as Ti, Ta, W, Nb, Ni, Al, Cr, Ag, Cu, Zn, and Su, Si, a nitride, carbide, carbonitride, or the like thereof, an alloy such as stainless, Cu—Cr, Ni—Cr, and Ti—Pt, or the like, and it is further preferable to include one or more elements selected from the group consisting of Pt, Ti, Au, Ag, Cu, Ni, and W. If a metal easily corroded under an acidic atmosphere such as Cu, Ag, and Zn is used as a material for cathode current collector 27, surface corrosion in cathode current collector 27 can be prevented by coating its surface with a corrosive-resistant noble metal such as Au, Pt, and Pd, a metal material, an electrically conductive polymer, an electrically conductive nitride, an electrically conductive carbide, an electrically conductive carbonitride, an electrically conductive oxide, or the like.

<Sealing Material>

A sealing material 56 is provided to seal at least end surfaces of the anode electrode, and preferably seals end surfaces of the unit cell. By providing sealing material 56 at the end surfaces of the anode electrode as described above, air can be prevented from entering from the end surfaces of the anode electrode, and the produced gas produced by the reaction at the anode electrode can be returned to the fuel flow channel 41 side without being exhausted from the end surfaces of the anode electrode. Further, from the viewpoint of simplifying handling of the unit cell, end surfaces of the electrolyte membrane and end surfaces of the cathode electrode may be sealed, and in addition, end surfaces of the anode current collector and end surfaces of the cathode current collector may be sealed, simultaneously with sealing of the anode electrode.

As a material for forming sealing material 56, it is preferable to use a thermosetting adhesive or an ultraviolet curable adhesive, from the viewpoint of securely bonding the end surfaces of the layers. The adhesive is in a gel state before being cured, and can form sealing material 56 by being applied and thereafter cured.

As the thermosetting adhesive constituting sealing material 56, a mixture of one or more types selected from the group consisting of an olefin-based polymer, a fluorinated elastomer, epoxy resin, phenol resin, urea resin, melamine resin, unsaturated polyester resin, urea-formaldehyde resin, acrylic resin, silicon resin, polyurethane resin, and alkyd resin can be used. Examples thereof can include 1152B polyolefin-based polymer manufactured by Three Bond Co., Ltd, a fluorinated elastomer (product name: SIFEL (registered trademark) (manufactured by Shin-Etsu Chemical Co., Ltd.)), and epoxy resin, and they may be used singly or in combination of two or more types.

However, from the viewpoint of chemical resistance, it is more preferable to use a polyolefin-based polymer (product name: 1152B (manufactured by Three Bond Co., Ltd.) and epoxy resin. Examples of the ultraviolet curable adhesive can include a mixture of a photopolymerization agent and one of ultraviolet curable monomers marketed under the trademarks such as Aronix (manufactured by Toa Gosei Co., Ltd.), Kayamer (manufactured by Nippon Kayaku Co., Ltd.), Ebecryl (manufactured by UCB Japan Co., Ltd.), and Actilane (manufactured by Akcros Chemicals).

<Method of Manufacturing Composite Unit Cell>

The unit cell used in the conventional fuel cell stack has been formed by integrating one unit cell arranged on a single surface with one fuel flow channel. However, the composite unit cell used in the fuel cell stack according to the present embodiment is formed by integrating unit cells arranged on the front and rear surfaces of the fuel flow channel at once, and thereby the number of integrating the unit cells with the fuel flow channel can be reduced when compared with the conventional case. By reducing the number of integrations as described above, the manufacturing process can be simplified when compared with the conventional case.

In a method of fabricating composite unit cell 10 shown in FIG. 14, from the viewpoint of facilitating handling in the fabrication of the composite unit cell, it is preferable to obtain the unit cell by arranging anode conductive porous layer 36, anode catalyst layer 35, electrolyte membrane 60, cathode catalyst layer 25, cathode conductive porous layer 26, and cathode current collector 27 in this order in the layer thickness direction, and pressing them. The order of stacking the constituent members is not limited thereto, and, for example, cathode conductive porous layer 26 and cathode current collector 27 may be stacked in reverse order.

Two unit cells obtained as described above are prepared and arranged to sandwich anode current collector 37 (which may include a fuel flow channel formation member), and the stacked body is integrated by pressing. Thereby, composite unit cell 10 can be fabricated.

As a method of integrating the constituent members as described above, a technique of performing thermocompression bonding (hereinafter also referred to as "hot pressing") is preferably used. By performing hot pressing in this manner, the constituent members are bonded by physical adsorption called an "anchor effect", and integrated. The hot pressing is performed by sandwiching the constituent members arranged in the above order with stainless plates in a room temperature atmosphere, and applying pressure in the thickness direction, at 130° C. and 10 kgf/cm$^2$, for 10 minutes.

It is to be noted that the conditions for the hot pressing are not limited to the above values, because they differs depending on the type of the electrolyte membrane. Further, the method of integrating the layers is not limited to integration by pressing, and any other method may be used to integrate the layers.

After the integration by hot pressing as described above, it is preferable to seal end surfaces of composite unit cell 10 using sealing material 56. By sealing the end surfaces of composite unit cell 10 in this manner, air can be prevented from entering from the end surfaces of the anode electrode, and the produced gas produced by the reaction at the anode electrode can be returned to the fuel flow channel 41 side without being exhausted from the end surfaces of the anode electrode.

By constituting the fuel cell layer using the composite unit cells as in the fuel cell stack according to the present embodiment, constituent members of the fuel cell stack can be more commonalized and the number of the constituent members can be reduced when compared with the conventional case. In addition, fuel supply and air supply to the fuel cell stack can be performed more efficiently, and thus the output density of the fuel cell stack can be increased. Further, the manufacturing process for the fuel cell stack can be simplified.

Embodiment B

Figure 15:
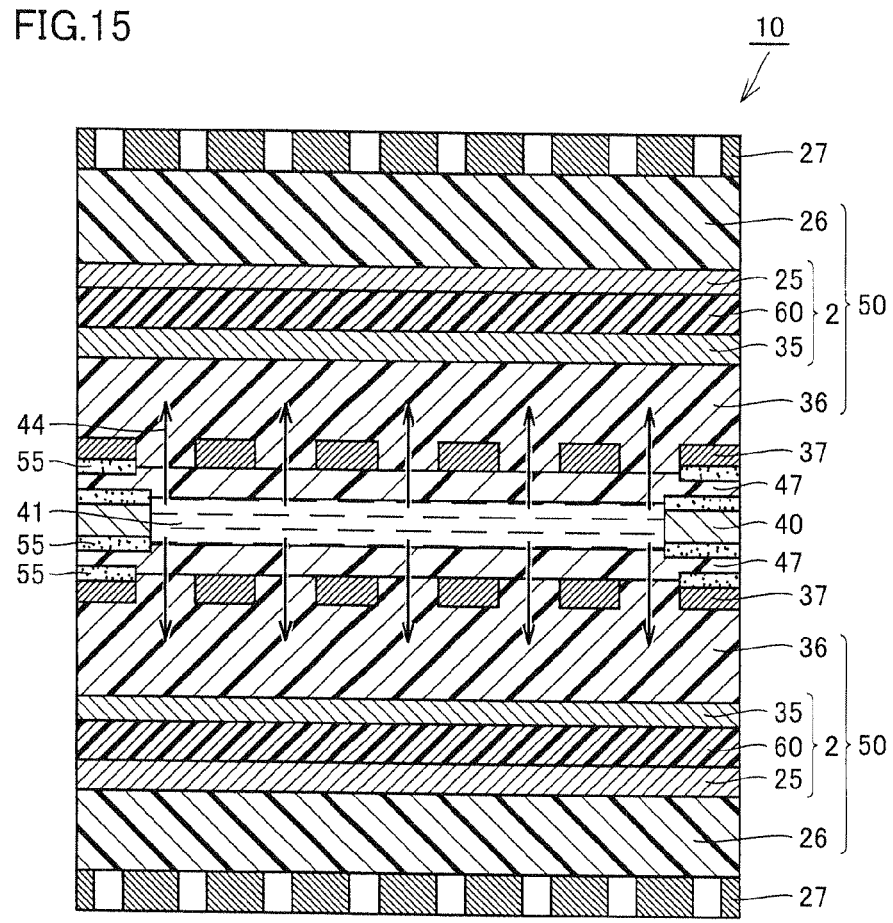
FIG. 15 is a cross sectional view of an exemplary composite unit cell used in the fuel cell stack according to the present invention, in a plane in a layer-stacking direction.

FIG. 15 is a cross sectional view schematically showing an exemplary construction in which a fuel permeation suppressing layer is provided to a composite unit cell used in a fuel cell stack according to the present embodiment. As shown in FIG. 15, the composite unit cell used in the present embodiment is characterized by arranging unit cell 50 including anode current collector 37, anode conductive porous layer 36, anode catalyst layer 35, electrolyte membrane 60, cathode catalyst layer 25, cathode conductive porous layer 26, and cathode current collector 27 on each of the front and rear surfaces of fuel flow channel 41 such that the anode catalyst layer 35 side faces fuel flow channel 41, and providing fuel permeation suppressing layers 47 between fuel flow channel 41 and anode current collectors 37 to suppress an increase in the temperature of the fuel cell stack.

Since a fastening member acting in the fuel cell layer thickness direction is not used in the fuel cell stack according to the present embodiment, fuel flow channel formation member 40 and fuel permeation suppressing layers 47 are bonded to each other via bonding layers 55. In the composite unit cell with such a structure, fuel passes through fuel flow channel 41 formed by fuel flow channel formation member 40, permeates fuel permeation suppressing layers 47, and then are supplied to anode catalyst layers 35.

Here, since a contact angle of liquid fuel with respect to anode conductive porous layer 36 and anode catalyst layer 35 is reduced by using hydrophilized anode conductive porous layer 36 and anode catalyst layer 35, the liquid fuel can be held in anode conductive porous layer 36 and anode catalyst layer 35 during power generation. Thereby, entrance of air from the external atmosphere can be prevented, and power generation characteristics as a cell can be improved. Further, since the contact angle of the liquid fuel with respect to anode conductive porous layer 36 and anode catalyst layer 35 is reduced, air bubbles caused by produced gas are less likely to be held in anode conductive porous layer 36 and anode catalyst layer 35, and the produced gas can be exhausted from end surfaces. In addition, since anode conductive porous layer 36 is generally thicker than anode catalyst layer 35, the produced gas is more likely to be exhausted particularly from the end surfaces of anode conductive porous layer 36.

Any method may be used as a method of performing hydrophilization treatment as long as these members can be hydrophilized, and it is preferable to hydrophilize these members by any of gas-phase oxidation treatment, liquid-phase oxidation treatment, coupling treatment, and plasma treatment. Here, examples of the gas-phase oxidation treatment can include oxidation under an air, ozone, or nitrogen dioxide atmosphere. Examples of the liquid-phase oxidation treatment can include oxidation by a mixed liquid containing phosphoric acid and one of nitric acid, potassium permanganate, chlorous acid, perchloric acid, oxygen saturated water, an aqueous ozone solution, an aqueous bromine solution, sodium hypochlorite, and potassium chromate. Further, examples of the coupling treatment can include treatment using a silane-based, titanate-based, or aluminum-based coupling treatment agent.

By utilizing a difference in surface tension as described above, the produced gas such as carbon dioxide can be separated from the liquid fuel such as an aqueous methanol solution, and the produced gas can be exhausted from long-sides (end surfaces) of the composite unit cell in the shape of a rectangular solid having the longitudinal direction, with the liquid fuel being held in the vicinity of anode catalyst layers 35. Air diffused from the external atmosphere is supplied to cathode catalyst layers 25, through cathode current collectors 27 and cathode conductive porous layers 26.

<Fuel Flow Channel Formation Member>

In the present embodiment, fuel flow channel formation member 40 used for unit cell 50 is a member provided to hold the fuel flow channel for supplying the fuel. From the viewpoint of supplying the fuel to the anode electrodes of unit cells 50 arranged on both surfaces of one fuel flow channel 41, fuel flow channel formation member 40 preferably has a shape provided with a space penetrating in the thickness direction. Such a space portion penetrating in the thickness direction serves as fuel flow channel 41 when the composite unit cell is constructed.

Such a shape of fuel flow channel formation member 40 does not necessarily have to penetrate in the thickness direction, and any shape may be used as long as the shape allows the fuel to be supplied to the anode electrodes of the unit cells provided on front and rear surfaces of fuel flow channel formation member 40. For example, the shape of fuel flow channel formation member 40 may have a structure in which grooves are formed in the thickness direction from the front and rear surfaces of fuel flow channel formation member 40 and thereby a portion of fuel flow channel formation member 40 serving as the fuel flow channel has a significantly reduced thickness (i.e., a structure in which fuel flow channel formation member 40 has an H-shaped cross section in the direction in which the fuel flows).

Further, by using a highly heat conductive metal or the like as fuel flow channel formation member 40 forming fuel flow channel 41, heat exchange between the fuel and the fuel cell stack is accelerated, and thus the fuel cell stack can be efficiently cooled down.

Although a polymer excellent in acid resistance and chemical resistance such as polyimide, PVDF (polyvinylidene fluoride), PTFE (polytetrafluoroethylene), and PEEK (registered trademark) may be used as a material for fuel flow channel formation member 40, it is preferable to use a metal from the viewpoint of good workability. Further, it is preferable to use a material identical to that for anode current collector 37, and it is preferable to use a noble metal such as Au, Pt, and Pd, a metal such as Ti, Ta, W, Nb, Ni, Al, Cr, Ag, Cu, Zn, and Su, Si, a nitride, carbide, carbonitride, or the like thereof, an alloy such as stainless, Cu—Cr, Ni—Cr, and Ti—Pt, or the like.

If a metal easily corroded under an acidic atmosphere such as Cu, Ag, and Zn is used as the material used for fuel flow channel formation member 40, surface corrosion in fuel flow channel formation member 40 can be prevented by coating its surface with a corrosive-resistant noble metal such as Au, Pt, and Pd, a metal material, an electrically conductive polymer, an electrically conductive nitride, an electrically conductive carbide, an electrically conductive carbonitride, an electrically conductive oxide, or the like.

<Fuel Permeation Suppressing Layer>

In a case where the fuel is supplied form one fuel flow channel to one unit cell as in the conventional fuel cell stack, even if the temperature of the fuel cell stack is increased to an extent, it has been possible to decrease the temperature of the fuel cell stack by causing the fuel at about room temperature contained in a fuel cartridge to flow through the fuel flow channels.

However, in the fuel cell stack according to the present embodiment, one fuel flow channel is used in common for two unit cells by employing the composite unit cell in the fuel cell layer. Therefore, the temperature of the fuel cell stack according to the present embodiment is easily increased, at a rate nearly double that of the conventional fuel cell stack, due to heat generated by power generation in the unit cells provided on the both surfaces of one fuel flow channel.

As the temperature inside the fuel cell stack is increased, the speed at which the fuel permeates the electrolyte membrane is increased, causing an increase in the crossover amount of the fuel. Further, the fuel reaching the cathode catalyst layers due to the crossover of the fuel directly reacts with air, causing a further increase in the temperature of the fuel cell stack. Repetition of these temperature increases may cause thermal runaway of the fuel cell stack. In addition, increases in the temperature of the fuel cell stack may also accelerate deterioration of parts and the like constituting an electronic device equipped with the fuel cell stack.

In composite unit cell 10 used in the present embodiment, it is preferable to provide fuel permeation suppressing layers 47 between fuel flow channel 41 and anode catalyst layers 35. By providing fuel permeation suppressing layers 47 in this manner, fuel supply from fuel flow channel 41 to anode catalyst layers 35 can be adjusted by fuel permeation suppressing layers 47, even if a pump having a low flow rate is used. Therefore, a necessary sufficient amount of fuel can be supplied, and power consumption by the pump can be suppressed low.

In addition, by providing fuel permeation suppressing layers 47 in this manner, the supply amount of fuel reaching anode catalyst layers 35 can be adjusted even if a high concentration of fuel is supplied to fuel flow channel 41. Thus, the crossover amount can be suppressed, and an increase in the temperature of the fuel cell stack can be suppressed.

Further, since produced water produced on the cathode catalyst layer 25 sides permeates electrolyte membranes 60 and reaches the anode catalyst layer 35 sides to dilute the concentration of the fuel at anode catalyst layers 35, the concentration of the fuel within anode catalyst layers 35 can be reduced, which can also suppress the crossover.

As fuel permeation suppressing layer 47, it is preferable to use the one having diffusion resistance of the fuel in the thickness direction, and having a low amount of fuel permeation from fuel flow channel 41 to anode catalyst layer 35.

Other than the method of providing fuel permeation suppressing layer 47 to the unit cell, a method of decreasing the crossover amount of the fuel by reducing the concentration of the fuel to be supplied is also conceivable as a method of suppressing the crossover. However, if the concentration of the fuel is reduced, it is necessary to supply a large amount of fuel to the fuel cell stack to suppress fuel supply shortage, which may increase power consumption by auxiliary equipment such as a pump. This is contrary to the intended purpose, and thus is not preferable.

Any material may be used as a material used for fuel permeation suppressing layer 47 as long as the material is a liquid permeation membrane having relatively low fuel permeability, and it is preferable to use a solid polymer electrolyte membrane made of a hydrocarbon-based solid polymer electrolyte membrane. Examples thereof can include a mixture of carbon and one of sulfonated polyimide, sulfonated polyether ether ketone, sulfonated polyarylene ether sulfone, sulfonated polysulfone, fluorocarbon resin, epoxy resin, and polyolefin-based resin.

Further, if fuel permeation suppressing layer 47 does not have sufficient resistance to dissolution in the fuel, the resistance to dissolution of fuel permeation suppressing layer 47 in the fuel can be increased by irradiating the material used for fuel permeation suppressing layer 47 with electron beams, radiation, or the like and thereby increasing three-dimensional mesh structures in a polymer material constituting fuel permeation suppressing layer 47.

<Bonding Layer>

In composite unit cell 10 used in the present embodiment, bonding layer 55 is provided to bond the constituent members, and any material may be used as long as it provides good adhesiveness between anode current collector 37 and fuel permeation suppressing layer 47 and good adhesiveness between anode current collector 37 and fuel flow channel formation member 40. As such an adhesive, a thermosetting adhesive, an ultraviolet curable adhesive, or a double-faced adhesive tape can be used.

The adhesive is in a gel state before being cured, and can form bonding layer 55 by being applied by an application method such as screen application and spray application and thereafter cured. Although the thickness of bonding layer 55 is not particularly limited and any thickness may be used, it is preferably 1 to 200 μm from the viewpoint of adhesiveness.

In the present embodiment, as the thermosetting adhesive constituting bonding layer 55, a mixture of one or more types selected from the group consisting of an olefin-based polymer, a fluorinated elastomer, epoxy resin, phenol resin, urea resin, melamine resin, unsaturated polyester resin, urea-formaldehyde resin, acrylic resin, silicon resin, polyurethane resin, and alkyd resin can be used. Examples thereof can include 1152B polyolefin-based polymer manufactured by Three Bond Co., Ltd, a fluorinated elastomer (product name: SIFEL (registered trademark) (manufactured by Shin-Etsu Chemical Co., Ltd.)), and epoxy resin, and they may be used singly or in combination of two or more types. However, from the viewpoint of chemical resistance, it is more preferable to use a polyolefin-based polymer (product name: 1152B (manufactured by Three Bond Co., Ltd.) and epoxy resin. Examples of the ultraviolet curable adhesive can include a mixture of a photopolymerization agent and one of ultraviolet curable monomers marketed under the trademarks such as Aronix (manufactured by Toa Gosei Co., Ltd.), Kayamer (manufactured by Nippon Kayaku Co., Ltd.), Ebecryl (manufactured by UCB Japan Co., Ltd.), and Actilane (manufactured by Akcros Chemicals).

Any double-faced adhesive tape may be used as long as it is thin and excellent in chemical resistance and heat resistance, and examples thereof can include a heat-resistant double-faced adhesive tape (product name: No. 5915 (manufactured by Nitto Denko Corporation)).

<Method of Fabricating Composite Unit Cell>

A method of fabricating the composite unit cell having the construction shown in FIG. 15 will be described. If an adhesive is used for bonding layer 55, it is preferable to form bonding layer 55 on a surface of fuel flow channel formation member 40 to which fuel permeation suppressing layer 47 is to be joined, by using the screen application method and the spray application method.

Further, if a double-faced adhesive tape is used for bonding layer 55, it is preferable to form bonding layer 55 by affixing the double-faced adhesive tape cut to match the width of fuel flow channel formation member 40 to the surface of fuel flow channel formation member 40 to which fuel permeation suppressing layer 47 is to be joined.

Fuel flow channel formation member 40 and fuel permeation suppressing layer 47 are joined to sandwich bonding layer 55 formed as described above. Similarly, another fuel permeation suppressing layer 47 is joined to the other surface of fuel flow channel 41. On the other hand, aside from this, a stacked body including unit cell 50 is fabricated by stacking anode current collector 37, anode conductive porous layer 36, anode catalyst layer 35, electrolyte membrane 60, cathode catalyst layer 25, cathode conductive porous layer 26, and cathode current collector 27 in this order and integrating them using hot pressing or the like. Each stacked body is joined to a surface of fuel permeation suppressing layer 47 opposite to its surface that faces fuel flow channel formation member 40, via bonding layer 55, to fabricate composite unit cell 10 shown in FIG. 15.

Since fuel permeation suppressing layers 47 are arranged to cover fuel flow channel 41 in composite unit cell 10 shown in FIG. 15, composite unit cell 10 is excellent in that arrangement and position of fuel permeation suppressing layer 47 can be easily determined. However, at least two joining steps, that is, a step of joining fuel flow channel formation member 40 and fuel permeation suppressing layer 47 and a step of joining the fuel permeation suppressing layer and the anode current collector, are required each time when unit cell 50 is fabricated on one surface, raising a problem that the manufacturing process is complicated. By increasing a contact area between anode current collectors 37 and anode conductive porous layers 36 as in composite unit cell 10 shown in FIG. 15, electrical resistance within composite unit cell 10 can be reduced.

Embodiment C

Figure 16:
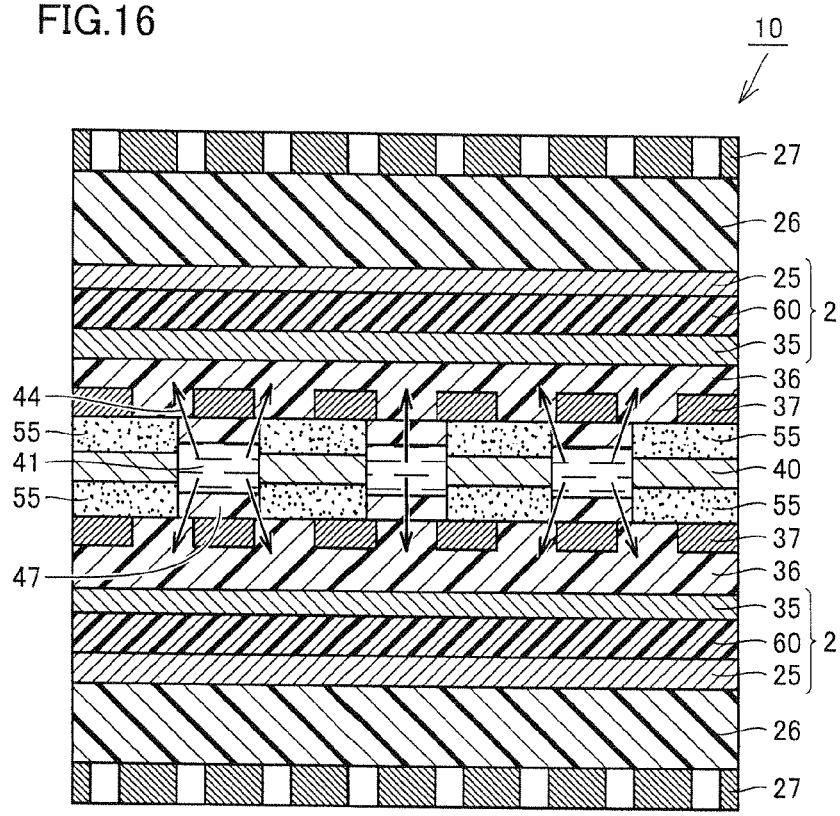
FIG. 16 is a cross sectional view of an exemplary composite unit cell used in the fuel cell stack according to the present invention, in a plane in a layer-stacking direction.

FIG. 16 is a cross sectional view schematically showing an exemplary preferable construction of a composite unit cell used in a fuel cell stack according to the present embodiment. In the present embodiment, the fuel cell stack is characterized in that fuel permeation suppressing layers 47 are provided to cover only fuel flow channel 41, instead of covering entire fuel flow channel formation member 40 as in the structure of the composite unit cell of FIG. 15. That is, as shown in FIG. 16, although bonding layers 55 are formed on the front and rear surfaces of fuel flow channel formation member 40, there are a location where fuel flow channel formation member 40 and fuel permeation suppressing layer 47 are joined by one bonding layer 55, and a location where fuel flow channel formation member 40 and anode current collector 37 are joined by the one bonding layer 55.

By joining fuel flow channel formation member 40, fuel permeation suppressing layer 47, and anode current collector 37 at once using one bonding layer 55 as described above, the manufacturing process can be more simplified.

Fuel permeates fuel permeation suppressing layers 47 from fuel flow channel 41, and is supplied to anode catalyst layers 35. By providing fuel permeation suppressing layers 47 in this manner, fuel supply from fuel flow channel 41 to anode catalyst layers 35 can be adjusted by fuel permeation suppressing layers 47, even if a pump having a low flow rate is used. Therefore, a necessary sufficient amount of fuel can be supplied, and power consumption by the pump can be suppressed low. Further, if produced gas is produced by the oxidation reaction of the fuel, the produced gas is preferably exhausted from the long-sides (end surfaces) of the composite unit cell in the shape of a rectangular solid having the longitudinal direction, as in the composite unit cell described in Embodiment B.

In addition, even if a high concentration of fuel is supplied to fuel flow channel 41, fuel permeation suppressing layers 47 can adjust the supply amount of fuel reaching anode catalyst layers 35, and thus the crossover amount can be suppressed and an increase in the temperature of the fuel cell stack can be suppressed.

Further, since produced water produced on the cathode catalyst layer 25 sides permeates electrolyte membranes 60 and reaches the anode catalyst layer 35 sides to dilute the concentration of the fuel at anode catalyst layers 35, the concentration of the fuel within anode catalyst layers 35 can be reduced, which can also suppress the crossover.

A method of fabricating the composite unit cell having the construction shown in FIG. 16 will be described. If an adhesive is used for bonding layer 55, bonding layers 55 are formed on the front and rear surfaces of fuel flow channel formation member 40, by using the screen application method or the spray application method. On the other hand, if a double-faced adhesive tape is used for bonding layer 55, bonding layers 55 are formed by affixing the double-faced adhesive tapes cut to match the width of fuel flow channel formation member 40 to the front and rear surfaces of fuel flow channel formation member 40.

Fuel flow channel formation member 40 and fuel permeation suppressing layers 47 are joined and fixed to sandwich bonding layers 55 formed as described above. Here, fuel permeation suppressing layers 47 are fixed to cover fuel flow channel 41, instead of covering entire fuel flow channel formation member 40. On the other hand, aside from this, a stacked body including unit cell 50 is fabricated by stacking anode current collector 37, anode conductive porous layer 36, anode catalyst layer 35, electrolyte membrane 60, cathode catalyst layer 25, and cathode conductive porous layer 26 in this order from below and integrating them using hot pressing or the like. Two such stacked bodies are prepared.

Then, a surface of anode current collector 37 opposite to its surface that faces anode conductive porous layer 36 in each of the two unit cells obtained as described above is fixed to face bonding layer 55 formed on fuel flow channel formation member 40. Subsequently, the adhesive used for bonding layers 55 is cured to fabricate composite unit cell 10 having a structure shown in FIG. 16. Composite unit cell 10 shown in FIG. 16 is excellent in that manufacturing time can be shortened because fuel flow channel formation member 40, fuel permeation suppressing layers 47, and anode current collectors 37 can be joined at once.

However, since fuel permeation suppressing layer 47 having a shape that matches the shape of fuel flow channel 41 is required, arrangement and positioning of fuel permeation suppressing layer 47 becomes complicated when compared with the case of fabricating the composite unit cell shown in FIG. 15. Further, since the contact area between anode current collectors 37 and anode conductive porous layers 36 can be increased in the composite unit cell shown in FIG. 16 as in the composite unit cell shown in FIG. 15, the electrical resistance within composite unit cell 10 can be reduced.

Embodiment D

Figure 17:
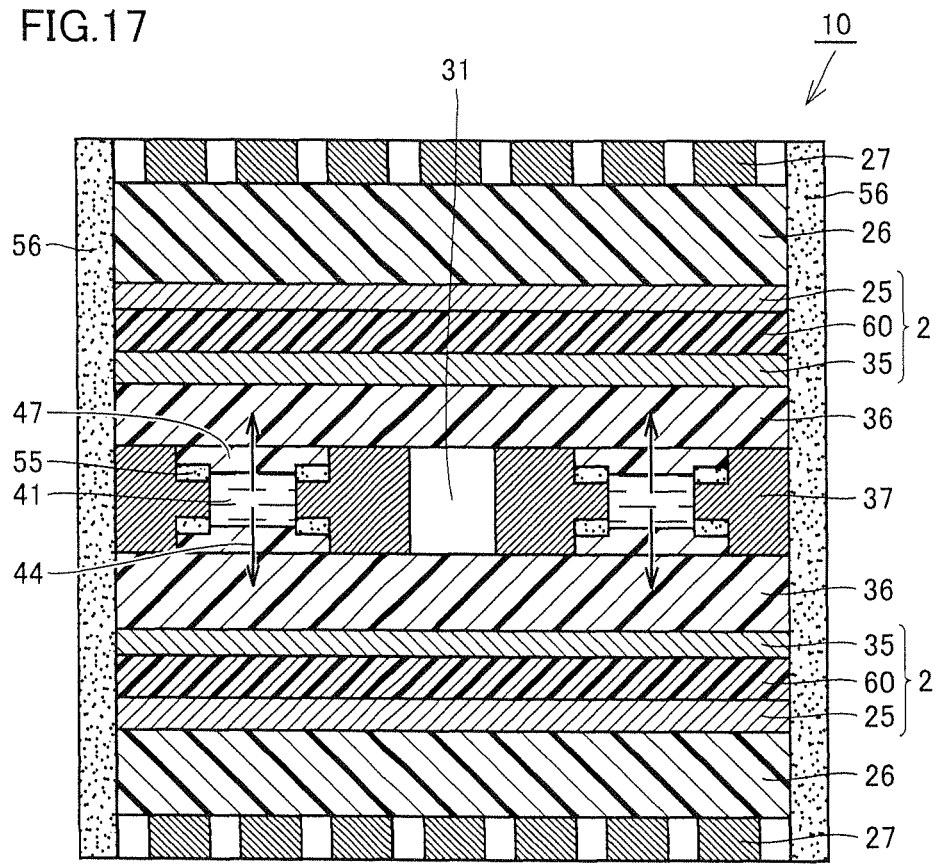
FIG. 17 is a cross sectional view of an exemplary composite unit cell used in the fuel cell stack according to the present invention, in a plane in a layer-stacking direction.

FIG. 17 is a cross sectional view schematically showing an exemplary preferable construction of a composite unit cell used in a fuel cell stack according to the present embodiment. Unlike the composite unit cells shown in FIGS. 15 and 16, composite unit cell 10 shown in FIG. 17 is characterized in that anode current collector 37 has fuel flow channel 41 and a gas exhaust path 31. Gas exhaust path 31 is provided to exhaust produced gas, and has a shape having the longitudinal direction in fuel flow channel 41.

As in composite unit cell 10 shown in FIG. 16, in the composite unit cell according to the present embodiment, each fuel permeation suppressing layer 47 is joined to a portion of anode current collector 37 via the adhesive, to cover fuel flow channel 41. Here, to reduce the electrical resistance within the composite unit cell, the contact area between anode conductive porous layers 36 and anode current collector 37 is increased by providing a step difference to a portion of anode current collector 37 corresponding to fuel flow channel 41, and arranging fuel permeation suppressing layer 47 in the step difference.

By providing fuel permeation suppressing layers 47 in this manner, fuel supply from fuel flow channel 41 to anode catalyst layers 35 can be adjusted by fuel permeation suppressing layers 47, even if a pump having a low flow rate is used. Therefore, a necessary sufficient amount of fuel can be supplied, and power consumption by the pump can be suppressed low.

In addition, by providing fuel permeation suppressing layers 47 in this manner, the supply amount of fuel reaching anode catalyst layers 35 can be adjusted even if a high concentration of fuel is supplied to fuel flow channel 41. Thus, the crossover amount can be suppressed, and an increase in the temperature of the fuel cell stack can be suppressed.

Further, anode conductive porous layers 36 and anode current collector 37 are bonded by sealing materials 56 at the end surfaces of composite unit cell 10. By bonding anode conductive porous layers 36 and anode current collector 37 in this manner, entrance of air into the anode electrodes can be prevented. In addition, since anode conductive porous layers 36 and anode current collector 37 have a sufficient contact surface, electrical resistance at interfaces thereof can be reduced.

Furthermore, from the viewpoint of preventing fuel from being exhausted through gas exhaust path 31, it is preferable to subject anode conductive porous layers 36 to hydrophilization treatment. By being subjected to hydrophilization treatment, anode conductive porous layers 36 can easily hold the fuel therein, preventing the fuel from being exhausted from gas exhaust path 31.

It is to be noted that, if gas exhaust path 31 is formed in fuel flow channel formation member 40 as in the composite unit cell shown in FIG. 17, it is preferable that relationship $L_1/L_2$ between length $L_1$ of the width of fuel flow channel 41 and length $L_2$ of the width of unit cell 50 is not less than 0.4.

A method of fabricating the composite unit cell having the construction shown in FIG. 17 will be described. If an adhesive is used for bonding layer 55, bonding layer 55 is formed in each step difference portion of anode current collector 37 provided to arrange fuel permeation suppressing layer 47, by using the screen application method or the spray application method. On the other hand, if a double-faced adhesive tape is used for bonding layer 55, bonding layer 55 is formed by affixing the double-faced adhesive tape cut to match the step difference portion of anode current collector 37 to a surface of fuel flow channel formation member 40 to which fuel permeation suppressing layer 47 is to be joined.

Anode current collector 37 and fuel permeation suppressing layers 47 are fixed to face each other and sandwich bonding layers 55 formed as described above, and then bonding layers 55 are cured. On the other hand, aside from this, the unit cell is fabricated by stacking anode conductive porous layer 36, anode catalyst layer 35, electrolyte membrane 60, cathode catalyst layer 25, and cathode conductive porous layer 26 in this order from below and integrating them using hot pressing or the like. Two such unit cells are prepared.

Subsequently, a surface of anode conductive porous layer 36 opposite to its surface that faces anode catalyst layer 35 in each of the two unit cells is fixed to face anode current collector 37. Thereafter, the end surfaces of composite unit cell 10 are securely fixed using sealing materials 56, and sealing materials 56 are cured. By fixing the end surfaces of composite unit cell 10 in this manner, an electron conduction path between anode current collector 37 and anode conductive porous layers 36 is formed, and thereby electrical resistance between anode current collector 37 and anode conductive porous layers 36 can be reduced.

Since anode current collector 37 and anode conductive porous layers 36 are not integrated by hot pressing or the like in composite unit cell 10 having the structure shown in FIG. 17, the contact area between anode current collector 37 and anode conductive porous layers 36 is smaller than those in the composite unit cells shown in FIGS. 15 and 16. Therefore, electrical resistance is slightly higher.

However, since composite unit cell 10 according to the present embodiment is provided with gas exhaust path 31 for exhausting gas produced at the anode electrodes, it can efficiently exhaust the produced gas, when compared with the composite unit cells shown in FIGS. 15 and 16. Thereby, an increase in pressure within composite unit cell 10 due to the produced gas can be suppressed, and thus the effect of suppressing peel-off of the layers forming composite unit cell 10 can be achieved.

Embodiment E

Figure 18:
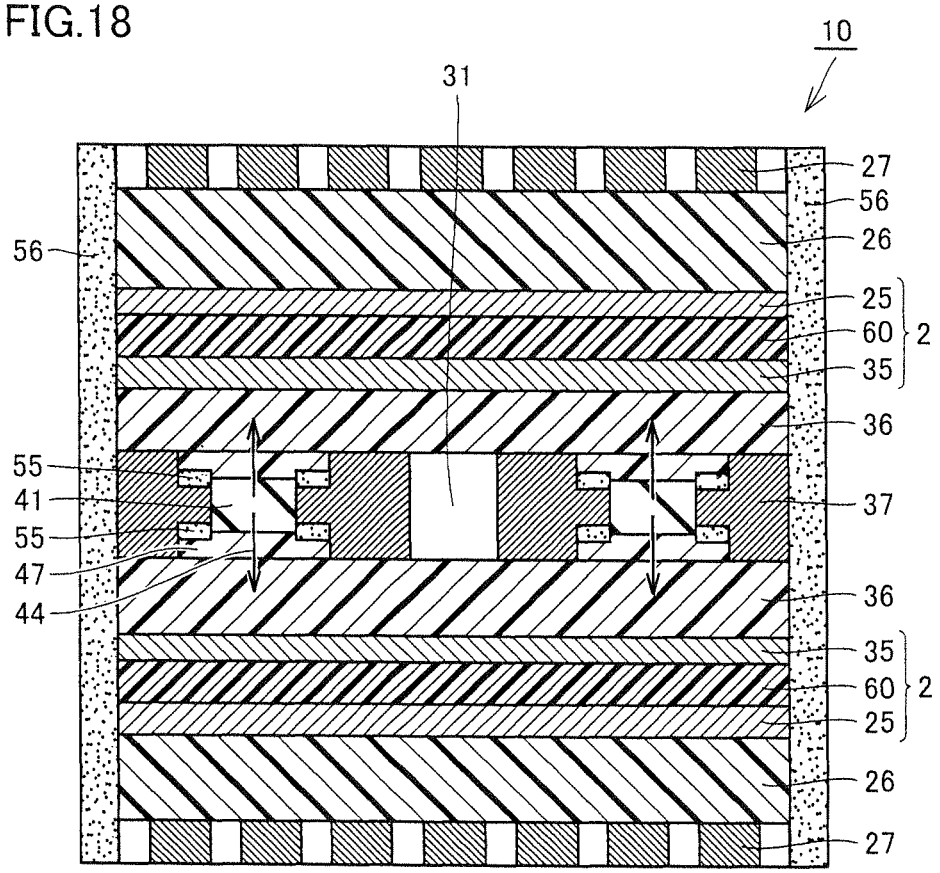
FIG. 18 is a cross sectional view of an exemplary composite unit cell used in the fuel cell stack according to the present invention, in a plane in a layer-stacking direction.

FIG. 18 is a cross sectional view schematically showing an exemplary preferable construction of a composite unit cell used in a fuel cell stack according to the present embodiment. Composite unit cell 10 according to the present embodiment is characterized in that a hydrophilic porous body is arranged inside fuel flow channel 41 in the composite unit cell shown in FIG. 17. By providing the hydrophilic porous body inside fuel flow channel 41 in this manner, performance of holding fuel inside fuel flow channel 41 is improved, and thus the fuel can be supplied to the anode catalyst layers more efficiently.

Examples of the hydrophilic porous body provided inside fuel flow channel 41 can include a polymer non-woven fabric such as cotton and polyester, a metal-polymer composite body formed by applying or modifying a hydrophilic polymer or attaching a hydrophilic polymer film on a surface of a metal oxide such as titanium oxide and silica. Among these hydrophilic porous bodies, it is preferable to use a material having chemical resistance and heat resistance.

The porous body provided in fuel flow channel 41 preferably has a shape extended in parallel to fuel flow channel 41 to be capable of being arranged inside fuel flow channel 41, and more preferably has a shape having the longitudinal direction to the fuel holding portion holding the fuel, for example, a fuel cartridge. Further, the hydrophilic porous body preferably has a thickness smaller than that of the groove in fuel flow channel 41.

The fuel is transported from the fuel holding portion (not shown), via the hydrophilic porous body, to fuel flow channel 41 by the capillary phenomenon, and permeates fuel permeation suppressing layers 47 and is supplied to anode catalyst layers 35. Further, if produced gas is produced by the oxidation reaction of the fuel, the produced gas is preferably exhausted from gas exhaust path 31 having a length in the same direction as that of fuel flow channel 41, as in the composite unit cell shown in FIG. 17. Furthermore, air diffused from the external atmosphere is supplied to cathode catalyst layers 25, through cathode current collectors 27 and cathode conductive porous layers 26.

A process of fabricating the composite unit cell shown in FIG. 18 is similar to the process of fabricating the composite unit cell shown in FIG. 17, and is characterized by providing a hydrophilic porous body inside fuel flow channel 41 before arranging fuel permeation suppressing layers 47 on anode current collector 37 in which fuel flow channel 41 is formed. The composite unit cell according to the present embodiment can be fabricated through a process that is identical to that of Embodiment D except for the above point.

However, since the composite unit cell according to the present embodiment supplies the fuel to the anode catalyst layers 35 of the unit cells by utilizing the capillary phenomenon caused in the hydrophilic porous body, the hydrophilic porous body is required to extend to the fuel holding portion to come into contact with the fuel within the fuel holding portion. Composite unit cell 10 according to the present embodiment is suitable for passive fuel supply that does not require a pump for fuel supply and the like.

By using composite unit cell 10 with such a construction, electric power, a driver circuit, and the like required to drive a fuel pump can be reduced, and noise and vibration caused when the fuel pump is driven can also be suppressed. Therefore, composite unit cell 10 according to the present embodiment is suitably used for a portable information electronic device.

Although the present embodiment illustrates the configuration in which the hydrophilic porous body is incorporated into fuel flow channel 41 included in composite unit cell 10 of FIG. 17, composite unit cell 10 having the configuration in which the hydrophilic porous body is incorporated into fuel flow channel 41 in this manner is not limited to the case of the present embodiment, and is also applicable to fuel flow channel 41 in composite unit cells 10 shown in FIGS. 14 and 15.

Embodiment F

Figure 19:
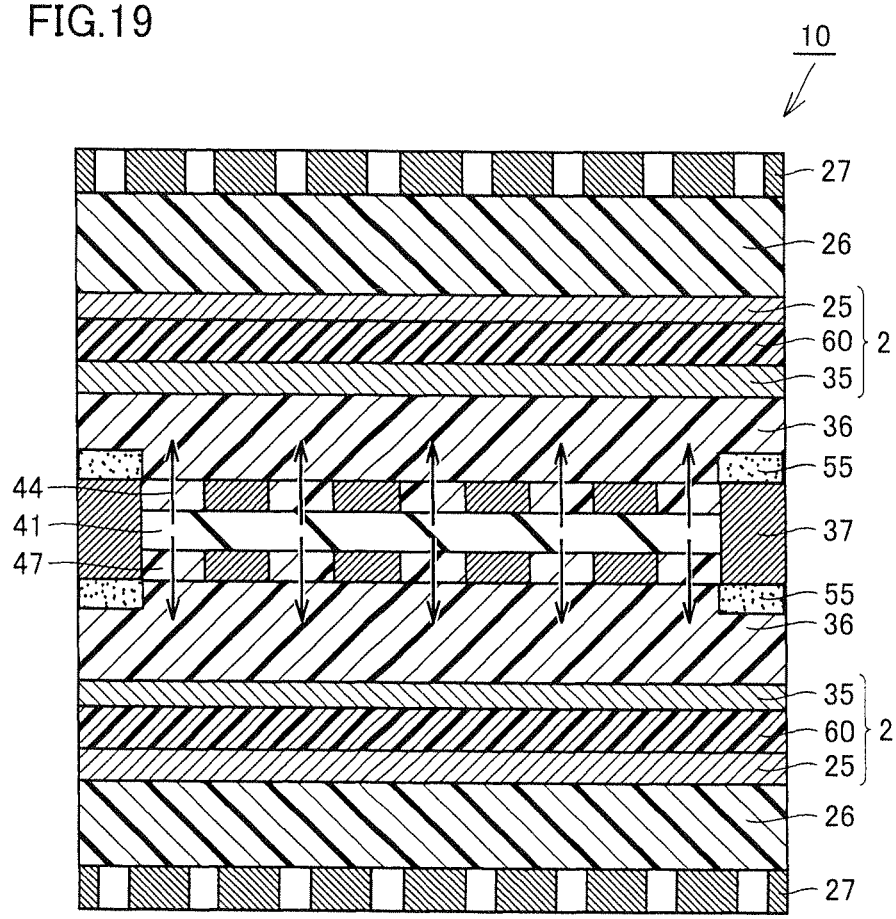
FIG. 19 is a cross sectional view of an exemplary composite unit cell used in the fuel cell stack according to the present invention, in a plane in a layer-stacking direction.

FIG. 19 is a cross sectional view schematically showing an exemplary preferable construction of a composite unit cell used in a fuel cell stack according to the present embodiment. Composite unit cell 10 according to the present embodiment is characterized in that it uses anode current collector 37 constituting composite unit cell 10 which is provided with a plurality of anode holes for supplying fuel to the anode electrodes of the unit cells, and that fuel permeation suppressing layers 47 are formed inside the anode holes.

By providing fuel permeation suppressing layers 47 in this manner, fuel supply from fuel flow channel 41 to anode catalyst layers 35 can be maintained by fuel permeation suppressing layers 47, even if a pump having a low flow rate is used. Therefore, a necessary sufficient amount of fuel can be supplied, and power consumption by the pump can be suppressed low.

In addition, by providing fuel permeation suppressing layers 47 in this manner, the supply amount of fuel reaching anode catalyst layers 35 can be adjusted even if a high concentration of fuel is supplied to fuel flow channel 41. Thus, the crossover amount can be suppressed, and an increase in the temperature of the fuel cell stack can be suppressed.

With such a construction of composite unit cell 10, the contact area between anode conductive porous layers 36 and anode current collector 37 can be increased, and thereby the electrical resistance within the composite unit cell can be reduced.

Further, composite unit cell 10 according to the present embodiment is characterized in that a hydrophilic porous body is arranged inside fuel flow channel 41 as in the composite unit cell shown in FIG. 18.

With the above construction, adhesion force between anode current collector 37 and fuel permeation suppressing layers 47 becomes relatively weak. This causes a problem that peel-off occurs between anode current collector 37 and fuel permeation suppressing layers 47 due to internal pressure caused by production of produced gas and pressure applied from a pump or the like to the fuel flow channel during fuel supply.

Therefore, from the viewpoint of preventing such a problem, it is preferable to provide a hydrophilic porous body inside fuel flow channel 41, and it is preferable that fuel permeation suppressing layers 47 are fixed by anode conductive porous layers 36 and the hydrophilic porous body.

By providing the hydrophilic porous body inside the fuel flow channel in this manner, the fuel is transported from the fuel holding portion (not shown), via the hydrophilic porous body, to fuel flow channel 41 by the capillary phenomenon, and permeates fuel permeation suppressing layers 47 from fuel flow channel 41 and is supplied to anode catalyst layers 35.

Here, since a contact angle of liquid fuel with respect to anode conductive porous layer 36 and anode catalyst layer 35 is reduced by using hydrophilized anode conductive porous layer 36 and anode catalyst layer 35, the liquid fuel can be held in anode conductive porous layer 36 and anode catalyst layer 35 during power generation. Thereby, entrance of air from the external atmosphere can be prevented, and power generation characteristics as a cell can be improved. Further, since the contact angle of the liquid fuel with respect to anode conductive porous layer 36 and anode catalyst layer 35 is reduced, air bubbles caused by produced gas are less likely to be held in anode conductive porous layer 36 and anode catalyst layer 35, and the produced gas can be exhausted from end surfaces.

Furthermore, air diffused from the external atmosphere is supplied to cathode catalyst layers 25, through cathode current collectors 27 and cathode conductive porous layers 26.

A method of forming fuel permeation suppressing layers 47 in the anode holes in anode current collector 37 used in the composite unit cell of FIG. 19 will be described. Firstly, a material forming fuel permeation suppressing layer 47 is dissolved in an organic solvent such as acetone, dimethylacetamide (DMAc), N-methyl-2-pyrrolidone (NMP), or the like to obtain a solution. Then, the solution is applied into anode holes 33 formed in anode current collector 37 by the screen printing method or the spray application method to form fuel permeation suppressing layers 47. When fuel permeation suppressing layers 47 are formed in this manner, it is preferable to form a mask at a portion of anode current collector 37 other than the inside of anode holes 33 to protect the portion of anode current collector 37 other than the inside of anode holes 33 from formation of fuel permeation suppressing layers 47. Further, it is preferable that anode current collector 37 and anode conductive porous layers 36 are joined by bonding layers 55.

Embodiment G

Figure 20:
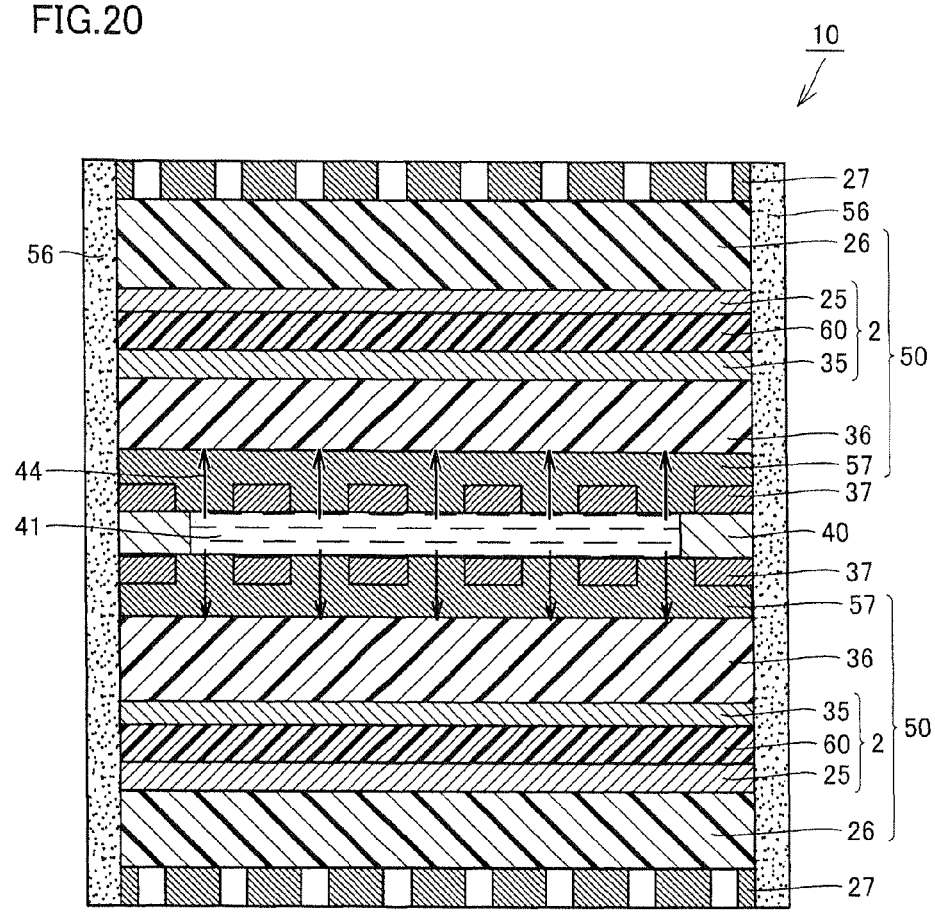
FIG. 20 is a cross sectional view of an exemplary composite unit cell used in the fuel cell stack according to the present invention, in a plane in a layer-stacking direction.

FIG. 20 is a cross sectional view schematically showing an exemplary construction of a composite unit cell used in a fuel cell stack according to the present embodiment. The composite unit cell according to the present embodiment is characterized by providing an electrical conductivity permeation suppressing layer 57 between anode conductive porous layer 36 and anode current collector 37, instead of the fuel permeation suppressing layer suppressing the crossover of the fuel.

By providing electrical conductivity permeation suppressing layer 57 to be in contact with anode conductive porous layer 36 as described above, electrical conductivity between anode current collector 37 and anode conductive porous layer 36 can be maintained, while suppressing the crossover of the fuel. Thereby, the electrical resistance within the composite unit cell can be suppressed. Further, by forming electrical conductivity permeation suppressing layer 57 using a material described later, adhesiveness between anode current collector 37 and anode conductive porous layer 36 can be improved.

Although FIG. 20 shows the composite unit cell in which electrical conductivity permeation suppressing layer 57 is provided between anode conductive porous layer 36 and anode current collector 37, the construction of the composite unit cell is not limited to the configuration in which electrical conductivity permeation suppressing layer 57 is provided at such a position, and for example, electrical conductivity permeation suppressing layer 57 may be provided between anode catalyst layer 35 and anode conductive porous layer 36. However, since an interface between anode conductive porous layer 36 and anode current collector 37 generally has less contact points therebetween than those at an interface between anode catalyst layer 35 and anode conductive porous layer 36, the former interface tends to have a weak adhesiveness and a large electrical resistance. Therefore, from the viewpoint of improving adhesiveness and reducing the electrical resistance within composite unit cell 10, it is preferable to form electrical conductivity permeation suppressing layer 57 between anode conductive porous layer 36 and anode current collector 37.

<Electrical Conductivity Permeation Suppressing Layer>

Preferably, electrical conductivity permeation suppressing layer 57 used in composite unit cell 10 according to the present embodiment is a porous layer including an adhesive and an electrically conductive filler. Since electrical conductivity permeation suppressing layer 57 includes an electrically conductive filler, electrical conductivity permeation suppressing layer 57 has good electrical conductivity in the thickness direction, and thus electrical resistance in the layer-thickness direction of the unit cell can be reduced. Further, since electrical conductivity permeation suppressing layer 57 includes an adhesive, electrical conductivity permeation suppressing layer 57 can firmly bond anode conductive porous layer 36 and anode current collector 37.

In the present embodiment, electrical conductivity permeation suppressing layer 57 used in composite unit cell 10 controls fuel permeation amount by changing the volume of voids produced by contact of the electrically conductive fillers. Further, electrical conductivity permeation suppressing layer 57 can return produced gas produced by the reaction at the anode electrode to the fuel flow channel 41 side through these voids.

In the present embodiment, electrical conductivity permeation suppressing layer 57 is formed by curing an electrically conductive adhesive. The electrically conductive adhesive is applied on anode conductive porous layer 36, and thereafter anode conductive porous layer 36 and anode current collector 37 are fixed via the electrically conductive adhesive. Then, with these members being fixed, the electrically conductive adhesive is cured by application of heat, pressure, or ultraviolet rays, and subsequently the electrically conductive adhesive is cooled down to room temperature. Thereby, electrical conductivity permeation suppressing layer 57 is formed between anode conductive porous layer 36 and anode current collector 37. If the electrically conductive adhesive includes an organic solvent or the like, it is preferable to evaporate the organic solvent or the like by applying heat or ultraviolet rays.

Although any method may be used to apply the electrically conductive adhesive as long as the method can uniformly apply the electrically conductive adhesive, it is preferable to use the screen printing method or the spray application method, from the viewpoint that the electrically conductive adhesive can be applied easily as well as thinly and uniformly.

By forming electrical conductivity permeation suppressing layer 57 using the electrically conductive adhesive as in the present embodiment, there is no need to bond an interface between the constituent members by hot pressing or the like, and the constituent members can be fixed using minimum pressure required and stacked. Thus, anode conductive porous layer 36 and anode current collector 37 can be bonded via electrical conductivity permeation suppressing layer 57, without fuel flow channel 41 formed in fuel flow channel formation member 40 being embedded in anode current collector 37 and anode conductive porous layer 36.

Since fuel flow channel 41 is not embedded in this manner, the depth of fuel flow channel 41 can be maintained more widely, and pressure required for a pump to feed the fuel can be reduced. Therefore, power consumption by the pump can be reduced.

In the present embodiment, electrical conductivity permeation suppressing layer 57 used in composite unit cell 10 can control the amount of fuel permeating electrical conductivity permeation suppressing layer 57 by changing parameters that are relatively easily changed, such as volume content percentage, shape, and grain size of the electrically conductive filler in the electrically conductive adhesive, or surface tensions of the electrically conductive filler and the adhesive. Specifically, the fuel permeation amount can be increased, for example, by increasing the volume content percentage of the electrically conductive filler, or selecting a carbon material in a shape of a football or a rod as the electrically conductive filler.

Preferably, electrical conductivity permeation suppressing layer 57 has a thickness of not less than 1 µm and not more than 80 µm. If the thickness of electrical conductivity permeation suppressing layer 57 is less than 1 µm, there is a possibility that the effect of suppressing fuel permeation cannot be fully obtained. If the thickness of electrical conductivity permeation suppressing layer 57 exceeds 80 µm, electrical resistance of electrical conductivity permeation suppressing layer 57 is increased, which may cause a reduction in power generation efficiency of a fuel cell.

<Electrically Conductive Adhesive>

In the present embodiment, electrical conductivity permeation suppressing layer 57 included in composite unit cell 10 is a layer formed by curing an electrically conductive adhesive, and the electrically conductive adhesive preferably includes an adhesive and an electrically conductive filler. The electrically conductive adhesive does not fall out of the present invention even when it further includes a component other than those described above. Examples of such other component can include an organic solvent for adjusting viscosity of the electrically conductive adhesive.

Here, any electrically conductive filler may be used as long as it has good electrical conductivity. Further, as the adhesive, it is preferable to use any of an ultraviolet curable adhesive, a thermosetting adhesive, and a thermoplastic adhesive.

<Electrically Conductive Filler>

In the present embodiment, as the electrically conductive filler included in the electrically conductive adhesive, any material may be used as long as it has electrical conductivity. However, from the viewpoint of suppressing a voltage drop within electrical conductivity permeation suppressing layer 57, it is preferable to use a material having a low electrical resistance. Examples of such a material can include a carbon material, noble metals such as Au, Pt, and Pd, metals such as Ti, Ta, W, Nb, and Cr, nitrides, carbides, and the like of these metals, alloys such as stainless, Cu—Cr, Ni—Cr, and Ti—Pt, and the like. If a metal easily corroded under an acidic atmosphere such as Cu, Ag, and Zn is used as the material used for the electrically conductive filler, surface corrosion in the electrically conductive filler can be prevented by coating its surface with a corrosive-resistant noble metal and a metal material.

Among the materials for the electrically conductive filler, it is preferable to use a carbon material, from the viewpoint of cost reduction and excellent corrosion resistance. Examples of a suitable carbon material can include acetylene black, Ketjen Black (registered trademark), amorphous carbon, carbon nanotube, and carbon nanohorn. In terms of electrical conductivity and performance of suppressing fuel permeation, it is more preferable to use acetylene black (product name: Vulcan XC72 (manufactured by Cabot Corporation)) and Ketjen Black (registered trademark).

Here, as a shape of the electrically conductive filler included in the electrically conductive adhesive according to the present embodiment, any shape can be used, and examples of the shape can include the shape of a particle, the shape of a football, the shape of a rod, and the like. From the viewpoint of capable of decreasing the electrical resistance of electrical conductivity permeation suppressing layer 57, it is preferable to use the shape of a particle which can increase a contact area between carbons.

Further, by using the electrically conductive filler, voids are produced in electrical conductivity permeation suppressing layer 57 by contact of the electrically conductive fillers, and the voids allow electrical conductivity permeation suppressing layer 57 to exhibit the performance of suppressing fuel permeation. That is, although the fuel can permeate the voids provided in electrical conductivity permeation suppressing layer 57, the fuel permeation amount is suppressed due to high diffusion resistance of the fuel in electrical conductivity permeation suppressing layer 57. Since the fuel permeation amount is suppressed in this manner, occurrence of the crossover of the fuel can be suppressed even if a high concentration of fuel is supplied. Thus, a reduction in the output density of composite unit cell 10 can be suppressed.

As the content of the electrically conductive filler in electrical conductivity permeation suppressing layer 57 is increased, the contact of the electrically conductive fillers is increased, and as a result the volume of the voids is increased, and thus the fuel permeation amount in electrical conductivity permeation suppressing layer 57 can be increased. The volume of the voids differs depending on the content percentage, shape, grain size, and the like of the electrically conductive filler, and also differs depending on a difference between the surface tensions of the electrically conductive filler and the adhesive (for example, hydrophilic properties or hydrophobic properties).

In order to achieve both fuel permeation performance and electrical resistance performance of electrical conductivity permeation suppressing layer 57 at a high level in the present embodiment, it is important to appropriately adjust the content percentage of the electrically conductive filler contained in the electrically conductive adhesive. Specifically, for example, if an aqueous methanol solution is used as the fuel, it is preferable to contain the electrically conductive filler in a content that is not less than 30 wt % and not more than 80 wt % with respect to the total weight of the electrically conductive adhesive, and it is more preferable to contain the electrically conductive filler in a content that is not less than 50 wt % and not more than 70 wt %.

It is to be noted that the fuel permeation amount in electrical conductivity permeation suppressing layer 57 can be suppressed by decreasing the content of the electrically conductive filler within the range of the content of the electrically conductive filler described above, and thereby reducing the volume of the voids formed in electrical conductivity permeation suppressing layer 57. On the other hand, the electrical resistance of electrical conductivity permeation suppressing layer 57 can be reduced by increasing the content of the electrically conductive filler within the range of the content of the electrically conductive filler described above, and thereby increasing the contact area of the electrically conductive fillers.

If the content of the electrically conductive filler with respect to the total weight of the electrically conductive adhesive is less than 30 wt %, particles of the electrically conductive filler contained in electrical conductivity permeation suppressing layer 57 have less contact with each other, which may increase the electrical resistance of electrical conductivity permeation suppressing layer 57. On the other hand, if the content of the electrically conductive filler with respect to the total weight of the electrically conductive adhesive exceeds 80 wt %, the content percentage of the adhesive contained in electrical conductivity permeation suppressing layer 57 is reduced, which may reduce adhesive performance of the electrically conductive adhesive.

Further, electrical conductivity permeation suppressing layer 57 preferably has an electrical resistance in its thickness direction of not more than 100 mΩcm$^2$. If the electrical resistance in the thickness direction of electrical conductivity permeation suppressing layer 57 exceeds 100 mΩcm$^2$, a voltage drop occurs within electrical conductivity permeation suppressing layer 57, resulting in an increase in internal resistance of the fuel cell.

<Adhesive>

Examples of the ultraviolet curable adhesive of the adhesive included in the electrically conductive adhesive can include a mixture of a photopolymerization agent and one of ultraviolet curable monomers marketed under the trademarks such as Aronix (manufactured by Toa Gosei Co., Ltd.), Kayamer (manufactured by Nippon Kayaku Co., Ltd.), Ebecryl (manufactured by UCB Japan Co., Ltd.), and Actilane (manufactured by Akcros Chemicals).

Further, as the thermosetting adhesive of the adhesive included in the electrically conductive adhesive, one type or a mixture of two or more types selected from the group consisting of an olefin-based polymer, a fluorinated elastomer, epoxy resin, phenol resin, urea resin, melamine resin, unsaturated polyester resin, urea-formaldehyde resin, acrylic resin, silicon resin, polyurethane resin, and alkyd resin can be used. Examples of such a thermosetting adhesive can include a polyolefin-based polymer, a fluorinated elastomer (product name: SIFEL (registered trademark) (manufactured by Shin-Etsu Chemical Co., Ltd.)), epoxy resin, and the like, and it is preferable to use them singly or in combination of two or more types. However, from the viewpoint of chemical resistance, it is more preferable to use a polyolefin-based polymer (product name: 1152B (manufactured by Three Bond Co., Ltd) and epoxy resin. Furthermore, examples of the thermoplastic adhesive of the adhesive included in the electrically conductive adhesive can include engineering plastic such as polyamide and polyolefin-based resin, polyimide, polyamide-imide, and the like.

<Organic Solvent>

When the electrically conductive adhesive is applied in the present embodiment, the electrically conductive adhesive may further include an organic solvent to obtain a viscosity appropriate for application. Examples of the organic solvent used for such viscosity adjustment can include acetone, dimethylacetamide (DMAc), and N-methyl-2-pyrrolidone (NMP).

Embodiment H

Figure 21:
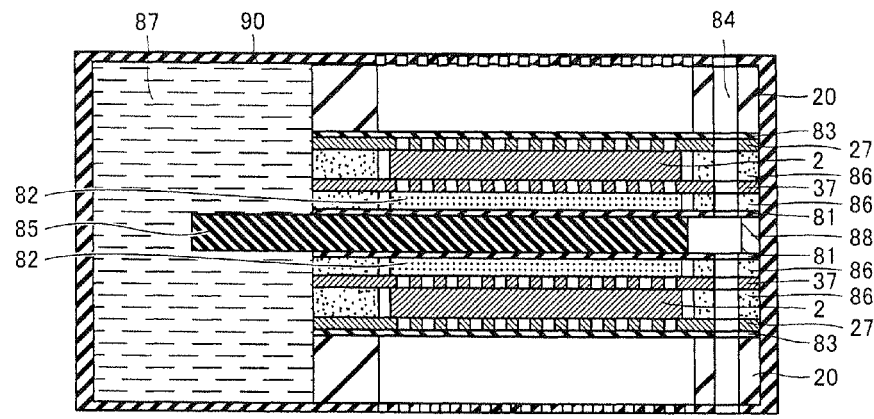
FIG. 21 is a cross sectional view of an exemplary composite unit cell used in the fuel cell stack according to the present invention, in a plane in a layer-stacking direction.

FIG. 21 is a cross sectional view schematically showing an exemplary construction of a composite unit cell used in a fuel cell stack according to the present embodiment. As shown in FIG. 21, in the fuel cell stack according to the present embodiment, the composite unit cell is provided between two spacers 20. As shown in FIG. 21, the composite unit cell is characterized by supplying fuel to the anode electrodes of the unit cells using fuel transportation member 85, instead of the fuel flow channel for the constitution of the composite unit cell of Embodiment A. In association with supplying the fuel to the anode electrodes using fuel transportation member 85 in this manner, fuel storage chamber 87 is provided to come into contact with a side surface of the fuel cell stack. It is to be noted that fuel transportation member 85 used herein is equivalent to the "hydrophilic porous body" described above in Embodiment E.

By using fuel transportation member 85 instead of the fuel flow channel as described above, liquid fuel can be supplied throughout the anode electrodes at a sufficient speed without using auxiliary equipment using external motive power such as a pump and a fan, and thus sufficient electric power can be supplied.

<Fuel Transportation Member>

Fuel transportation member 85 described above is a member for transporting the fuel from fuel storage chamber 87 to the anode electrodes, utilizing the capillary phenomenon. Therefore, fuel transportation member 85 is preferably made of a material exhibiting a capillary action to the fuel. Examples of such a material exhibiting the capillary action can include porous bodies having irregular fine holes, made of acrylic resin, ABS resin, polyvinyl chloride, polyethylene, polyethylene terephthalate, polyether ether ketone, polypropylene, polyester, fluorine-based resin such as polytetrafluoroethylene, cellulose, polyolefin-based resin, a polymer material (plastic material) such as nylon, and a metal material such as stainless, titanium, tungsten, nickel, aluminum, and steel. Examples of the porous body can include a non-woven fabric, a foamed body, a sintered body and the like made of the materials described above. Further, a substrate made of the polymer material or the metal material described above and having regular or irregular slit patterns (groove patterns) on a surface as capillary tubes can also be used as fuel transportation member 85.

In addition, since the porous body described above increases the void ratio, it can improve an amount of liquid fuel that can be held by fuel transportation member 85. This means that, if a soak-up height is identical, the liquid fuel is soaked up at a faster soak-up speed. Therefore, the liquid fuel can also be effectively supplied even to a portion of the anode electrodes apart from fuel storage chamber 87.

Here, the "soak-up height" refers to a position in the fuel transportation member reachable by the fuel due to the capillary phenomenon when one end of the fuel transportation member is immersed in the fuel. If this height is small, the fuel cannot be supplied throughout the anode electrodes, causing a reduction in the output of the fuel cell stack. Further, the "soak-up speed" refers to the volume of the fuel soaked up per unit time when one end of the fuel transportation member is immersed in the fuel. From the viewpoint of obtaining excellent soak-up height and soak-up speed, it is more preferable to use a porous body made of acrylic resin, ABS resin, polyvinyl chloride, polyethylene, polyethylene terephthalate, polyether ether ketone, polypropylene, polyester, fluorine-based resin such as polytetrafluoroethylene, polyolefin-based resin, or nylon, as the fuel transportation member.

The fine holes of fuel transportation member 85 preferably have a diameter of 0.1 to 500 µm, and more preferably have a diameter of 1 to 300 µm. Thereby, the capillary phenomenon sufficient against gravity is caused, and satisfactory soak-up height and soak-up speed can be obtained. It is to be noted that the diameter of the fine holes of fuel transportation member 85 is measured by a mercury intrusion method.

A fiber diameter R of fibers constituting a non-woven fiber fabric and a non-woven fiber fabric sintered body is not particularly limited, and can be set to, for example, 10 to 200 µm. The void ratio of the non-woven fiber fabric and the non-woven fiber fabric sintered body is, for example, 30 to 90%, and the void ratio thereof is preferably 50 to 80% from the viewpoint of improving the soak-up height and the soak-up speed.

Further, a metal porous body prepared by forming a passive layer made of an oxide film on a fiber surface of a non-woven metal fiber fabric sintered body made of stainless, titanium, tungsten, aluminum, or the like is also preferably used as a material constituting fuel transportation member 85. Since elution of metal ions from fuel transportation member 85 to the fuel is prevented when the fiber surface is coated with the oxide film, there is no possibility that the metal ions are trapped in a solid electrolyte component (ion-exchange resin) contained in the MEA and causes a reduction in output.

In addition, particularly when an aqueous alcohol solution having an alcohol concentration of not more than 50 wt % is used as the fuel, wettability of the liquid fuel with respect to the fiber surface is improved by forming a passive layer made of an oxide film. Thus, the soak-up speed and the soak-up height of the fuel are further improved, and the fuel can also be supplied more effectively even to the anode electrodes apart from fuel storage chamber 87.

For such fuel transportation member 85, it is preferable to use a comb-shaped flow channel plate 88 as shown in FIG. 7(A) described above, and fuel transportation member 85 preferably has a comb shape that engages the comb shape of flow channel plate 88. In a case where such comb-shaped fuel transportation member 85 is used, it is preferable to immerse a portion corresponding to the spine of the come shape in the fuel such that the fuel is supplied from the spine to the teeth of the comb shape.

More preferably, fuel transportation member 85 engages flow channel plate 88 with a gap provided therebetween, with no contact therebetween. Causing fuel transportation member 85 to engage flow channel plate 88 with a gap provided therebetween as described above leaves room for exhausting produced gas produced at the anode electrodes to the outside, and thus can improve efficiency of exhausting the produced gas. As a material constituting such flow channel plate 88, a material identical to that for the fuel flow channel formation member described above can be used.

Here, the length of fuel transportation member 85 (i.e., a distance from one end on the fuel storage chamber 87 side to the other opposite end) is not particular limited, and an appropriate length can be set depending on the shape of the entire fuel cell, the shape of the MEA, and the like. Preferably, fuel transportation member 85 has a length such that, when one end of fuel transportation member 85 is arranged at a position at which the one end can come into contact with the fuel held in fuel storage chamber 87, the other end thereof is arranged at a position substantially immediately below an end portion of the anode electrode (i.e., an end portion opposite to the fuel storage chamber 87 side), or a length greater than the above length. Thereby, the fuel can be supplied more effectively throughout the anode electrodes including the end portions of the anode electrodes opposite to the fuel storage chamber 87 side.

It is to be noted that the "position at which the one end can come into contact with the fuel" refers to a case where, for example, as shown in FIG. 21, one end of fuel transportation member 85 is located inside a wall that partitions fuel storage chamber 87. By adjusting the length of fuel transportation member 85 such that one end of fuel transportation member 85 is located inside fuel storage chamber 87, fuel transportation member 85 can come into contact with the fuel regardless of the orientation of the composite unit cell when it is used.

The thickness of fuel transportation member 85 is not particularly limited, and is set as appropriate depending on the thickness of composite unit cell 10, the height of flow channel plate 88, and the like. For example, the thickness of fuel transportation member 85 can be set to about 0.05 to 5 mm, and it is preferably set to 0.1 to 1 mm from the viewpoint of reducing the size of composite unit cell 10 and improving the soak-up height and the soak-up speed.

<Fuel Storage Chamber>

Fuel storage chamber 87 in the present embodiment is a space for holding the fuel preferably arranged on a side of the fuel cell stack. Although the size and shape of fuel storage chamber 87 are not particularly limited, fuel storage chamber 87 is required to have an opening in its side wall surface to allow one end of fuel transportation member 85 to come into contact with the fuel held within fuel storage chamber 87. The opening may be formed of a hole penetrating a wall constituting a portion of a box casing that partitions fuel storage chamber 87 from the fuel cell stack. In this case, fuel transportation member 85 is inserted into the hole such that one end thereof is located inside the hole or located inside fuel storage chamber 87.

Fuel storage chamber 87 in FIG. 21 is formed by casing 90 having a plurality of openings and the fuel cell stack. However, fuel storage chamber 87 does not necessarily have to be constructed using such casing 90, and can also be constructed of, for example, one member including portions forming an upper wall (ceiling wall), a side wall, and a bottom wall of fuel storage chamber 87 as one unit.

In FIG. 21, casing 90 forms the upper wall (ceiling wall) of fuel storage chamber 87, and prevents the composite unit cell from being exposed. A plurality of openings for air flow are formed in casing 90, immediately above the cathode electrode (however, it is only necessary that at least one opening is formed).

<Vaporization Layer>

In a case where fuel transportation member 85 is provided as described above, it is preferable to provide a vaporization layer 81 for supplying vapor of the fuel to the anode electrode, between fuel transportation member 85 and the anode electrode. Since vaporization layer 81 has liquid impermeability and gas permeability, it has a function of decreasing the amount or concentration (partial pressure) of gaseous fuel to be supplied to the anode electrode.

The amount or concentration (partial pressure) of gaseous fuel to be supplied to the anode electrode can be decreased by reducing the diameter of fine holes in vaporization layer 81, which can suppress the crossover in which the fuel permeates through the electrolyte membrane to the cathode electrode.

In a case where alcohol fuel such as methanol and ethanol is used, it is preferable to provide such vaporization layer 81 with water repellency and oil repellency. Vaporization layer 81 having water repellency can prevent entrance of water (for example, water produced at the cathode electrode and moved through the electrolyte membrane to the anode electrode side) to the fuel transportation member 85 side. Thereby, the water concentration at the anode electrode can be maintained satisfactorily, and a reduction in output can be suppressed. This effect is particularly advantageous when high concentration fuel (such as pure methanol) is used. Further, a reduction in the concentration of the liquid fuel within fuel transportation member 85 caused by dissolution of water in the liquid fuel can be prevented. Thus, the concentration of the liquid fuel is maintained constant, and the amount of fuel supply to the anode electrode is stabilized.

Further, vaporization layer 81 having oil repellency can prevent a surface of vaporization layer 81 from being wet by the fuel. Thereby, the produced gas produced by power generation is easily exhausted through vaporization layer 81 to the fuel transportation member 85 side.

Examples of a material used for such vaporization layer 81 can include polytetrafluoroethylene (PTFE), a silicone sheet, and the like. For the reason described above, it is preferable to subject these materials to water-repellent treatment and oil-repellent treatment.

Although the thickness of vaporization layer 81 is not particularly limited, vaporization layer 81 is required to have a sufficient strength, from the viewpoint that it can maintain its shape so as not to have a hole opened or to be warped due to an increase in internal pressure within the anode electrode. Vaporization layer 81 preferably has a thickness of not less than 30 μm, and more preferably has a thickness of not less than 50 μm. Further, from the viewpoint of making the fuel cell thinner, vaporization layer 81 preferably has a thickness of not more than 400 μm, and more preferably has a thickness of not more than 200 μm.

As described above, although the fuel supplied into fuel transportation member 85 is liquid fuel, the fuel passing through vaporization layers 81 and supplied to the anode electrodes is in a gaseous state. Further, since capillary force produced by capillary tubes formed at interfaces between fuel transportation member 85 and vaporization layers 81 is added to capillary force of fuel transportation member 85 itself, significantly high capillary force is obtained, and the soak-up height and the soak-up speed of the liquid fuel can be both achieved at a high level. Therefore, the liquid fuel can be transported from fuel storage chamber 87 to the anode electrodes without using external motive power and with little influence by gravity.

As described above, in the composite unit cell shown in FIG. 21, since significantly high capillary force is obtained when the liquid fuel is transported from fuel storage chamber 87 to vaporization layers 81, the orientation of the composite unit cell when it is used is not particularly limited. For example, even when the composite unit cell is used with fuel storage chamber 87 facing downward and with fuel transportation member 85 standing upward in the vertical direction, the composite unit cell can supply sufficiently high electric power. Further, since the time taken until the liquid fuel permeates through (saturates) fuel transportation member 85 is shortened due to high soak-up speed, the time taken from when the fuel cell is activated to when electric power is extracted can be shortened.

<Moisturization Layer>

In the present embodiment, it is preferable to provide a moisturization layer 83 on a side of the cathode current collector opposite to its side in contact with the cathode electrode, as shown in FIG. 21. Moisturization layer 83 can hold water produced at the cathode electrode by power generation, and maintain the water concentration within the unit cell. Thereby, even if the temperature of the composite unit cell is increased by power generation, the water is less likely to be evaporated, and thus the electrolyte membrane is less likely to be dried. Further, since the water concentration at the anode electrode is satisfactorily maintained, high-output power generation can be stably performed.

A material used for such moisturization layer 83 is not particularly limited, and any material can be used as long as it does not dissolve in water. However, it is preferable to use a porous body made of an organic substance such as a polymer material. Example of such a porous body can include those made of cotton, a foamed body, a fiber bundle, woven fibers, non-woven fibers, or a porous sintered body, or made of a combination of these materials. By selecting a porous body having appropriate fine holes, moisturization layer 83 can prevent the water produced by power generation from being exhausted together with an ascending air current produced by heat (that is, prevent the water from being evaporated), while ensuring a sufficient amount of air supply to the cathode electrode.

As the organic substance such as a polymer material described above, for example, it is more preferable to use one type or a combination of two or more types selected from the group consisting of natural fiber, polytetrafluoroethylene (PTFE), polyester, polyethylene, polypropylene, polyurethane, acryl, polyamide, polyolefin, polyacetal, polyvinyl, polycarbonate, polyether, polyphenylene, and the like.

Among these materials constituting moisturization layer 83, it is preferable to use sepiolite, zeolite, or the like, from the viewpoint of increasing strength against external impact. The strength against external impact may be increased by further providing a protective layer (not shown) on moisturization layer 83.

Examples of a material constituting moisturization layer 83 can include one or more types of polymer porous membranes selected from the group consisting of polyethylene, polyester, polyvinyl, and polycarbonate. The polymer porous membrane constituting such a protective layer preferably has a high void ratio. Thereby, strength of the unit cell against external impact can be increased.

It is to be noted that, although moisturization layer 83 is provided to be in contact with an entire surface of cathode current collector 27 in FIG. 21, the configuration of moisturization layer 83 is not limited thereto, and moisturization layer 83 may be provided on only an upper surface of membrane electrode assembly 2.

<Heat Insulating Layer>

In the present embodiment, it is preferable to provide a heat insulating layer 82 on a side of the anode current collector opposite to its side in contact with the anode electrode, as shown in FIG. 21. Such heat insulating layer 82 is provided to suppress heat generated by the reaction at the anode electrode from being conducted to fuel transportation member 85. By providing heat insulating layer 82 in this manner, heating of the fuel contained in fuel transportation member 85 can be suppressed. Thereby, an excessive increase in evaporation speed of the fuel is prevented, and the crossover of the fuel is less likely to occur. As shown in FIG. 21, it is preferable to provide heat insulating layer 82 in an internal space obtained by bonding vaporization layer 81 and anode current collector 37 using an adhesive agent 86.

As a material constituting such heat insulating layer 82, resin excellent in acid resistance and chemical resistance such as polyimide, PVDF (polyvinylidene fluoride), PTFE (polytetrafluoroethylene), and PEEK (registered trademark), or a polymer non-woven fabric made of such as cotton, polyester, polyethylene, polypropylene, polyurethane, acryl, polyamide, polyolefin, polyacetal, polyvinyl, polycarbonate, polyether, and polyphenylene, or carbon paper, a carbon non-woven fabric, carbon cloth, a metal composite body made of such as titanium oxide, silica, aluminum oxide, and zirconium oxide, or a porous ceramic can be preferably used, and a non-porous metal or carbon in the shape having a plurality of holes opened in a plate or foil, or a porous body in the shape of a mesh or an expanded metal can be preferably used. Although it is more preferable to use a material having lower heat conductivity, heat insulation properties can be obtained by holding air, and thus it is preferable to obtain a heat insulating effect based on the porosity and thickness of a material rather than its properties.

The porosity of heat insulating layer 82 is preferably not less than 40%, more preferably not less than 60%, and further preferably not less than 90%. In addition, from the viewpoint of obtaining sufficient heat insulating properties, the thickness of heat insulating layer 82 is preferably not less than 100 μm, and more preferably not less than 250 μm. By using the porous body having such porosity and thickness, heat insulating properties of heat insulating layer 82 can be improved. Vaporization layer 81 and heat insulating layer 82 described above can suppress excessive increase in the temperature of the composite unit cell, and output can be stably obtained even when the temperature is increased by moisturization layer 83.

<Produced Gas Exhaust Path>

In the present embodiment, it is preferable to have a space penetrating the layers constituting the composite unit cell in the thickness direction, the space being a produced gas exhaust path 84 for exhausting the produced gas produced at the anode electrodes. By providing such produced gas exhaust path 84, the produced gas produced at the anode electrodes can be efficiently exhausted to the outside.

In a case where such produced gas exhaust path 84 is in contact with spacer 20, it is preferable to provide similar produced gas exhaust path 84 to spacer 20 and thereby cause produced gas exhaust path 84 to penetrate in the direction in which the layers constituting the fuel cell stack are stacked.

Such produced gas exhaust path 84 may be formed by stacking the layers having through-holes beforehand, or may be formed by forming the fuel cell stack and thereafter forming a space penetrating all the layers of the fuel cell stack in the direction in which the layers are stacked. The latter has an advantage that there is no need to align produced gas exhaust paths when the layers are stacked, and the former has an advantage that unwanted portions of the layers are less likely to be included during penetration and misalignment of the layers is also less likely to occur during penetration.

Figure 22:
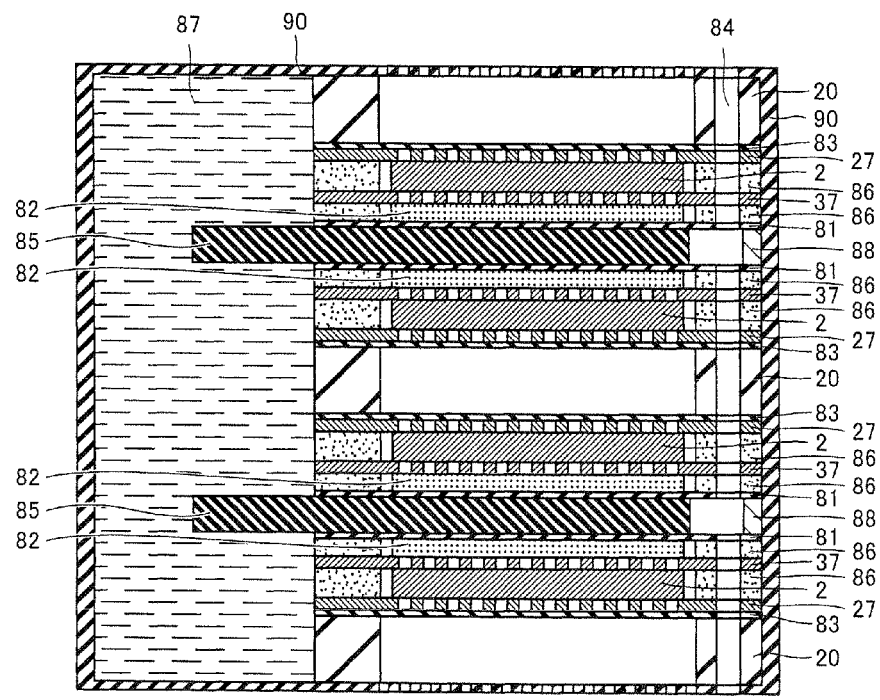
FIG. 22 shows the fuel cell stack shown in FIG. 21 on which a fuel cell layer and a spacer layer are further stacked.

FIG. 22 shows the fuel cell stack shown in FIG. 21 on which a fuel cell layer and a spacer layer are further stacked. As shown in FIG. 22, in a case where two or more fuel cell layers are stacked with spacers 20 interposed therebetween, it is preferable to provide spacers 20 on both end portions of either one or both of front and rear surfaces of the fuel cell layer. If a total of two spacers 20 are provided on both end portions of the fuel cell layer, one by one, as described above, the spacer layer includes two spacers 20. By providing such a spacer layer, the effect of radiating heat generated at membrane electrode assembly 2 to the outside of fuel cell stack by an ascending air current can be improved.

Here, if two spacers 20 are provided, it is preferable to arrange membrane electrode assembly 2 and spacers 20 at spatially distorted positions. The "distorted positions" refer to positional relationship in which membrane electrode assembly 2 and spacers 20 do not intersect with each other even if they are extended in the longitudinal direction. With such an arrangement, the effect of radiating reaction heat generated at the anode electrode to the outside can be improved. It is needless to say that, from the viewpoint of improving heat radiation properties, a large-area spacer 20a may be further provided between two spacers 20 shown in FIG. 22.

<(3) Method of Collecting Current Between Fuel Cell Layers>

To drive an electronic device or the like using the fuel cell stack according to the present invention, a voltage of about 1 to 4 V is generally required when a current is output. However, an open-circuit voltage of a voltage that can be extracted from one unit cell is about 0.6 V, and about 0.2 to 0.4 V when a current is output. Therefore, even if the fuel cell stack is composed of one unit cell, the voltage that can be extracted from it is insufficient to drive an electronic device or the like, and thus it is essential to connect unit cells in series to use the fuel cell stack for an electronic device.

In the conventional fuel cell stack, since the fuel cell layer is composed of unit cells having the single-surface unit cell structure, it has been possible to connect a plurality of fuel cell layers in series, for example, by arranging two adjacent fuel cell layers such that the cathode electrode of a unit cell included in one fuel cell layer faces the anode electrode of a unit cell included in the other fuel cell layer and then providing electrical conductivity in the layer thickness direction to a spacer layer provided between the two fuel cell layers, or by connecting the anode electrode of a unit cell included in one of two adjacent fuel cell layers and the cathode electrode of a unit cell included in the other fuel cell layer using a metal having high electrical conductivity.

However, since the fuel cell layer constituting the fuel cell stack according to the present invention employs composite unit cells, the cathode electrodes in two adjacent fuel cell layers face each other. Therefore, it has been not possible to connect two adjacent fuel cell layers in series just by stacking the cathode electrode of a unit cell included in one of the two adjacent fuel cell layers and the anode electrode of a unit cell included in the other fuel cell layer in a conventional manner.

Accordingly, in the fuel cell stack according to the present invention, the fuel cell layers are electrically connected by (i) connecting two unit cells included in the composite unit cell in parallel, in one fuel cell layer, by electrically connecting two anode current collectors included in the fuel cell layer and electrically connecting two cathode current collectors included in the fuel cell layer, and (ii) connecting two adjacent fuel cell layers in series by electrically connecting the cathode current collector of a composite unit cell included in one of the two adjacent fuel cell layers and the anode current collector of a composite unit cell included in the other fuel cell layer. By electrically connecting the fuel cell layers within the fuel cell stack as described above, high output can be obtained without requiring complicated wiring within the fuel cell stack.

Hereinafter, the above wiring method (i) for parallel connection within one fuel cell layer will be described with reference to FIG. 23, and the above wiring method (ii) for series connection within three adjacent fuel cell layers will be described with reference to FIG. 24.

Figure 23:
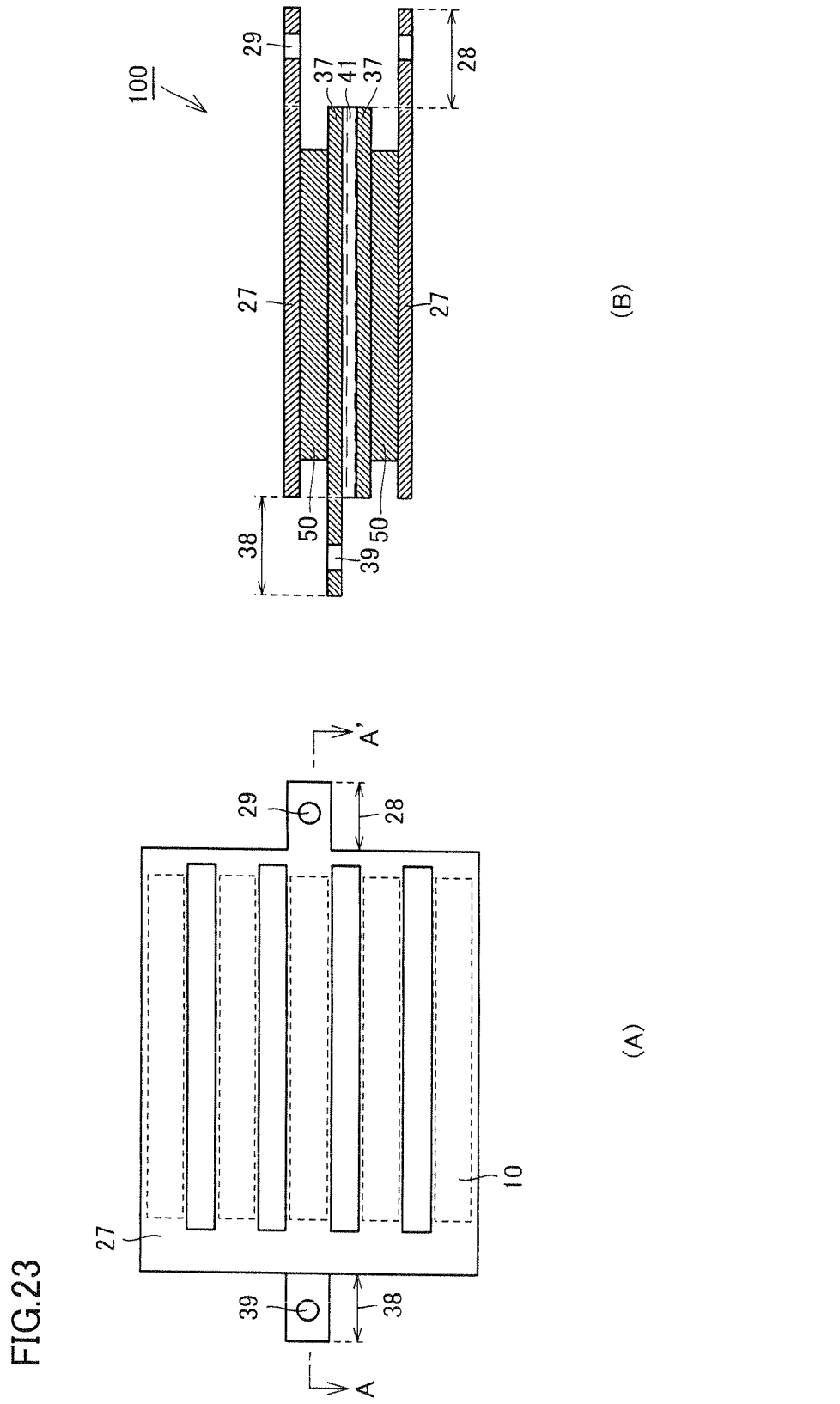
FIG. 23(A) is a top view of one fuel cell layer constituting the fuel cell stack according to the present invention seen from above.
FIG. 23(B) is a cross sectional view taken by cutting the fuel cell layer shown in FIG. 23(A) in a plane including a cathode current collector through-hole and an anode current collector through-hole.

(i) Method of Connecting Two Unit Cells Provided in Identical Fuel Cell Layer in Parallel FIG. 23 is a view showing one fuel cell layer constituting the fuel cell stack according to the present invention. FIG. 23(A) is a top view of one fuel cell layer constituting the fuel cell stack according to the present invention seen from above, and FIG. 23(B) is a cross sectional view taken by cutting the fuel cell layer shown in FIG. 23(A) in a plane including a cathode current collector through-hole 29 and an anode current collector through-hole 39.

In fuel cell layer 100 shown in FIG. 23(A), five composite unit cells 10 are installed with an interval provided therebetween (in FIG. 23(A), composite unit cell 10 is indicated as a portion surrounded by a dotted line), and formed by sandwiching membrane electrode assembly 2 between cathode current collector 27 and anode current collector 37.

Here, cathode current collector 27 is provided with a cathode current extracting portion 28 formed by extending a portion thereof, and cathode current extracting portion 28 is provided with cathode current collector through-hole 29 for electrically connecting cathode current collectors 27 in the identical fuel cell layer in parallel. Anode current collector 37 is similarly provided with an anode current extracting portion 38 formed by extending a portion thereof, and anode current extracting portion 38 is provided with anode current collector through-hole 39 for connecting with cathode current collector 27 in an adjacent fuel cell layer in series.

Preferably, cathode current extracting portion 28 and anode current extracting portion 38 within an identical fuel cell layer are provided at different locations when seen in FIG. 23(A) as the top view so as not to overlap each other. More preferably, cathode current extracting portion 28 and anode current extracting portion 38 are provided at positions that are symmetrical with respect to the central point of cathode current collector 27 and the anode current collector (not shown), from the viewpoint of efficiently bringing two adjacent fuel cell layers into conduction.

From the viewpoint of easily connecting two unit cells included in the composite unit cell in parallel, it is preferable that, within identical fuel cell layer 100, one anode current collector 37 is provided on each of the front and rear surfaces of fuel flow channel 41, and one cathode current collector 27 is provided at each of the front and rear surfaces of fuel cell layer 100, as shown in FIG. 23(B). Thereby, cathode current collectors 27 provided at the front and rear surfaces of fuel cell layer 100 can be electrically connected, and anode current collectors 37 provided on the front and rear surfaces of fuel flow channel 41 can be electrically connected.

Anode current collectors 37 formed on the front and rear surfaces of fuel flow channel 41 may be electrically connected by using an electrically conductive material for the fuel flow channel formation member, or using anode current collector 37 that includes fuel flow channel 41 and also serves as the fuel flow channel formation member. By electrically connecting anode current collectors 37 as described above, it is preferable to use a fuel cell layer in which one anode current extracting portion 38 is formed from anode current collector 37 and two cathode current extracting portions 28 are formed from cathode current collectors 27 in one identical fuel cell layer, as shown in FIG. 23(B).

Figure 24:
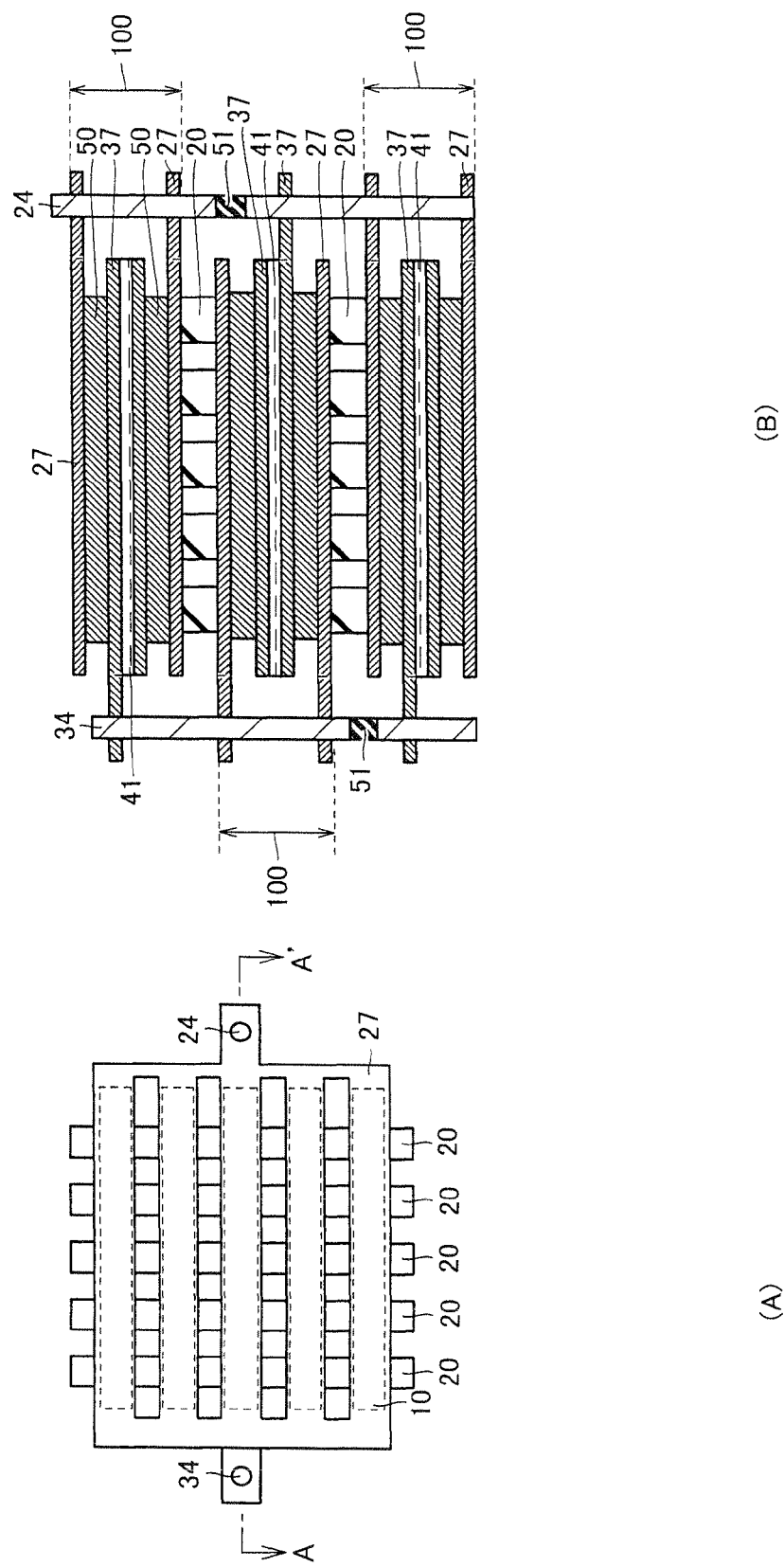
FIG. 24(A) is a top view of the fuel cell stack according to the present invention seen from above.
FIG. 24(B) is a cross sectional view taken by cutting the fuel cell stack shown in FIG. 24(A) in a plane including cathode current collector through-holes and anode current collector through-holes.

(ii) Method of Connecting Three Adjacent Fuel Cell Layers in Series FIG. 24 is a view showing a method of connecting the fuel cell layers in the fuel cell stack according to the present invention in series. FIG. 24(A) is a top view of the fuel cell stack used in the present invention seen from above, and FIG. 24(B) is a cross sectional view taken by cutting the fuel cell layer of FIG. 24(A) in a plane including cathode current collector through-holes 29 and anode current collector through-holes 39.

The fuel cell stack shown in FIG. 24 includes three fuel cell layers and two spacer layers stacked alternately. Hereinafter, for convenience of description, the three fuel cell layers will be referred to as a first fuel cell layer, a second fuel cell layer, and a third fuel cell layer, respectively, from the lowermost layer. However, such terms are not intended to distinguish performances of these fuel cell layers.

As shown in FIG. 24(B), the fuel cell layers are stacked such that one conductive wire is allowed to pass through the anode current extracting portion in the first fuel cell layer, the cathode current extracting portions in the second fuel cell layer, and the anode current extracting portion in the third fuel cell layer, and one conductive wire is similarly allowed to pass through the anode current extracting portions in the first fuel cell layer, the anode current extracting portion in the second fuel cell layer, and the cathode current extracting portions in the third fuel cell layer.

Subsequently, after passing a conductive wire 34 through the anode current collector through-hole in the first fuel cell layer, the cathode current collector through-holes in the second fuel cell layer, and the anode current collector through-hole in the third fuel cell layer, conductive wire 34 is electrically connected with the anode current collector through-holes and the cathode current collector through-holes by soldering. Further, after passing a conductive wire 24 through the anode current collector through-holes in the first fuel cell layer, the anode current collector through-hole in the second fuel cell layer, and the cathode current collector through-holes in the third fuel cell layer, conductive wire 24 is electrically connected with the anode current collector through-hole and the cathode current collector through-holes by soldering. By passing two conductive wires 24, 34 as described above, the three fuel cell layers can be connected in parallel. Soldering is particularly preferably used, because it has advantages of reducing electrical resistance and making a small contact for electrical connection.

Such connection of the fuel cell layers is effective in connecting two or more fuel cell layers in series, and all the fuel cell layers can be connected just by passing two conductive wires. Thus, even in a case where there are many fuel cell layers, the fuel cell layers can be connected in series without requiring complicated wiring.

Series connection of the fuel cell layers is not limited to connection by soldering as described above, and, for example, the fuel cell layers may be connected by providing threads to the conductive wires and fixing the conductive wires to the anode current collector through-holes and the cathode current collector through-holes such that the conductive wires are sandwiched by nuts or the like at threaded portions. With such connection, the anode current extracting portions and the cathode current extracting portions can have an improved strength, when compared with the connection by soldering.

(iii) Method of Connection within Identical Fuel Cell Layer and Connection of Two Adjacent Fuel Cell Layers Based on the foregoing, electrical connection within an identical fuel cell layer and connection of two adjacent fuel cell layers will be further described.

Preferably, anode current collector 37 includes anode current collector through-hole 39 penetrating in a thickness direction thereof, cathode current collector 27 includes cathode current collector through-hole 29 penetrating in a thickness direction thereof, and the anode current collector through-hole and the cathode current collector through-hole are provided in an identical fuel cell layer, at different positions in a layer-stacking direction of the fuel cell layer.

Further, preferably, anode current collector 37 includes anode current extracting portion 38 protruding outward from a side surface thereof, anode current extracting portion 38 including anode current collector through-hole 39 penetrating anode current collector 37 in the thickness direction, cathode current collector 27 includes cathode current extracting portion 28 protruding outward from a side surface thereof, cathode current extracting portion 28 including cathode current collector through-hole 29 penetrating cathode current collector 27 in the thickness direction, and anode current collector through-hole 39 and cathode current collector through-hole 29 are provided in an identical fuel cell layer, at different positions in the layer-stacking direction of the fuel cell layer.

In addition, more preferably, cathode current collector through-holes 29 in one of the two adjacent fuel cell layers and anode current collector through-hole 39 in the other fuel cell layer are provided at a substantially identical position in a direction in which the fuel cell layers are stacked, and anode current collector through-hole 39 in one fuel cell layer described above and cathode current collector through-holes 29 in the other fuel cell layer described above are provided at a substantially identical position in the direction in which the fuel cell layers are stacked.

It is to be noted that "providing cathode current collector through-holes 29 and anode current collector through-hole 39 at a substantially identical position in a direction in which the fuel cell layers are stacked" in the foregoing is not necessarily limited to a case of providing cathode current collector through-holes 29 and anode current collector through-hole 39 at a vertically completely matching position in the direction in which the fuel cell layers are stacked. Even in a case where the through-holes are provided at slightly different (deviated) positions, such a case is not recognized as departing from the scope of the present invention as long as the positions of the through-holes are within a range that allows the conductive wires to pass therethrough.

By arranging anode current collectors 37 and cathode current collectors 27 to have such positional relationship, electrical connection of anode current collectors 37 and cathode current collectors 27 in the fuel cell layers can be facilitated.

In the case of a fuel cell stack including three fuel cell layers like the fuel cell stack shown in FIG. 24, an open-circuit voltage of about 1.8 V and a voltage extracted during power generation of about 0.6 to 1.2 V are obtained.

Although a case where cathode current collector 27 is provided with cathode current collector through-hole 29 and anode current collector 37 is provided with anode current collector through-hole 39 has been described above, these through-holes do not necessarily have to be provided, and current collection can be simplified in the fuel cell stack using the composite unit cell according to the present invention by providing the anode current extracting portion and the cathode current extracting portion in adjacent fuel cell layers at a substantially identical position in the layer-stacking direction. That is, for example, the conductive wire may be joined by soldering to an end portion of the anode current extracting portion of the anode current collector in one of the two adjacent fuel cell layers, and the other end of the conductive wire may be joined by soldering to an end portion of the cathode current extracting portion in the other fuel cell layer. It is needless to say that such connection can also increase the voltage extracted during power generation in the fuel cell stack, as in the case of providing the through-holes.

In short, the anode current collector in one of the two adjacent fuel cell layers and the cathode current collector in the other fuel cell layer do not interfere with collection of electric power generated at the unit cells as long as they are connected by a conductive wire via soldering. However, from the viewpoint of temporarily fixing the above conductive wire before joining by soldering and preventing misalignment of the fuel cell layers, and from the viewpoint of improving strength at a contact for electrical connection, it is preferable to provide the anode current collector through-hole and the cathode current collector through-hole.

<Nonconductor Portion>

In the present invention, a nonconductor portion 51 provided in conductive wire 24, 34 is provided to avoid occurrence of a short circuit between the fuel cell layers. That is, if the conductive wire does not have nonconductor portion 51, both the cathode current collectors and the anode current collectors in adjacent fuel cell layers are electrically connected, and a short circuit occurs between the fuel cell layers.

A preferable position of the nonconductor portion will be described based on electrical connection between two adjacent fuel cell layers. Preferably, the anode current collector through-hole in one of the two adjacent fuel cell layers and the cathode current collector through-hole in the other fuel cell layer are connected by a conductive wire, the cathode current collector through-hole in one fuel cell layer described above and the anode current collector through-hole in the other fuel cell layer described above are connected by a conductive wire having a nonconductor portion, and the nonconductor portion is provided to the conductive wire at a position electrically insulating the cathode current collector in one fuel cell layer from the anode current collector in the other fuel cell layer.

Such nonconductor portion 51 may be provided, for example, by bonding conductive wires with resin, and using the resin portion as the nonconductor portion. Providing nonconductor portion 51 is not limited to the case where it is provided within the conductive wire. For example, the anode current collector in one of the two adjacent fuel cell layers may be insulated from the cathode current collector in the other fuel cell layer by physically cutting the conductive wire between the anode current collector in one fuel cell layer and the cathode current collector in the other fuel cell layer.

By physically cutting the conductive wire between the anode current collector in one fuel cell layer and the cathode current collector in the other fuel cell layer in this manner, the anode current collector through-hole in one of the two adjacent fuel cell layers and the cathode current collector through-hole in the other fuel cell layer can be connected by a conductive wire, and two cathode current collector through-holes included in one fuel cell layer described above can be connected by a conductive wire, without providing a nonconductor portion as described above.

A position appropriate for providing nonconductor portion 51 will be specifically described, using the fuel cell stack shown in FIG. 24(B). Firstly, since the cathode current collectors in the first fuel cell layer and the anode current collector in the second fuel cell layer are electrically connected and thereby the fuel cell layers are connected in series, a short circuit would occur if the anode current collector in the first fuel cell layer and the cathode current collectors in the second fuel cell layer are electrically connected. Thus, it is necessary to provide nonconductor portion 51 between the anode current collector in the first fuel cell layer and the cathode current collector in the second fuel cell layer.

Similarly, since the cathode current collectors in the second fuel cell layer and the anode current collector in the third fuel cell layer are electrically connected and thereby the fuel cell layers are connected in series, a short circuit would occur if the anode current collector in the second fuel cell layer and the cathode current collectors in the third fuel cell layer are electrically connected. Thus, it is necessary to provide a nonconductor portion between the anode current collector in the second fuel cell layer and the cathode current collector in the third fuel cell layer.

Based on the above, the position for providing a nonconductor portion will be generalized below. It is necessary to provide nonconductor portion 51 between the anode current collector in an n-th fuel cell layer and the cathode current collector in an (n+1) fuel cell layer, where n is an integer not less than 1.

Further, although the current collection method used for the fuel cell stack according to the present invention is particularly effective in a case where the fuel cell stack includes fuel cell layers having composite unit cells which tend to require complicated wiring, the current collection method is also applicable to a fuel cell stack including fuel cell layers having the single-surface unit cell structure. In a case where the current collection method is applied to a fuel cell stack including fuel cell layers having the single-surface unit cell structure, there is no need to provide the anode current extracting portion and the cathode current extracting portion at different locations, and connection can be established with one conductive wire.

For example, in a case where two fuel cell layers having the single-surface unit cell structure are stacked, the anode current collector in the first fuel cell layer, the cathode current collector in the first fuel cell layer, the anode current collector in the second fuel cell layer, and the cathode current collector in the second fuel cell layer are stacked in this order, from the lowermost layer. Therefore, series connection can be established by electrically connecting these members in this stacking order by some means, without providing the anode current extracting portion and the cathode extracting portion at different locations.

<(4) Electronic Device>

The fuel cell stack according to the present invention is applicable to any electronic device, and it is preferably applied to, in particular, mobile devices and the like among the electronic devices. Examples of such electronic devices can include portable electronic devices, electronic notebooks, portable game devices, mobile TV devices, hand-held terminals, personal digital assistants (PDAs), mobile DVD players, notebook computers, video devices, camera devices, ubiquitous devices, mobile power generators, and the like.

Hereinafter, electronic devices equipped with the fuel cell stack according to the present invention will be described in Embodiments I to III, with reference to FIGS. 25 to 27.

Embodiment I

Figure 25:
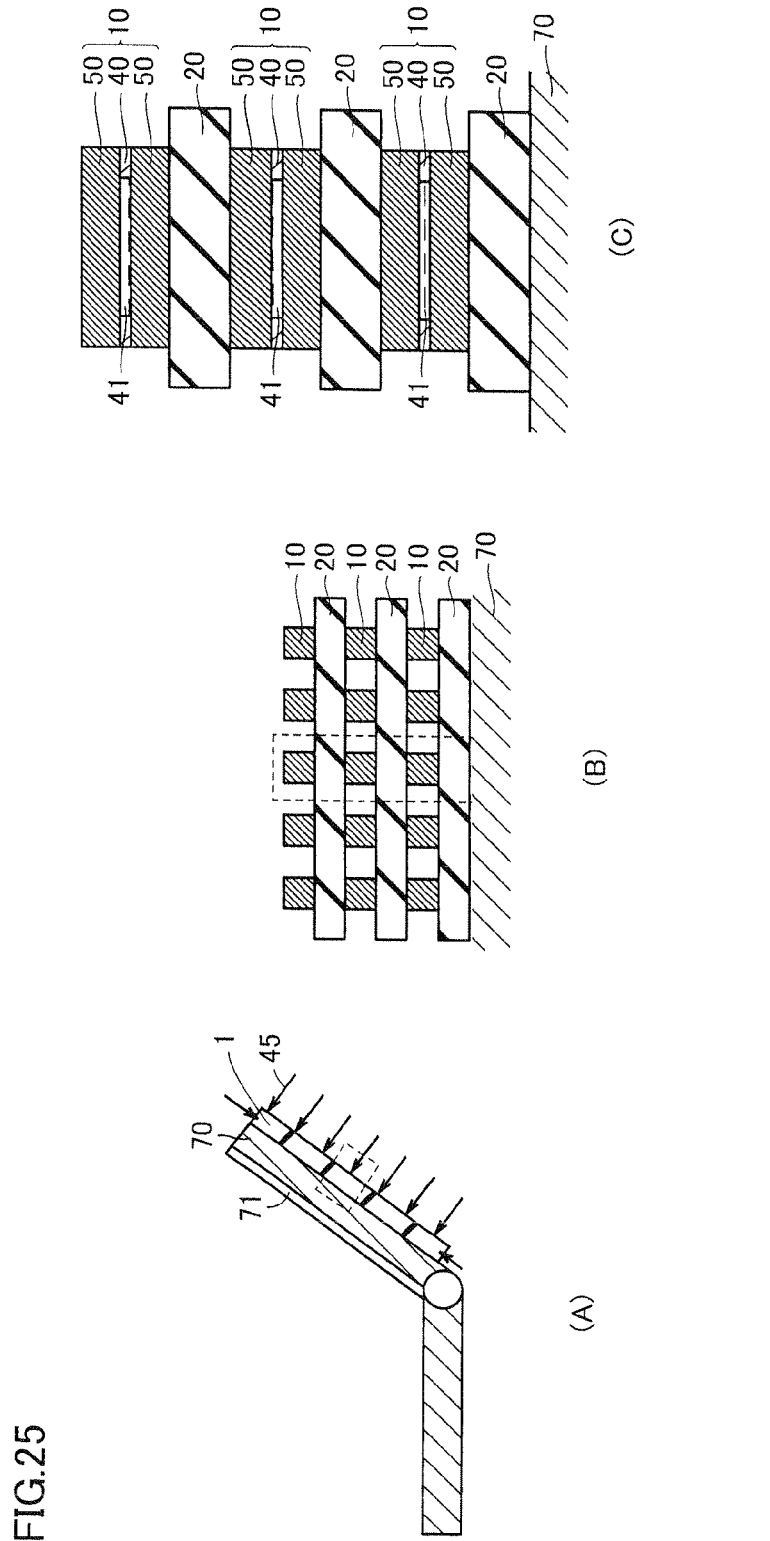
FIG. 25(A) is a schematic cross sectional view showing one surface of an electronic device provided with the fuel cell stack according to the present invention.
FIG. 25(B) is an enlarged schematic cross sectional view of the fuel cell stack in the electronic device indicated in FIG. 25(A)
FIG. 25(C) is an enlarged schematic cross sectional view of a construction of fuel cell layers in the fuel cell stack indicated in FIG. 25(B).

FIG. 25 is a view showing a preferable exemplary electronic device provided with a fuel cell stack according to the present embodiment. FIG. 25(A) is a schematic cross sectional view showing one surface of the electronic device provided with the fuel cell stack according to the present embodiment, FIG. 25(B) is an enlarged cross sectional view of the fuel cell stack in the electronic device indicated in FIG. 25(A), and FIG. 25(C) is an enlarged schematic cross sectional view of a construction of fuel cell layers in the fuel cell stack indicated in FIG. 25(B).

As fuel cell stack 1 used for an electronic device 70 according to the present embodiment, a fuel cell stack in which three fuel cell layers and three spacer layers are alternately stacked and electrically connected in series to obtain an extracted voltage of about 1 to 4 V is used.

In electronic device 70 shown in FIG. 25(A), fuel cell stack 1 is mounted in contact with a surface of electronic device 70 opposite to its surface in contact with an information display portion 71. Fuel cell stack 1 used for electronic device 70 according to the present embodiment has a structure in which a spacer layer of the layers constituting the same is arranged to be in contact with electronic device 70, and three fuel cell layers and three spacer layers are alternately stacked on the spacer layer.

By arranging fuel cell stack 1 within the electronic device such that the spacer layer is in contact with electronic device 70 as described above, air can be efficiently supplied to the cathode electrodes of the unit cells without providing a space between electronic device 70 and fuel cell stack 1.

Although not shown in FIG. 25, a secondary cell such as a Li ion cell may be provided in addition to fuel cell stack 1 according to the present embodiment, as an auxiliary power supply for compensating for output shortage when a portable telephone device is started and output shortage when its output reaches maximum. In a case where the secondary cell and the fuel cell stack have different voltage characteristics, it is preferable to provide a converter such as a DC/DC converter converting voltage into a voltage suitable for electronic device 70.

In addition, by providing a capacitor as an auxiliary power supply, fuel cell stack 1 and the capacitor can be hybridized. When a capacitor is used as an auxiliary power supply, there is no need to provide a converter for adjusting voltage, because the capacitor is charged and discharged corresponding to changes in the voltage of fuel cell stack 1.

Further, electronic device 70 may be provided with auxiliary equipment such as a pump or a fan for supplying fuel to fuel flow channel 41 in fuel cell stack 1, and may be provided with a driver circuit for driving the auxiliary equipment. Furthermore, electronic device 70 may be provided with a fuel cartridge capable of holding a constant amount of fuel.

Embodiment II

Figure 26:
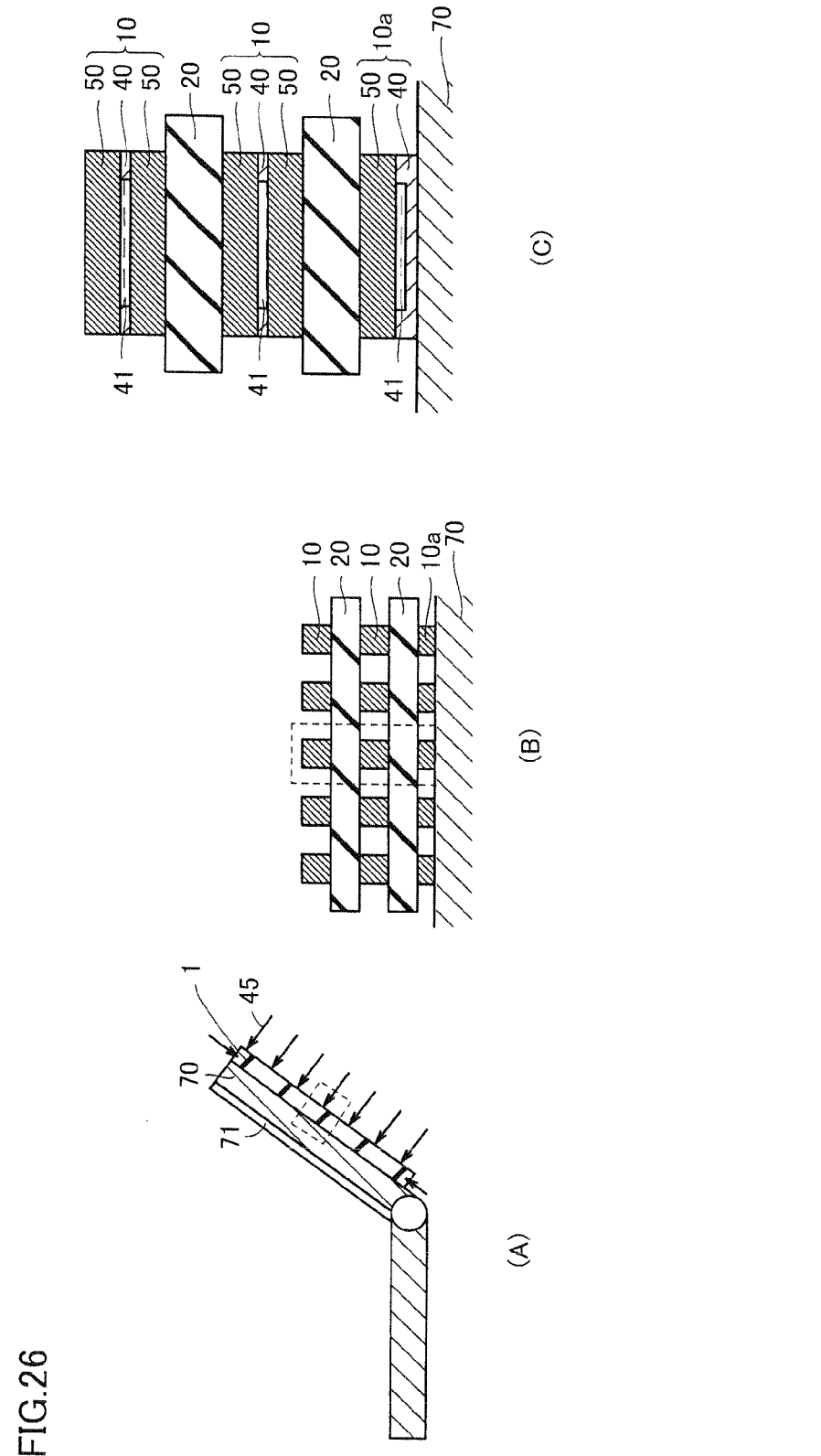
FIG. 26(A) is a schematic cross sectional view showing one surface of an electronic device provided with the fuel cell stack according to the present invention.
FIG. 26(B) is an enlarged schematic cross sectional view of the fuel cell stack in the electronic device indicated in FIG. 26(A)
FIG. 26(C) is an enlarged schematic cross sectional view of a construction of fuel cell layers in the fuel cell stack indicated in FIG. 26(B).

FIG. 26 is a view showing a preferable exemplary electronic device provided with a fuel cell stack according to the present embodiment. FIG. 26(A) is a schematic cross sectional view showing one surface of the electronic device provided with the fuel cell stack according to the present embodiment, FIG. 26(B) is an enlarged cross sectional view of the fuel cell stack in the electronic device indicated in FIG. 26(A), and FIG. 26(C) is an enlarged schematic cross sectional view of a construction of fuel cell layers in the fuel cell stack indicated in FIG. 26(B).

Fuel cell stack 1 used for the electronic device according to the present embodiment is formed by alternately stacking three fuel cell layers and two spacer layers, and only the fuel cell layer of the three fuel cell layers that is in contact with electronic device 70 is composed of unit cells 10a having the single-surface unit cell structure, and the other two fuel cell layers 100 are composed of composite unit cells 10.

By composing only the fuel cell layer in contact with electronic device using unit cells 10a as single-surface unit cells as described above, there is no need to provide spacer 20 at a surface of fuel cell stack 1 that is in contact with electronic device 70, which can reduce the thickness of fuel cell stack 1.

Embodiment III

Figure 27:
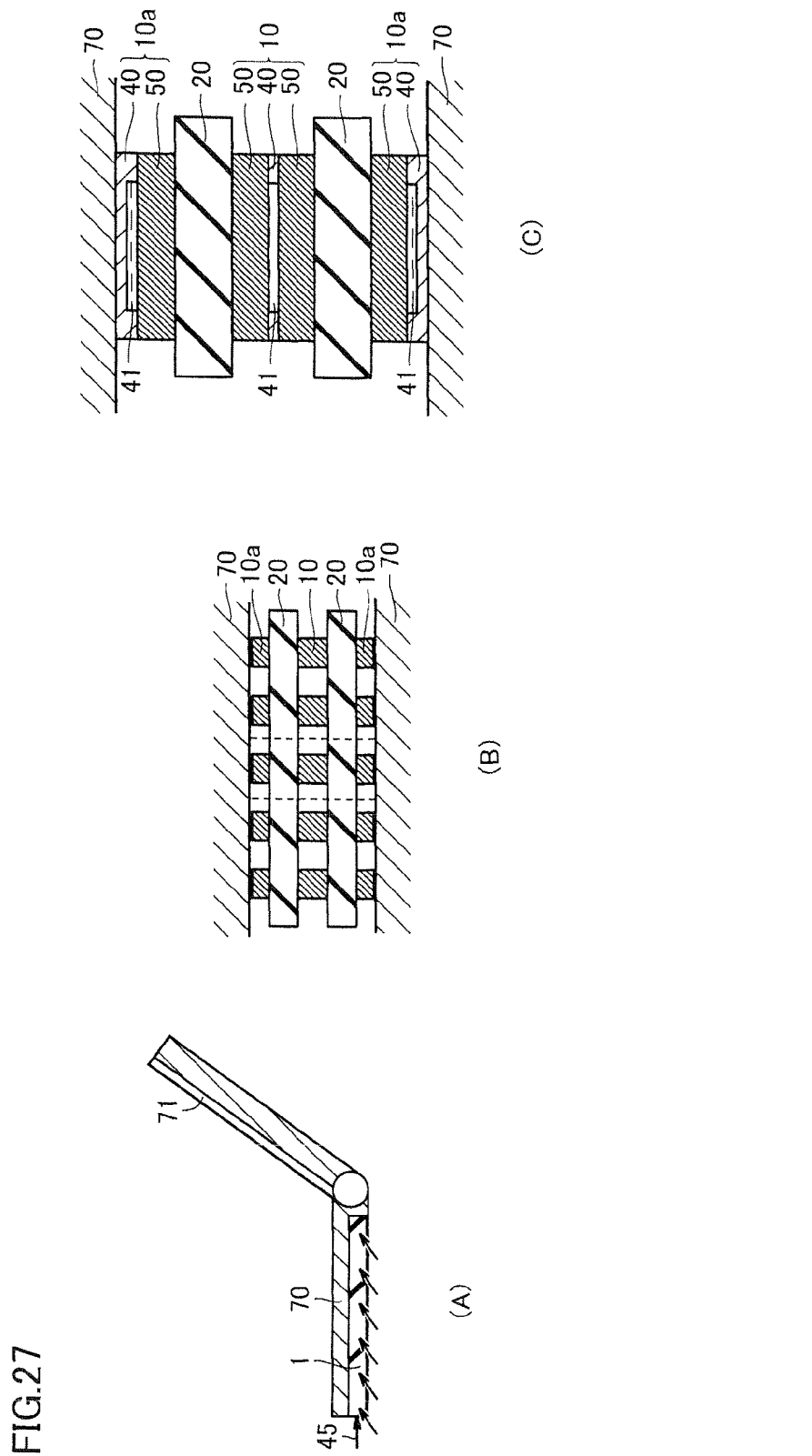
FIG. 27(A) is a schematic cross sectional view showing one surface of an electronic device provided with the fuel cell stack according to the present invention.
FIG. 27(B) is an enlarged schematic cross sectional view of the fuel cell stack in the electronic device indicated in FIG. 27(A)
FIG. 27(C) is an enlarged schematic cross sectional view of a construction of fuel cell layers in the fuel cell stack indicated in FIG. 27(B).

FIG. 27 is a view showing a preferable exemplary electronic device provided with a fuel cell stack according to the present embodiment. FIG. 27(A) is a schematic cross sectional view showing one surface of the electronic device provided with the fuel cell stack according to the present embodiment, FIG. 27(B) is an enlarged cross sectional view of the fuel cell stack in the electronic device indicated in FIG. 27(A), and FIG. 27(C) is an enlarged schematic cross sectional view of a construction of fuel cell layers in the fuel cell stack indicated in FIG. 27(B).

Electronic device 70 according to the present embodiment is characterized by embedding fuel cell stack 1 therein. Since the fuel cell stack is embedded inside electronic device 70 as described above, upper and lower surfaces of the fuel cell stack are in contact with electronic device 70, and only a side surface of the fuel cell stack is in contact with external air. Therefore, the electronic device according to the present embodiment has a structure in which it is more difficult to supply air to the fuel cell stack, when compared with the electronic devices according to Embodiments I and II.

However, by applying a fuel cell stack which is formed by alternately stacking three fuel cell layers and two spacer layers, and in which only one of the fuel cell layers that is not in contact with electronic device 70 is composed of composite unit cells 10, and the other two fuel cell layers that are in contact with electronic device 70 are composed of unit cells 10a, like fuel cell stack 1 used for the electronic device according to the present embodiment, air can be supplied to the cathode electrodes of unit cells 50 even if fuel cell stack 1 is completely embedded inside electronic device 70.

Further, since a fuel cell stack with a structure in which three-dimensional communication is established is employed as the fuel cell stack with such a structure, oxygen can be stably supplied even to the cathode electrodes of the unit cells.

By employing the fuel cell stack with such a structure, air supply to fuel cell stack 1 does not vary depending on the orientation in which a user uses electronic device 70. Thus, the user can use the electronic device without being conscious of its orientation in use, as with a secondary cell such as a Li ion cell and the like.

Unlike a composite unit cell having a large area as in the conventional case, any of the fuel cell stacks shown in FIGS. 25 to 27 can supply oxygen to the cathode electrodes of the unit cells constituting the composite unit cell even if it is arranged to be in direct contact with the electronic device. Therefore, the fuel cell stack according to the present embodiment can be arranged at any location in the electronic device, and has a high degree of freedom in arrangement in the electronic device. Further, since there is no need to provide a space between the electronic device and the fuel cell stack, a support body is not required. This can increase strength against pressure from the outside of the fuel cell stack, and reduce the size of the electronic device itself. These effects can also enhance convenience of the user using the electronic device.

Hereinafter, a preferable process of fabricating the fuel cell stack according to the present invention will be described with reference to examples. However, the present invention is not limited thereto.

Example 1

Figure 28:
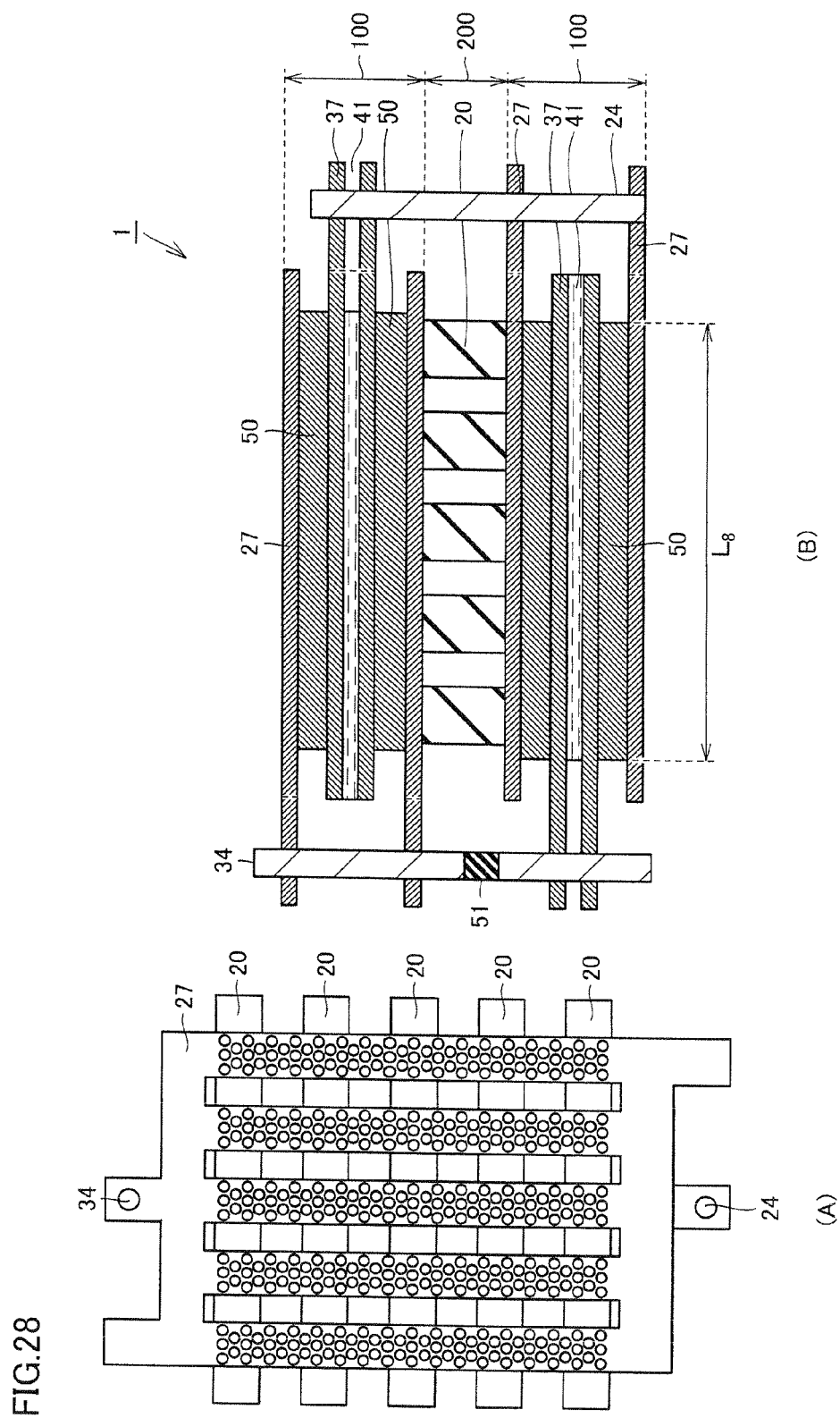
FIG. 28(A) is a top view of a fuel cell stack fabricated in an example.
FIG. 28(B) is a cross sectional view thereof.

FIG. 28 shows a fuel cell stack fabricated in Example 1, in which FIG. 28(A) is a top view thereof, and FIG. 28(B) is a cross sectional view thereof. In Example 1, a fuel cell stack having a structure in which two fuel cell layers 100 were arranged and one spacer layer 200 was provided between the two fuel cell layers as shown in FIG. 28(B) was fabricated. Fuel cell layer 100 was formed by arranging five composite unit cells with a gap provided therebetween, and spacer layer 200 was formed by arranging five spacers 20 with a gap provided therebetween.

In the present example, the fuel cell stack was fabricated in a procedure described below.

(1) Firstly, an anode conductive porous layer, an anode catalyst layer, an electrolyte membrane, a cathode catalyst layer, and a cathode conductive porous layer were stacked in this order, and integrated by hot pressing (hereinafter, a stacked body obtained by integration will also be referred to as a "unit cell").

(2) Next, an adhesive was applied to front and rear surfaces of a fuel flow channel formation member, and one fuel permeation suppressing layer was bonded to each of the front and rear surfaces via the adhesive. Thereby, a flow channel-containing stacked member was obtained.

(3) Subsequently, an adhesive was applied to an anode current collector, and the anode current collector was bonded via the adhesive to each of the front and rear fuel permeation suppressing layers of the flow channel-containing stacked member obtained in (2). Thereby, an anode current collector stacked member was obtained.

(4) Layers constituting a fuel cell layer (i.e., a cathode current collector, unit cells, the anode current collector stacked member, unit cells, and a cathode current collector in this order) were arranged and integrated to fabricate the fuel cell layer.

(5) Two fuel cell layers obtained as described above were prepared, and a spacer layer was formed between these two fuel cell layers. Thereby, a fuel cell stack was fabricated.

(6) The two fuel cell layers constituting the above fuel cell stack were connected in series.

Hereinafter, each of these steps will be specifically described.

<(1) Fabrication of Unit Cell>

Firstly, as an electrolyte membrane used for a unit cell constituting fuel cell stack 1, an electrolyte membrane having a width of 24 mm, a length of 24 mm, and a thickness of about 125 μm (product name: Nafion (registered trademark) 115 (manufactured by Du Pont)) was prepared.

Next, catalyst-carrying carbon particles (product name: TEC66E50 (manufactured by Tanaka Kikinzoku Kogyo K.K.)) including carbon particles and particles of Pt and Ru having a Pt carrying amount of 32.5 mass % and a Ru carrying amount of 16.9 mass %, an alcohol solution (manufactured by Sigma-Aldrich Japan K. K.) containing 20 mass % of Nafion (registered trademark), ion-exchange water, isopropanol, and zirconia beads in predetermined proportions were introduced into a container made of PTFE, mixed at 50 rpm for 50 minutes using a mixing defoamer, and thereafter the zirconia beads were removed. A paste fabricated as described above was used as an anode catalyst paste.

In addition, a paste was fabricated as with the anode catalyst paste except for using catalyst-carrying carbon particles (product name: TEC10E50E (manufactured by Tanaka Kikinzoku Kogyo K.K.)) including carbon particles and Pt particles having a Pt carrying amount of 46.8 mass %, and used as a cathode catalyst paste.

Further, carbon paper (product name: GDL25AC (manufactured by SGL Carbon Japan Co., Ltd.)) having a width of 23 mm and a length of 24 mm as outer dimensions, and having one surface subjected to water-repellent treatment using a layer made of fluorine-based resin and carbon particles was used as an anode conductive porous layer. To hydrophilize the carbon paper, the carbon paper was put into 69% nitric acid, and then subjected to boiling treatment.

Since a contact angle of methanol with respect to the anode conductive porous layer is reduced by performing hydrophilization treatment as described above, methanol can be held in the anode conductive porous layer during power generation. This can prevent entrance of air from the external atmosphere, and improve power generation characteristics as a cell.

On the other hand, since the contact angle of methanol with respect to the anode conductive porous layer is reduced, air bubbles caused by produced gas such as carbon dioxide are less likely to be held in the anode conductive porous layer, and the produced gas can be exhausted from end surfaces. By utilizing a difference in surface tension as described above, the produced gas can be separated from methanol.

After hydrophilization treatment was performed as described above, the anode catalyst paste fabricated above was applied, with a bar coater, onto the surface of the anode conductive porous layer subjected to water-repellent treatment, and dried, to form an anode catalyst layer having a thickness of about 40 µm. The anode catalyst layer formed herein has high hydrophilic properties although it is not subjected to special hydrophilization treatment, and can hold methanol as with the anode conductive porous layer.

Further, a cathode conductive porous layer was also fabricated using carbon paper as described above. The cathode catalyst paste fabricated above was applied, with a bar coater, onto the surface of the cathode conductive porous layer subjected to water-repellent treatment, and dried, to form a cathode catalyst layer having a thickness of about 40 µm.

Next, the anode conductive porous layer, the anode catalyst layer, the electrolyte membrane, the cathode catalyst layer, and the cathode conductive porous layer stacked in this order were sandwiched with stainless plates. Then, the stainless plates were heated to 130° C., and thermocompression bonding was performed in the thickness direction of the stainless plates at 10 kgf/cm$^2$ for two minutes, to integrate the above layers and thereby obtain a unit cell. Subsequently, the unit cell was cut into a size of 23 mm×2.35 mm to obtain 10 unit cells.

<(2) Bonding of Fuel Permeation Suppressing Layers to Fuel Flow Channel Formation Member>

Figure 29:
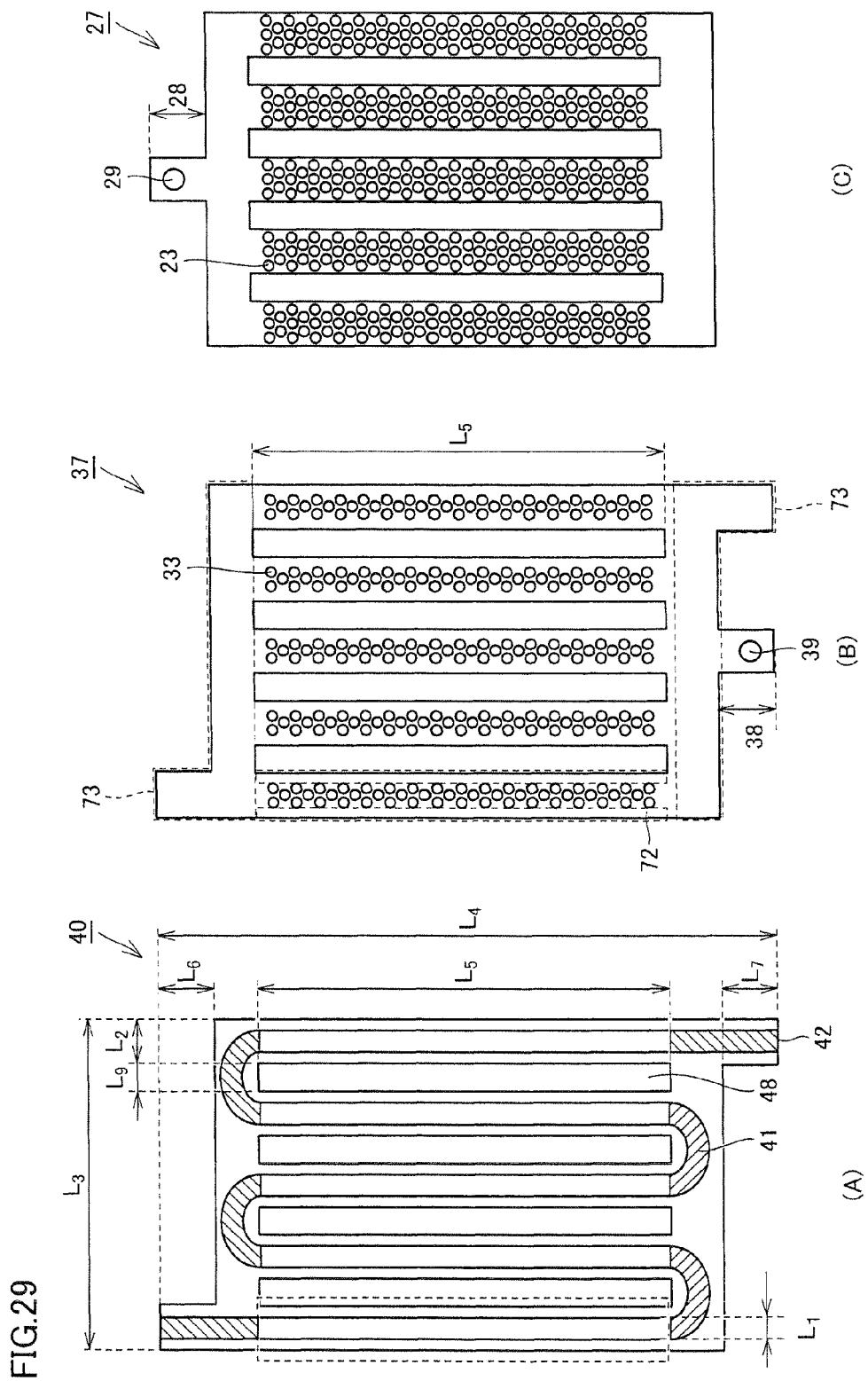
FIG. 29(A) is a top view showing a shape of a fuel flow channel formation member used in the fuel cell stack according to the example.
FIG. 29(B) is a top view showing a shape of an anode current collector used in the fuel cell stack according to the example.
FIG. 29(C) is a top view showing a shape of a cathode current collector used in the fuel cell stack according to the example.

FIG. 29 shows top views of members used to fabricate a fuel cell layer, in which FIG. 29(A) is a top view showing a shape of the fuel flow channel formation member, FIG. 29(B) is a top view showing a shape of the anode current collector, and FIG. 29(C) is a top view showing a shape of the cathode current collector.

As shown in FIG. 29(A), fuel flow channel formation member 40 used in the present example had a length $L_3$ of an entire width of 16.5 mm, a vertical length $L_4$ of 37 mm (including fuel flow channel entrance 42), and a thickness of 200 µm. As fuel flow channel formation member 40, the one having four gap holes 48 (having a length $L_9$ of a width of 1.0 mm and a vertical length $L_5$ of 25 mm) formed in a thickness direction thereof was used.

In a portion of fuel flow channel formation member 40 other than gap holes 48, five fine extended portions of fuel flow channel formation member 40 (one of which is indicated in FIG. 29(A) by being surrounded by a dotted line: hereinafter also simply referred to as an "extended portion") were left, and the width of each extended portion (i.e., the width also serving as the "width of the unit cell" through a later step) had length $L_2$ of 2.5 mm.

Further, snake-shaped fuel flow channel 41 was formed in fuel flow channel formation member 40, and the width of fuel flow channel 41 had length $L_1$ of 1.5 mm. Therefore, relationship $L_1/L_2$ of length $L_1$ of the width of fuel flow channel 41 with respect to length $L_2$ of the width of the extended portion of fuel flow channel formation member 40 (i.e., the width of the unit cell) is 0.6.

In addition, although fuel flow channel 41 in the extended portions penetrated in the thickness direction, fuel flow channel 41 in portions other than the extended portions (i.e., fuel flow channel 41 in fuel flow channel entrance 42 and corner portions of the snake-shaped flow channel) had an H-shaped cross section and did not penetrate in the thickness direction, as 80 µm-deep grooves were formed from the front and rear surfaces of fuel flow channel formation member 40. Since fuel flow channel formation member 40 has portions not penetrating in the thickness direction as described above, fuel flow channel formation member 40 can be prevented from being separated into two members, and can maintain its shape.

Fuel permeation suppressing layers were bonded to the front and rear surfaces of fuel flow channel formation member 40 described above. Specifically, an adhesive made of thermosetting, modified polyolefin-based resin (product name: Aron Melt PPET-1600 (manufactured by Toa Gosei Co., Ltd.)) was applied, with a bar coater, to a portion of fuel flow channel formation member 40 described above in which fuel flow channel 41 was not formed, and a fuel permeation suppressing layer made of fluorocarbon resin (product name: Polyvinylidene Fluoride Membrane Filter (manufactured by Nihon Millipore)) was bonded onto the adhesive to cover fuel flow channel 41. The fuel permeation suppressing layer had the same size as fuel flow channel formation member 40, and four gap holes having a length of a width of 1.0 mm and a vertical length of 25 mm and penetrating in the thickness direction were formed at the same positions as gap holes 48 formed in the fuel flow channel formation member. Similarly, another fuel permeation suppressing layer was also bonded to an opposite surface of fuel flow channel 41, to fabricate a member having a structure in which the front and rear surfaces of the fuel flow channel formation member were sandwiched by a total of two fuel permeation suppressing layers, one by one (hereinafter also referred to as a "flow channel-containing stacked member").

<(3) Bonding of Anode Current Collectors to Flow Channel-Containing Stacked Member>

Anode current collector 37 used in the present example was made of stainless, as with the fuel flow channel formation member, and the one plated with gold was used to improve corrosion resistance and reduce electrical resistance. As shown in FIG. 29(B), anode current collector 37 had a size similar to that of the fuel flow channel formation member, and had a length of a width of 16.5 mm, a vertical length of 31 mm, and a thickness of 100 µm. In such anode current collector 37, four gap holes having a length of a width of 1.0 mm and a vertical length of 25 mm and penetrating in the thickness direction were formed, as in the fuel flow channel formation member.

In each extended portion (with vertical length $L_5$ of 23 mm) of anode current collector 37, a plurality of anode holes 33 with a diameter of 0.5 mmϕ for supplying fuel to the unit cells were formed, and 0.5 mm-wide portions in which anode holes 33 were not formed (hereinafter also simply referred to as "bank portions 72") were also provided. Further, anode current collector 37 was provided with extended anode current extracting portion 38, and anode current extracting portion 38 had 1 mmϕ anode current collector through-hole 39.

An adhesive made of thermosetting, modified polyolefin-based resin (product name: Aron Melt PPET-1600 (manufactured by Toa Gosei Co., Ltd.)) was applied, with a bar coater, to the above bank portions 72 in anode current collector 37 as described above and portions 73 of anode current collector 37 other than the extended portions and anode current extracting portion 38, and anode current collector 37 was arranged such that the gap holes formed in anode current collector 37 matched gap holes 48 formed in fuel flow channel formation member 40. Then, a total of two anode current collector 37 were bonded to surfaces of the fuel permeation suppressing layers opposite to surfaces facing fuel flow channel formation member 40 in the flow channel-containing stacked member obtained in (2), one by one, via the above adhesive (a stacked member obtained herein will be hereinafter also simply referred to as an "anode current collector stacked member").

<(4) Stacking of Layers Constituting Fuel Cell Layer>

Cathode current collector 27 used in the present example was made of stainless, as with the fuel flow channel formation member, and the one plated with gold was used to improve corrosion resistance and reduce electrical resistance. Cathode current collector 27 to be used had a size similar to that of the fuel flow channel formation member, and had a length of a width of 16.5 mm, a vertical length of 31 mm, and a thickness of 100 μm, as shown in FIG. 29(C). In cathode current collector 27, gap holes having a length of a width of 1.0 mm and a vertical length of 25 mm were formed in the thickness direction, as in the fuel flow channel formation member.

In each extended portion (with a vertical length of 23 mm) of cathode current collector 27, a plurality of cathode holes 23 with a diameter of 0.5 mmϕ for supplying air to the unit cells were formed. Further, cathode current collector 27 was provided with extended cathode current extracting portion 28 at a location different from that of anode current extracting portion 38 of anode current collector 37, and cathode current extracting portion 28 had 1 mmϕ cathode current collector through-hole 29, as with anode current collector 37.

Cathode current collector 27, the unit cells, the anode current collector stacked member, the unit cells, and cathode current collector 27 were arranged in this order, using cathode current collector 27 as described above. Specifically, a total of five unit cells obtained in (1) were arranged on five extended portions of the cathode current collector, one by one, and the anode current collector stacked member obtained in (3) was arranged on the five unit cells such that the gap holes in the anode current collector overlapped the gap holes in the cathode current collector. Subsequently, a total of five unit cells obtained in (1) were arranged on five extended portions of the anode current collector in the anode current collector stacked member, one by one, and thereafter cathode current collector 27 was further arranged on the unit cells.

In the case of forming a composite unit cell in which unit cells are arranged on both surfaces of a fuel flow channel as described above, it is necessary to arrange five unit cells on one surface of fuel flow channel 41, that is, a total of 10 unit cells on the both surfaces of fuel flow channel 41.

Next, the members arranged as described above were sandwiched with stainless plates, and thermocompression bonding was performed in the thickness direction of the stainless plates at a temperature of 130° C., at 10 kgf/cm², for two minutes, to integrate the stacked body obtained above and thereby form a fuel cell layer. Bonding at an interface between the anode current collector and the anode conductive porous layer and bonding at an interface between the cathode current collector and the cathode conductive porous layer were both made by the anchor effect. Fuel cell layer 100 fabricated as described above had a thickness of about 1.3 mm.

<(5) Fabrication of Fuel Cell Stack>

As shown in FIG. 28, the layers were arranged in the order of fuel cell layer 100, spacer layer 200, and fuel cell layer 100. As spacer 20 used for spacer layer 200, a hydrophilic porous body (product name: Oikos AP1200 (manufactured by Nisshinbo)) having a length of a width of 3.0 mm and a vertical length of 17.0 mm was used, and spacer layer 200 was formed by arranging five spacers 20 with a 2.0 mm gap provided therebetween.

Further, two adjacent fuel cell layers 100 were arranged with respect to each other such that anode current extracting portions 38 of anode current collectors 37 in one fuel cell layer 100 and cathode current extracting portions 28 of cathode current collectors 27 in the other fuel cell layer 100 overlapped each other in the layer-stacking direction, to fabricate a fuel cell stack. The fuel cell stack had an entire thickness of about 3.5 mm. In addition, the total sum of areas of power generation portions within the fuel cell stack (hereinafter also referred to as an "area of the power generation portions") was 10.8 cm².

<(6) Series Connection of Fuel Cell Layers>

Next, series connection of two fuel cell layers 100 constituting the fuel cell stack obtained above will be described. Conductive wire 34 made of a gold wire with a diameter of 1.0 mmϕ provided with nonconductor portion 51 was inserted through anode current collector through-holes 39 provided in anode current extracting portions 38 of anode current collectors 37 and cathode current collector through-holes 29 provided in cathode current extracting portions 28 of cathode current collectors 27 constituting fuel cell layers 100.

As shown in FIG. 28(B), in conductive wire 34 provided with nonconductor portion 51, two gold lines were bonded by an epoxy resin adhesive, and thus the two gold lines were insulated. Conductive wire 34 was electrically connected with cathode current collectors 27 and anode current collectors 37 by performing soldering.

On the other hand, conductive wire 24 was also inserted through cathode current collector through-holes 29 provided in cathode current extracting portions 28 of cathode current collectors 27 constituting the fuel cell layer and anode current collector through-holes 39 provided in anode current extracting portions 38 of anode current collectors 37 constituting the fuel cell layer. Since the conductive wire was not required to have nonconductor portion 51 as described above, one conductive wire 24 was used for connection. Conductive wire 24 was electrically connected with cathode current collectors 27 and anode current collectors 37 by performing soldering. Through the above steps, the fuel cell layers constituting the fuel cell stack according to the present invention were electrically connected.

Output characteristics and volume output density of the fuel cell stack according to Example 1 were measured. These characteristics were measured under conditions described below. In the fuel cell stack, silicon tubes were used to establish connection between a fuel supply port of the fuel flow channel and a fuel pump, and between the fuel pump and a fuel cartridge. Subsequently, an aqueous methanol solution having a concentration of 5 mol/dm³ was supplied as fuel to the fuel flow channel in one fuel cell layer, at a flow rate of 0.1 ml/min, using the fuel pump. The fuel cell stack was not provided with an air fan, and a measurement atmosphere in which the fuel cell stack was used had room temperature.

Under such conditions, the output characteristics of the fuel cell stack were measured using a charge/discharge power supply unit (product name: PFX2011 (manufactured by Kikusui Electronics Corporation)).

FIG. 30(A) is a graph showing a result of measuring a current-potential curve on the fuel cell stack fabricated in Example 1, in which an axis of ordinates represents a value of an output voltage (unit: [V]) from the fuel cell stack, and an axis of abscissas represents a current (unit: [A]) flowing from the fuel cell stack.

As shown in FIG. 30(A), in the fuel cell stack, an open-circuit voltage (i.e., a voltage at a current of 0 A) was about 1.2 V, and an output voltage obtained when a current of 1.5 A flowed was 0.4 V. Therefore, it became clear that the fuel cell stack was able to obtain an output of about 0.60 W.

FIG. 30(B) is a graph showing a result obtained by measuring the volume output density on the fuel cell stack fabricated in Example 1, in which an axis of ordinates represents a value (unit: [W/cm$^3$]) obtained by dividing the output of the fuel cell stack by the volume of the fuel cell stack (hereinafter also referred to as a "volume of the power generation portions"), and an axis of abscissas represents a current (unit: [A]) flowing from the fuel cell stack.

Since the volume of the power generation portions in the fuel cell stack according to the present example was 1.3 cm$^3$ (width: 16.5 mm×vertical length: 23 mm×thickness: 3.5 mm), the maximum output density was about 0.45 W/cm$^3$ (i.e., the maximum output density was obtained at a voltage of about 0.44 V). The maximum output density is about 1.5 times larger than about 0.30 W/cm$^3$ as the maximum value of output density of a conventional fuel cell stack, and is extremely excellent.

Such successful improvement in the output density of the fuel cell stack is considered to be achieved by using a fuel cell layer in which composite unit cells are arranged with a gap provided therebetween as the fuel cell layers constituting the fuel cell stack. This enabled an increase in the area of the power generation portions per unit volume and provided satisfactory air supply, which is thought to be the reason for achieving improvement in output density.

Figure 31:
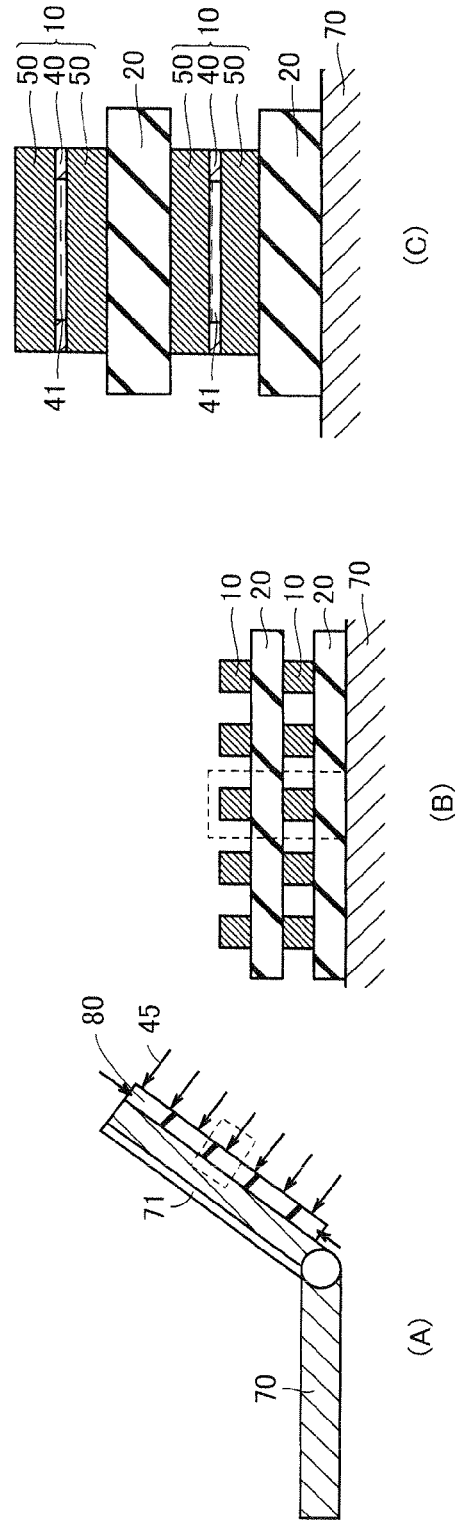
FIG. 31(A) is a schematic cross sectional view showing one surface of an electronic device provided with the fuel cell stack according to the present invention.
FIG. 31(B) is an enlarged schematic cross sectional view of the fuel cell stack in the electronic device indicated in FIG. 31(A)
FIG. 31(C) is an enlarged schematic cross sectional view of a construction of fuel cell layers in the fuel cell stack indicated in FIG. 31(B).

FIG. 31 is a view showing a preferable exemplary electronic device provided with the fuel cell stack according to the present example. FIG. 31(A) is a schematic cross sectional view showing the electronic device provided with the fuel cell stack according to the present invention, FIG. 31(B) is an enlarged cross sectional view of the fuel cell stack in the electronic device indicated in FIG. 31(A), and FIG. 31(C) is an enlarged schematic cross sectional view of a construction of fuel cell layers in the fuel cell stack indicated in FIG. 31(B).

To mount the fuel cell stack fabricated in Example 1 as a power supply for the electronic device, a spacer layer was further added as the lowermost layer of the fuel cell stack as shown in FIG. 31, to form a fuel cell stack in which two fuel cell layers and two spacer layers, that is, a total of four layers, were stacked in the order of a spacer layer, a fuel cell layer, a spacer layer, and a fuel cell layer.

Subsequently, a fuel cell system 80 having a Li ion cell as an auxiliary power supply for compensating for an output when the electronic device was started and the maximum output when the electronic device was driven, a DC/DC converter converting voltage into a voltage suitable for the electronic device, the fuel cartridge holding the aqueous methanol solution, the fuel pump, and the fuel cell stack described above was mounted on a surface of the electronic device opposite to its surface for information display portion 71, as shown in FIG. 31.

As the electronic device equipped with the fuel cell stack fabricated above, an electronic dictionary (model No.: PW-TC930 (manufactured by Sharp Corporation)) was used. Although the electronic dictionary consumes about 0.4 W in a standby state, it was operated for at least one hour by only the electric power of the fuel cell stack according to the present invention, without using an auxiliary power supply.

Example 2

In Example 2, a fuel cell stack in which one of the two fuel cell layers constituting the fuel cell stack according to Example 1 was made of a large-area unit cell was fabricated. Specifically, a fuel cell stack was fabricated to have a structure in which one fuel cell layer with a gap provided between composite unit cells and one fuel cell layer made of a large-area unit cell were arranged, and one spacer layer formed by arranging spacers with a gap provided therebetween was formed between the two fuel cell layers.

The fuel cell layer with a gap provided between composite unit cells was fabricated by a method identical to the method in Example 1. Although the large-area unit cell constituting the other fuel cell layer can be fabricated by a process identical to the process of fabricating the composite unit cell, the process is partly different in terms of a shape of a member required and the like.

<(1) Fabrication of Unit Cell>

Hereinafter, a method of fabricating the large-area unit cell used in the fuel cell stack according to Example 2 will be described, following the order of description on the method of manufacturing the fuel cell stack according to Example 1. As in Example 1, an anode conductive porous layer, an anode catalyst layer, an electrolyte membrane, a cathode catalyst layer, and a cathode conductive porous layer stacked in this order were sandwiched with stainless plates, to obtain a unit cell including these constituent members. In Example 2, to obtain a large-area unit cell, the above unit cell was cut into a size of 23 mm×16.3 mm, and thus one large-area unit cell was produced.

<(2) Bonding of Fuel Permeation Suppressing Layer to Fuel Flow Channel Formation Member>

Figure 32:
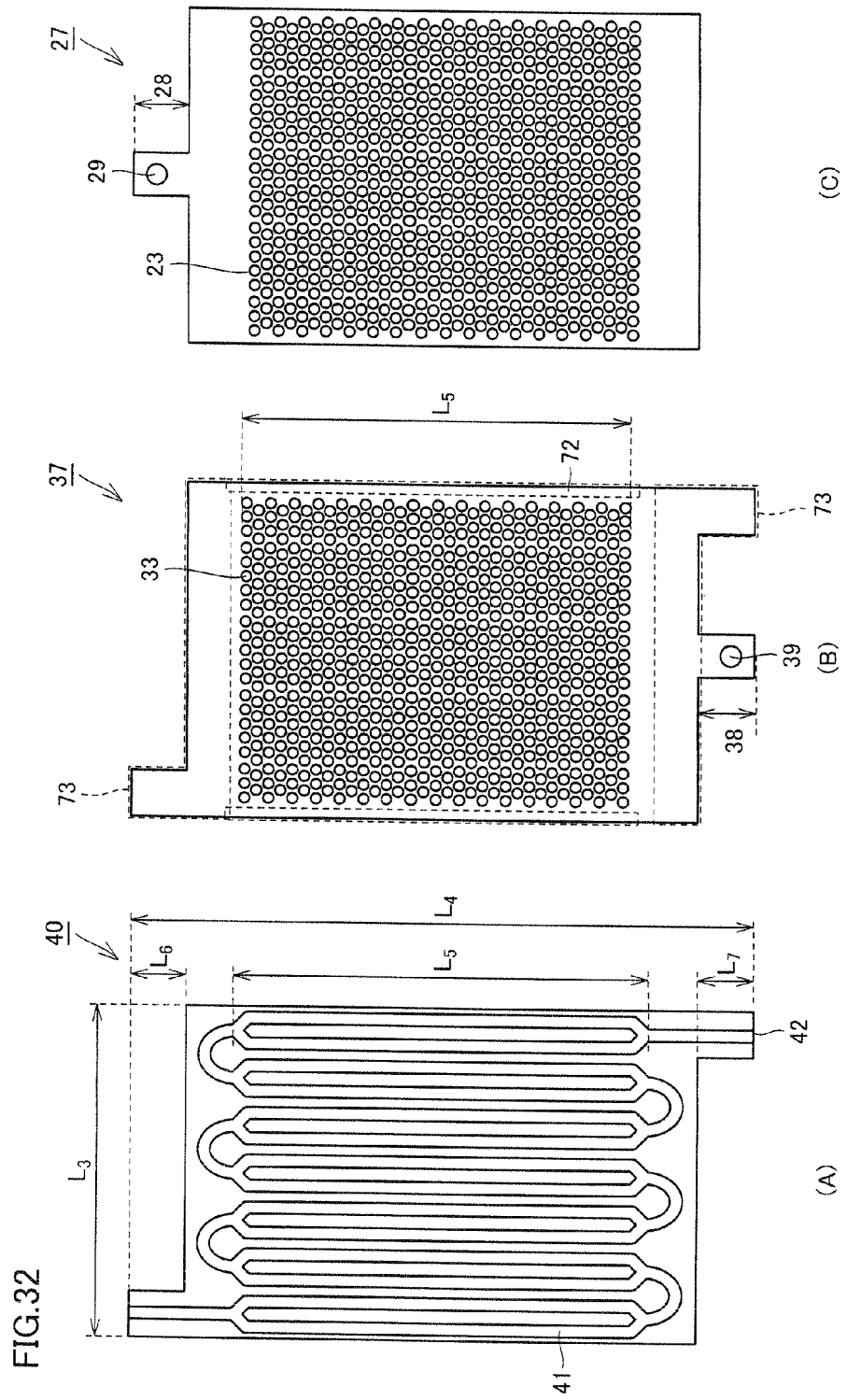
FIG. 32(A) is a top view showing a shape of a fuel flow channel formation member used in a fuel cell stack according to an example.
FIG. 32(B) is a top view showing a shape of an anode current collector used in the fuel cell stack according to the example.
FIG. 32(C) is a top view showing a shape of a cathode current collector used in the fuel cell stack according to the example.

FIG. 32 shows top views of members used to fabricate the fuel cell layer constituting the fuel cell stack according to the present example, in which FIG. 32(A) is a top view showing a shape of a fuel flow channel formation member, FIG. 32(B) is a top view showing a shape of an anode current collector, and FIG. 32(C) is a top view showing a shape of a cathode current collector.

As shown in FIG. 32(A), fuel flow channel formation member 40 used in the present example had length L$_3$ of an entire width of 16.5 mm, vertical length L$_4$ of 37 mm (including fuel flow channel entrance 42), and a thickness of 200 μm. Fuel flow channel 41 having a groove depth of 100 μm was formed in fuel flow channel formation member 40. One fuel flow channel formed in the fuel flow channel formation member shown in FIG. 32(A) had width L$_1$ of 1.0 mm, and its ratio to a length of a width of fuel flow channel formation member 40 was 0.85.

A fuel permeation suppressing layer was bonded to one of the front and rear surfaces of fuel flow channel formation member 40 as described above in which fuel flow channel 41 was formed. Specifically, an adhesive made of thermosetting, modified polyolefin-based resin (product name: Aron Melt PPET-1600 (manufactured by Toa Gosei Co., Ltd.)) was applied, with a bar coater, to a portion in which the fuel flow channel was not formed, on the surface of fuel flow channel formation member 40 described above in which the fuel flow channel was formed, and a fuel permeation suppressing layer made of fluorocarbon resin (product name: Polyvinylidene Fluoride Membrane Filter (manufactured by Nihon Millipore)) was bonded onto the adhesive to cover fuel flow channel 41. The fuel permeation suppressing layer had the same size as fuel flow channel formation member 40. Thus, a stacked member including fuel flow channel formation member 40 and the fuel permeation suppressing layer (hereinafter also referred to as a "flow channel-containing stacked member") was fabricated.

<(3) Bonding of Anode Current Collector to Flow Channel-Containing Stacked Member>

Anode current collector 37 used in the present example was made of stainless, as with the fuel flow channel formation member, and the one plated with gold was used to improve corrosion resistance and reduce electrical resistance. As shown in FIG. 32(B), anode current collector 37 had a size similar to that of the fuel flow channel formation member, and had a length of a width of 16.5 mm, a vertical length of 31 mm, and a thickness of 100 μm.

In anode current collector 37, a plurality of anode holes 33 with a diameter of 0.5 mmφ for supplying fuel to the unit cell were formed, and 0.5 mm-wide portions in which anode holes 33 were not formed (hereinafter also simply referred to as "bank portions 72") were also provided. Bank portions 72 had vertical length $L_5$ of 23 mm. Further, anode current collector 37 was provided with extended anode current extracting portion 38, and anode current extracting portion 38 had 1 mmφ anode current collector through-hole 39.

An adhesive made of thermosetting, modified polyolefin-based resin (product name: Aron Melt PPET-1600 (manufactured by Toa Gosei Co., Ltd.)) was applied, with a bar coater, to the above bank portions 72 in anode current collector 37 and portions 73 of anode current collector 37 in which anode holes 33 were not formed and which did not include anode current extracting portion 38, shown in FIG. 32(B). Anode current collector 37 was bonded to a surface of the fuel permeation suppressing layer opposite to its surface facing fuel flow channel formation member 40 in the flow channel-containing stacked member obtained in (2), via the above adhesive (a stacked member obtained herein will be hereinafter also simply referred to as an "anode current collector stacked member").

<(4) Stacking of Layers Constituting Fuel Cell Layer>

Cathode current collector 27 used in the present example was made of stainless, as with the fuel flow channel formation member, and the one plated with gold was used to improve corrosion resistance and reduce electrical resistance. Cathode current collector 27 to be used had a size similar to that of the fuel flow channel formation member, and had a length of a width of 16.5 mm, a vertical length of 31 mm, and a thickness of 100 μm, as shown in FIG. 32(C).

In cathode current collector 27, a plurality of cathode holes 23 with a diameter of 0.5 mmφ for supplying air to the unit cell were formed. A portion in which cathode holes 23 were formed had a vertical length of 23 mm. Further, cathode current collector 27 was provided with cathode current extracting portion 28 at a location different from that of anode current extracting portion 38 of anode current collector 37, and cathode current extracting portion 28 had 1 mmφ cathode current collector through-hole 29, as with anode current collector 37.

Cathode current collector 27, the large-area unit cell, and the anode current collector stacked member were arranged in this order, using cathode current collector 27 as described above. Specifically, the large-area unit cell obtained in (1) was arranged on the cathode current collector, and the anode current collector stacked member was arranged on the large-area unit cell.

Next, the members arranged as described above were sandwiched with stainless plates, and thermocompression bonding was performed in the thickness direction of the stainless plates at a temperature of 130° C., at 10 kgf/cm², for two minutes, to integrate the stacked body obtained above and thereby form a fuel cell layer. Bonding at an interface between the anode current collector and the anode conductive porous layer and bonding at an interface between the cathode current collector and the cathode conductive porous layer were both made by the anchor effect. Fuel cell layer 100 fabricated as described above had a thickness of about 0.7 mm.

<(5) Fabrication of Fuel Cell Stack>

Next, the layers constituting a fuel cell stack were arranged in the order of the first fuel cell layer, a spacer layer, and the second fuel cell layer, from the lowermost layer. Here, the fuel cell layer including the large-area unit cell was used as the first fuel cell layer, and a fuel cell layer including five composite unit cells arranged with a gap provided therebetween was used as the second fuel cell layer. As a spacer used for the spacer layer, the same spacer as that in Example 1 was used, and the spacer layer had the same construction as that in Example 1.

Further, the two fuel cell layers constituting the fuel cell stack were arranged with respect to each other such that anode current extracting portion 38 of anode current collector 37 in the first fuel cell layer and cathode current extracting portions 28 of cathode current collectors 27 in the second fuel cell layer overlapped each other in the layer-stacking direction, and cathode current extracting portion 28 of cathode current collector 27 in the first fuel cell layer and anode current extracting portions 38 of anode current collectors 37 in the second fuel cell layer overlapped each other in the layer-stacking direction, to fabricate a fuel cell stack. The fuel cell stack had an entire thickness of about 2.8 mm. In addition, the area of the power generation portions in the fuel cell stack was 9.2 cm'.

<(6) Series Connection of Fuel Cell Layers>

In the fuel cell stack fabricated by the present example, the fuel cell layers were connected in series using two conductive wires, by a method identical to the method in Example 1. Thus, the fuel cell layers constituting the fuel cell stack according to the present example were electrically connected.

Output characteristics and volume output density of the fuel cell stack according to Example 2 were measured. These characteristics were measured under conditions described below. In the fuel cell stack, silicon tubes were used to establish connection between a fuel supply port of the fuel flow channel and a fuel pump, and between the fuel pump and a fuel cartridge. Subsequently, an aqueous methanol solution having a concentration of 5 mol/dm³ was supplied as fuel to the fuel flow channel in one fuel cell layer, at a flow rate of 0.1 ml/min, using the fuel pump. The fuel cell stack was not provided with an air fan, and a measurement atmosphere in which the fuel cell stack was used had room temperature.

The output characteristics of the fuel cell stack were measured using a measurement device identical to that in Example 1.

FIG. 33(A) is a graph showing a result of measuring a current-potential curve on the fuel cell stack fabricated in Example 2, in which an axis of ordinates represents a value of an output voltage (unit: [V]) from the fuel cell stack, and an axis of abscissas represents a current (unit: [A]) flowing from the fuel cell stack.

As shown in FIG. 33(A), in the fuel cell stack, an open-circuit voltage was about 1.5 V, and an output voltage obtained when a current of 0.95 A flowed was 0.46 V. Therefore, it became clear that the fuel cell stack was able to obtain an output of about 0.43 W.

FIG. 33(B) is a graph showing a result obtained by measuring the volume output density on the fuel cell stack fabricated in Example 2, in which an axis of ordinates represents a value (unit: [W/cm$^3$]) obtained by dividing the output of the fuel cell stack by the volume of the power generation portions, and an axis of abscissas represents a current (unit: [A]) flowing from the fuel cell stack.

Since the volume of the power generation portions in the fuel cell stack according to the present example was 1.1 cm$^3$ (width: 16.5 mm×vertical length: 23 mm×thickness: 2.8 mm), the maximum output density was about 0.40 W/cm$^3$ (i.e., the maximum output density was obtained at a voltage of about 0.46 V). The maximum output density is about 1.3 times larger than about 0.30 W/cm$^3$ as the maximum value of output density of a conventional fuel cell stack, and is extremely excellent.

Such successful improvement in the output density of the fuel cell stack is considered to be achieved by using a fuel cell layer in which composite unit cells are arranged with a gap provided therebetween as at least one of the fuel cell layers constituting the fuel cell stack. This enabled an increase in the area of the power generation portions per unit volume and provided satisfactory air supply, which is thought to be the reason for achieving improvement in output density.

Figure 34:
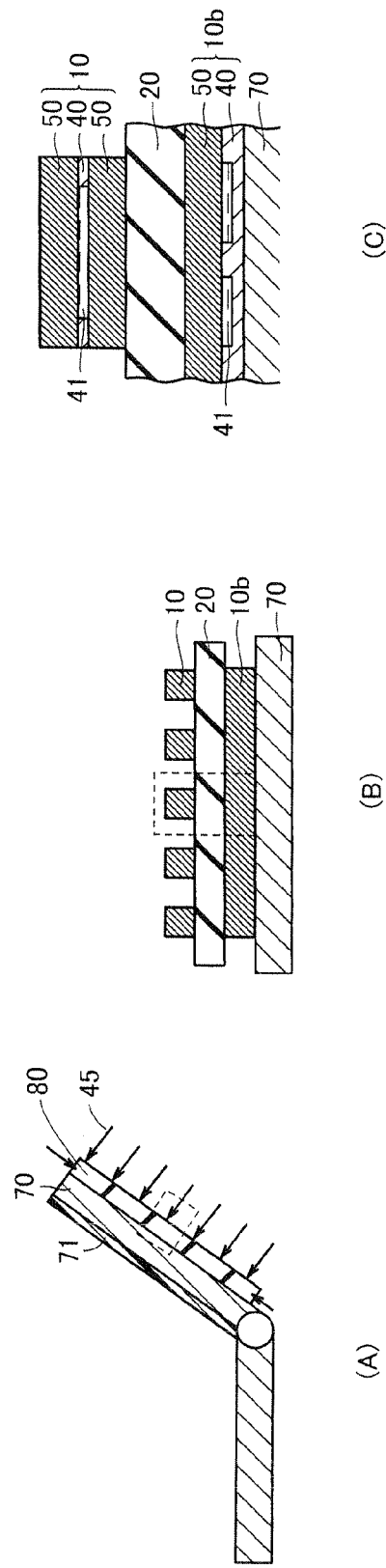
FIG. 34(A) is a schematic cross sectional view showing one surface of an electronic device provided with the fuel cell stack according to the present invention.
FIG. 34(B) is an enlarged schematic cross sectional view of the fuel cell stack in the electronic device indicated in FIG. 34(A)
FIG. 34(C) is an enlarged schematic cross sectional view of a construction of fuel cell layers in the fuel cell stack indicated in FIG. 34(B).

FIG. 34 is a view showing a preferable exemplary electronic device provided with the fuel cell stack according to the present example. FIG. 34(A) is a schematic cross sectional view showing the electronic device provided with the fuel cell stack according to the present invention, FIG. 34(B) is an enlarged cross sectional view of the fuel cell stack in the electronic device indicated in FIG. 34(A), and FIG. 34(C) is an enlarged schematic cross sectional view of a construction of fuel cell layers in the fuel cell stack indicated in FIG. 34(B).

Fuel cell system 80 having a Li ion cell as an auxiliary power supply for compensating for an output when the electronic device was started and the maximum output when the electronic device was driven, a DC/DC converter converting voltage into a voltage suitable for the electronic device, the fuel cartridge holding the aqueous methanol solution, the fuel pump, and the fuel cell stack described above was mounted on a surface of the electronic device opposite to its surface for information display portion 71, as shown in FIG. 34.

As the electronic device equipped with the fuel cell stack fabricated above, an electronic dictionary (model No.: PW-TC930 (manufactured by Sharp Corporation)) was used. Since the electronic dictionary consumes about 0.4 W in a standby state, it was confirmed that the electronic dictionary was operated for at least one hour by the electric power of the fuel cell stack according to the present invention.

Comparative Example 1

In Comparative Example 1, a fuel cell stack was fabricated employing a fuel cell layer with a structure in which unit cells were provided on only one surface of a fuel flow channel, for all of three fuel cell layers constituting the fuel cell stack. Specifically, a fuel cell stack with a structure having three fuel cell layers formed by providing a gap between unit cells and spacer layers each formed by arranging spacers with a gap provided therebetween and provided between the fuel cell layers was fabricated. In the unit cell used in the fuel cell stack according to Comparative Example 1, an anode current collector was directly bonded to a fuel flow channel formation member by an adhesive, without providing a fuel permeation suppressing layer between the fuel flow channel formation member and the anode current collector as in the examples.

<(1) Fabrication of Unit Cell>

Hereinafter, a method of fabricating the fuel cell stack according to Comparative Example 1 will be described, following the order of description on the method of manufacturing the fuel cell stack according to Example 1. As in Example 1, an anode conductive porous layer, an anode catalyst layer, an electrolyte membrane, a cathode catalyst layer, and a cathode conductive porous layer stacked in this order were sandwiched with stainless plates, to obtain a unit cell including these constituent members.

However, for the anode conductive porous layer, carbon paper (product name: GDL25BC (manufactured by SGL Carbon Japan Co., Ltd.)) having one surface subjected to water-repellent treatment using a layer made of fluorine-based resin and carbon particles was used, and hydrophilization treatment was not performed in order to exhaust carbon dioxide produced by the reaction in a cell through fuel flow channel 41, instead of exhausting it from end surfaces of the anode conductive porous layer. In Comparative Example 1, the above unit cell was cut into a size of 23 mm×2.3 mm to produce five unit cells.

<(2) Fuel Flow Channel Formation Member>

Figure 35:
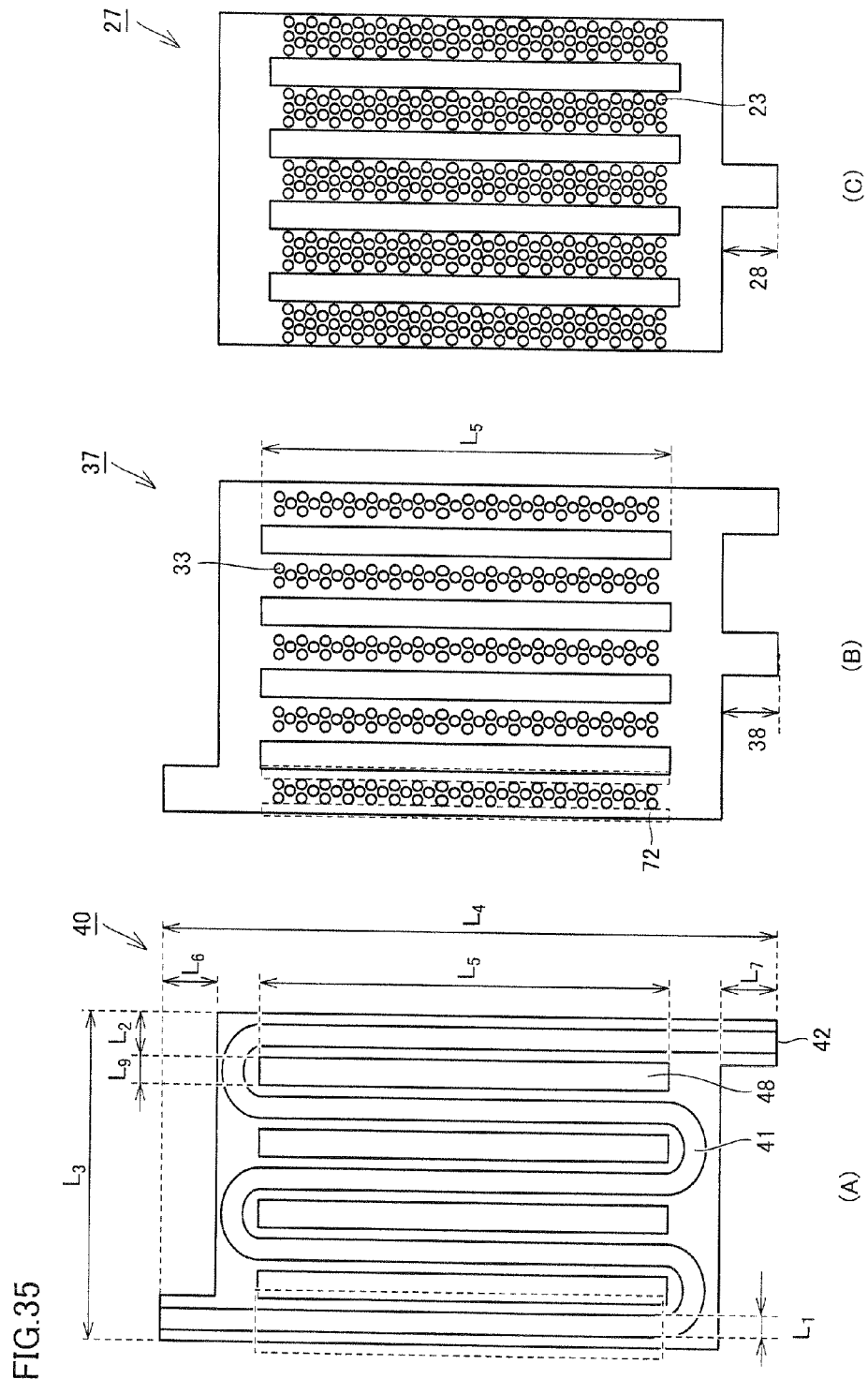
FIG. 35(A) is a top view showing a shape of a fuel flow channel formation member used in a fuel cell stack according to a comparative example.
FIG. 35(B) is a top view showing a shape of an anode current collector used in the fuel cell stack according to the comparative example.
FIG. 35(C) is a top view showing a shape of a cathode current collector used in the fuel cell stack according to the comparative example.

FIG. 35 shows top views of members used to fabricate the fuel cell layer constituting the fuel cell stack according to the present comparative example, in which FIG. 35(A) is a top view showing a shape of the fuel flow channel formation member, FIG. 35(B) is a top view showing a shape of the anode current collector, and FIG. 35(C) is a top view showing a shape of a cathode current collector.

As shown in FIG. 35(A), fuel flow channel formation member 40 used in the present comparative example had length $L_3$ of an entire width of 16.5 mm, vertical length $L_4$ of 37 mm (including fuel flow channel entrance 42), and a thickness of 200 µm. As fuel flow channel formation member 40, the one in which fuel flow channel 41 having a groove depth of 100 µm and length $L_1$ a width of 1.5 mm was formed, and four gap holes 48 (having length $L_9$ of a width of 1.0 mm and vertical length $L_5$ of 25 mm) were formed in a thickness direction thereof was used.

In a portion of fuel flow channel formation member 40 other than gap holes 48, five extended portions of fuel flow channel formation member 40 were left, and the width of each extended portion (i.e., the width also serving as the "width of the unit cell" through a later step) had length $L_2$ of 2.5 mm. Thus, relationship $L_1/L_2$ of length $L_1$ of the width of fuel flow channel 41 with respect to length $L_2$ of the width of the extended portion of fuel flow channel formation member 40 (i.e., the width of the unit cell) was 0.6.

<(3) Bonding of Anode Current Collector to Fuel Flow Channel Formation Member>

Anode current collector 37 used in the present comparative example was made of stainless, as with the fuel flow channel formation member, and the one plated with gold was used to improve corrosion resistance and reduce electrical resistance. As shown in FIG. 35(B), anode current collector 37 had a size similar to that of the fuel flow channel formation member, and had a length of a width of 16.5 mm, a vertical length of 31 mm, and a thickness of 100 µm.

As shown in FIG. 35(B), in anode current collector 37, a plurality of anode holes 33 with a diameter of 0.5 mmφ for supplying fuel to the unit cells were formed, and 0.5 mm-wide portions in which anode holes 33 were not formed (hereinafter also simply referred to as "bank portions") were also provided. The bank portions had vertical length $L_5$ of 23 mm. Further, anode current collector 37 was provided with extended anode current extracting portion 38, and anode current extracting portion 38 had 1 mmϕ anode current collector through-hole 39.

An epoxy resin adhesive was applied, with a bar coater, to a portion of fuel flow channel formation member 40 shown in FIG. 35(A) in which fuel flow channel 41 was not formed, and anode current collector 37 was arranged such that gap holes formed in anode current collector 37 matched gap holes 48 formed in fuel flow channel formation member 40. Thus, anode current collector 37 was bonded to one of front and rear surfaces of fuel flow channel formation member 40 in which fuel flow channel 41 was formed, via the above adhesive (a stacked member obtained herein will be hereinafter also simply referred to as an "anode current collector stacked member").

<(4) Stacking of Layers Constituting Fuel Cell Layer>

Cathode current collector 27 used in the present comparative example was made of stainless, as with the fuel flow channel formation member, and the one plated with gold was used to improve corrosion resistance and reduce electrical resistance. Cathode current collector 27 to be used had a size similar to that of the fuel flow channel formation member, and had a length of a width of 16.5 mm, a vertical length of 31 mm, and a thickness of 100 μm, as shown in FIG. 35(C). In cathode current collector 27, gap holes having a length of a width of 1.0 mm and a vertical length of 25 mm were formed in the thickness direction, as in the fuel flow channel formation member.

In each extended portion (with a vertical length of 23 mm) of cathode current collector 27, a plurality of cathode holes 23 with a diameter of 0.5 mmϕ for supplying air to the unit cells were formed. Further, cathode current collector 27 was provided with extended cathode current extracting portion 28 so as to overlap anode current extracting portion 38 of anode current collector 37.

Cathode current collector 27, the unit cells, and the anode current collector stacked member were arranged in this order, using cathode current collector 27 as described above. Specifically, a total of five unit cells obtained in (1) were arranged on five extended portions of the cathode current collector, one by one, and the anode current collector stacked member obtained in (3) was arranged on the five unit cells such that the gap holes in the anode current collector overlapped the gap holes in the cathode current collector.

In the case of forming a fuel cell layer in which unit cells are arranged on one of front and rear surfaces of a fuel flow channel as described above, it is necessary to arrange five unit cells on one surface of fuel flow channel 41.

Next, the members arranged as described above were sandwiched with stainless plates, and thermocompression bonding was performed in the thickness direction of the stainless plates at a temperature of 130° C., at 10 kgf/cm$^2$, for two minutes, to integrate the stacked body obtained above and thereby form a fuel cell layer. Bonding at an interface between the anode current collector and the anode conductive porous layer and bonding at an interface between the cathode current collector and the cathode conductive porous layer were both made by the anchor effect.

Subsequently, end surfaces of the five unit cells provided on the extended portions in the fuel cell layer were sealed with thermosetting epoxy resin (product name: Quick 5 (manufactured by Konishi Co., Ltd.)). By sealing the end surfaces of the unit cells, entrance of air from end surfaces of the anode catalyst layer and the anode conductive porous layer can be prevented. Further, exhaust gas such as carbon dioxide produced by reaction is exhausted from fuel flow channel 41, instead of being exhausted from the end surfaces of the anode conductive porous layer. Fuel cell layer 100 fabricated as described above had a thickness of about 0.7 mm. Three fuel cell layers fabricated by the above process were prepared.

<(5) Fabrication of Fuel Cell Stack>

Next, the layers constituting a fuel cell stack were arranged in the order of the first fuel cell layer, a spacer layer, the second fuel cell layer, a spacer layer, and the third fuel cell layer, from the lowermost layer. Here, the fuel cell layer including five unit cells arranged with a gap provided therebetween was used as the first fuel cell layer, the second fuel cell layer, and the third fuel cell layer. As a spacer used for the spacer layer, the same spacer as that in Example 1 was used, and the spacer layer had the same construction as that in Example 1.

Further, the three fuel cell layers constituting the fuel cell stack were arranged with respect to each other such that anode current extracting portion 38 of anode current collector 37 in the first fuel cell layer, cathode current extracting portion 28 of cathode current collector 27 in the second fuel cell layer, and anode current extracting portion 38 in the third fuel cell layer overlap each other in the layer-stacking direction, and cathode current extracting portion 28 of cathode current collector 27 in the first fuel cell layer, anode current extracting portion 38 of anode current collector 37 in the second fuel cell layer, and cathode current extracting portion 28 in the third fuel cell layer overlap each other in the layer-stacking direction, to fabricate a fuel cell stack. The fuel cell stack had an entire thickness of about 3.0 mm. In addition, the area of the power generation portions in the fuel cell stack was 8.1 cm$^2$.

<(6) Series Connection of Fuel Cell Layers>

In the fuel cell stack fabricated by the present example, electrical connection between the fuel cell layers was performed as described below. Specifically, the cathode current collector in the first fuel cell layer and the anode current collector in the second fuel cell layer were electrically connected using a gold wire with a length of 1 cm. Here, the gold wire was fixed and bonded to the cathode current collector and the anode current collector using silver paste. Similarly, the cathode current collector in the second fuel cell layer and the anode current collector in the third fuel cell layer were electrically connected using a gold wire with a length of 1 cm, and thus the fuel cell layers constituting the fuel cell stack were connected in series.

Output characteristics and volume output density of the fuel cell stack according to Comparative Example 1 were measured. These characteristics were measured under conditions described below. In the fuel cell stack, silicon tubes were used to establish connection between a fuel supply port of the fuel flow channel and a fuel pump, and between the fuel pump and a fuel cartridge. Subsequently, an aqueous methanol solution having a concentration of 3 mol/dm$^3$ was supplied as fuel to the fuel flow channel in one fuel cell layer, at a flow rate of 0.1 ml/min, using the fuel pump. The fuel cell stack was not provided with an air fan, and a measurement atmosphere in which the fuel cell stack was used had room temperature. The output characteristics of the fuel cell stack were measured using a measurement device identical to that in Example 1.

FIG. 36(A) is a graph showing a result of measuring a current-potential curve on the fuel cell stack fabricated in Comparative Example 1, in which an axis of ordinates represents a value of an output voltage (unit: [V]) from the fuel cell stack, and an axis of abscissas represents a current (unit: [A]) flowing from the fuel cell stack.

As shown in FIG. 36(A), in the fuel cell stack, an open-circuit voltage was about 2.0 V, and an output voltage obtained when a current of 0.42 A flowed was 0.80 V. Therefore, it became clear that the fuel cell stack was able to obtain an output of about 0.34 W.

FIG. 36(B) is a graph showing a result obtained by measuring the volume output density on the fuel cell stack fabricated in Comparative Example 1, in which an axis of ordinates represents a value (unit: [W/cm$^3$]) obtained by dividing the output of the fuel cell stack by the volume of the power generation portions, and an axis of abscissas represents a current (unit: [A]) flowing from the fuel cell stack.

Since the volume of the power generation portions in the fuel cell stack according to Comparative Example 1 was 1.14 cm$^3$ (width: 16.5 mm×vertical length: 23 mm×thickness: 3.0 mm), the maximum output density was about 0.30 W/cm$^3$ (i.e., the maximum output density was obtained at a voltage of about 0.8 V).

Although the examples of the present invention have been described above, it is originally intended to combine the constructions of the above examples as appropriate.

It should be understood that the embodiments and the examples disclosed herein are illustrative and non-restrictive in every respect. The scope of the present invention is defined by the scope of the claims, rather than the description above, and is intended to include any modifications within the scope and meaning equivalent to the scope of the claims.

INDUSTRIAL APPLICABILITY

According to the present invention, a fuel cell stack having reduced thickness and weight and an improved output density can be provided.

REFERENCE SIGNS LIST

1: fuel cell stack, 2: membrane electrode assembly, 10: composite unit cell, 11, 21: gap, 10a: unit cell, 10b: large-area unit cell, 20: spacer, 20a: large-area spacer, 23: cathode hole, 24, 34: conductive wire, 25: cathode catalyst layer, 26: cathode conductive porous layer, 27: cathode current collector, 28: cathode current extracting portion, 29: cathode current collector through-hole, 30: gap holding member, 31: gas exhaust path, 33: anode hole, 35: anode catalyst layer, 36: anode conductive porous layer, 37: anode current collector, 38: anode current extracting portion, 39: anode current collector through-hole, 40: fuel flow channel formation member, 41: fuel flow channel, 42: fuel flow channel entrance, 43: fuel flow channel exit, 45: supply path, 46: diffusion path, 47: fuel permeation suppressing layer, 48: gap hole, 44, 49: arrow, 50: unit cell, 51: nonconductor portion, 52: hole for fuel supply, 55: bonding layer, 56: sealing material, 57: electrical conductivity permeation suppressing layer, 60: electrolyte membrane, 70: electronic device, 71: information display portion, 72: bank portion, 73: portion of the anode current collector other than extended portions and the current extracting portion, 80: fuel cell system, 81: vaporization layer, 82: heat insulating layer, 83: moisturization layer, 84: produced gas exhaust path, 85: fuel transportation member, 86: adhesive agent, 87: fuel storage chamber, 88: flow channel plate, 90: casing, 100, 100d: fuel cell layer, 100a: single-surface unit cell layer, 100b: large-area unit cell layer, 200: spacer layer, $L_1$: width of the fuel flow channel, $L_2$: width of the unit cell.

The invention claimed is:

1. A fuel cell stack, comprising:
two or more stacked fuel cell layers,
said fuel cell stack being formed by alternately stacking said fuel cell layers and spacer layers each including one or more spacers,
at least one of said fuel cell layers being formed by arranging two or more composite unit cells in an identical plane with a gap provided therebetween,
at least one of said spacer layers being formed by arranging two or more spacers in an identical plane with a gap provided therebetween,
the gap formed by said two or more composite unit cells being a space penetrating the fuel cell layer in a direction of layer thickness thereof and communicating with the gap formed by said two or more spacers,
said composite unit cell including a plurality of unit cells, each having an anode electrode, a cathode electrode and an electrolyte membrane, and a fuel supply portion for supplying fuel to the anode electrodes of said unit cells,
the anode electrodes of said plurality of unit cells being arranged to face said fuel supply portion.

2. The fuel cell stack according to claim 1, wherein said spacer is provided on each of both end portions of either one or both of front and rear surfaces of said fuel cell layer.

3. The fuel cell stack according to claim 1, wherein said spacer layer is one large-area spacer that is in contact with all the composite unit cells constituting the fuel cell layer adjacent to the spacer layer.

4. The fuel cell stack according to claim 1, wherein said fuel supply portion includes a fuel flow channel through which the fuel flows.

5. The fuel cell stack according to claim 1, wherein said unit cell includes the anode electrode, the electrolyte membrane, and the cathode electrode in this order.

6. The fuel cell stack according to claim 5, wherein said unit cell has an anode current collector on a surface of said anode electrode opposite to its surface in contact with said electrolyte membrane, and has a cathode current collector on a surface of said cathode electrode opposite to its surface in contact with said electrolyte membrane.

7. The fuel cell stack according to claim 4, further comprising a fuel permeation suppressing layer between said fuel flow channel and said anode electrode.

8. The fuel cell stack according to claim 1, comprising a vaporization layer for supplying vapor of said fuel to said anode electrode, between said fuel supply portion and said anode electrode.

9. The fuel cell stack according to claim 6, comprising a moisturization layer for holding water produced by power generation within said unit cell, on a side of said cathode current collector opposite to its side in contact with said cathode electrode.

10. The fuel cell stack according to claim 6, comprising a heat insulating layer on a side of said anode current collector opposite to its side in contact with said anode electrode.

11. The fuel cell stack according to claim 1, having a space penetrating layers constituting said composite unit cell in a thickness direction,
wherein said space is a produced gas exhaust path for exhausting produced gas produced at the anode electrodes.

12. The fuel cell stack according to claim 1, wherein said spacer has insulating properties at least in a thickness direction thereof.

13. The fuel cell stack according to claim 1, wherein said spacer has insulating properties at least in a surface thereof.

14. The fuel cell stack according to claim 1, wherein said spacer is made of a porous body.

15. The fuel cell stack according to claim 1, wherein said spacer is made of a metal oxide porous body composed of titanium oxide, aluminum oxide, or zirconium oxide insulated by an oxide, a metal-polymer composite body insulated by applying or modifying a hydrophilic polymer or attaching a hydrophilic polymer film on a surface of a metal porous body, or a porous ceramic.

16. The fuel cell stack further comprising a casing covering an outer surface of the fuel cell stack according to claim 1, wherein said casing is in contact with said one or more spacers.

17. The fuel cell stack according to claim 16, wherein said casing is made of one or more materials selected from the group consisting of Cu, Al, Fe, Ti, and stainless.

18. The fuel cell stack according to claim 6, wherein two unit cells included in said composite unit cell are connected in parallel by electrically connecting two said anode current collectors included in said fuel cell layer and electrically connecting two said cathode current collectors included in said fuel cell layer.

19. The fuel cell stack according to claim 6, wherein two adjacent said fuel cell layers are connected in series by electrically connecting said cathode current collector in one of two adjacent said fuel cell layers and said anode current collector in the other fuel cell layer.

20. The fuel cell stack according to claim 6, wherein
   said anode current collector includes an anode current collector through-hole penetrating in a thickness direction thereof,
   said cathode current collector includes a cathode current collector through-hole penetrating in a thickness direction thereof,
   said anode current collector through-hole and said cathode current collector through-hole are provided in an identical fuel cell layer, at different positions in a layer-stacking direction of the fuel cell layer,
   said cathode current collector through-hole in one of two adjacent said fuel cell layers and the anode current collector through-hole in the other fuel cell layer are provided at a substantially identical position in a direction in which the fuel cell layers are stacked, and
   the anode current collector through-hole in said one fuel cell layer and the cathode current collector through-hole in said other fuel cell layer are provided at a substantially identical position in the direction in which the fuel cell layers are stacked.

21. The fuel cell stack according to claim 1, wherein said composite unit cell and/or said spacer are/is in a shape of an elongated strip.

22. An electronic device provided with the fuel cell stack according to claim 1.

* * * * *